US009054909B2

(12) United States Patent
Shtiegman et al.

(10) Patent No.: US 9,054,909 B2
(45) Date of Patent: Jun. 9, 2015

(54) FORWARDING CALLS IN REAL TIME COMMUNICATIONS

(75) Inventors: Eran Shtiegman, Redmond, WA (US); Frank Fitzlaff, Adliswill (CH); Jochen R. Kunert, Redmond, WA (US); Justin M. Maguire, III, Seattle, WA (US); Nikhil P. Bobde, Redmond, WA (US); Paul Tidwell, Sammamish, WA (US); Rajesh Ramanathan, Redmond, WA (US); Robert J. Osborne, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1763 days.

(21) Appl. No.: 11/479,918

(22) Filed: Jun. 30, 2006

(65) Prior Publication Data
US 2008/0002820 A1      Jan. 3, 2008

(51) Int. Cl.
*H04M 3/42* (2006.01)
*H04L 29/06* (2006.01)
*H04M 3/54* (2006.01)
(Continued)

(52) U.S. Cl.
CPC ..... *H04L 29/06027* (2013.01); *H04M 3/42161* (2013.01); *H04M 3/46* (2013.01); *H04M 3/465* (2013.01); *H04M 3/54* (2013.01); *H04M 7/006* (2013.01); *H04L 65/1069* (2013.01); *H04L 65/4007* (2013.01)

(58) Field of Classification Search
USPC ............ 379/211.01, 211.02, 212.01; 370/352
See application file for complete search history.

(56) References Cited

U.S. PATENT DOCUMENTS

| 4,723,273 A | * | 2/1988 | Diesel et al. ............ 379/211.02 |
| 5,754,636 A | | 5/1998 | Bayless et al. |
| 5,768,356 A | * | 6/1998 | McKendry et al. .......... 379/242 |

(Continued)

FOREIGN PATENT DOCUMENTS

GB             2356522 A      5/2001

OTHER PUBLICATIONS

"Desktop Assistant® 15", http://www.newheights.com/products_services/products/da_15/resource/DK30008_DA-15_datasheet_v1.pdf.

(Continued)

*Primary Examiner* — William Deane, Jr.
(74) *Attorney, Agent, or Firm* — Peter Taylor; Andrew Smith; Micky Minhas

(57) ABSTRACT

A system controls forwarding of an incoming call. The system receives the incoming call directed to an original recipient. Forwarding settings are processed for routing the incoming call. In some embodiments, the forwarding settings may include a listing of at least one group having more than one member and at least one forwarding instruction based on the at least one group. In these embodiments, the incoming call is forwarded according to the at least one forwarding instruction to at least one first member and at least one second member of the at least one group. The forwarding settings may be based on a user's presence settings, subject to categorization rules, and/or utilize protocol extensions. In some embodiments, the system can map communication routing scenarios to a markup document, such as an XML document, that the system can use to implement team or forwarding call rules. In some embodiments, client devices can set preamble routing independent from the communication server.

16 Claims, 55 Drawing Sheets

(51) Int. Cl.
*H04M 3/46* (2006.01)
*H04M 7/00* (2006.01)

(56) References Cited

U.S. PATENT DOCUMENTS

| | | | |
|---|---|---|---|
| 5,930,723 A * | 7/1999 | Heiskari et al. | 455/518 |
| 5,940,488 A | 8/1999 | DeGrazia et al. | |
| 6,058,178 A * | 5/2000 | McKendry et al. | 379/212.01 |
| 6,201,863 B1 | 3/2001 | Miloslavsky | |
| 6,205,412 B1 | 3/2001 | Barskiy et al. | |
| 6,278,454 B1 | 8/2001 | Krishnan | |
| 6,463,145 B1 | 10/2002 | O'Neal et al. | |
| 6,647,159 B1 * | 11/2003 | Satorius | 385/7 |
| 6,937,597 B1 | 8/2005 | Rosenberg et al. | |
| 6,937,713 B1 * | 8/2005 | Kung et al. | 379/211.02 |
| 6,954,524 B2 | 10/2005 | Gibson | |
| 6,993,355 B1 * | 1/2006 | Pershan | 455/518 |
| 7,123,706 B2 * | 10/2006 | Ooki | 379/211.02 |
| 8,036,362 B1 * | 10/2011 | Skinner | 379/211.02 |
| 8,189,755 B2 * | 5/2012 | Winikoff et al. | 379/201.1 |
| 2002/0167946 A1 | 11/2002 | Gallant | |
| 2004/0161090 A1 | 8/2004 | Digate et al. | |
| 2004/0192378 A1 * | 9/2004 | Wulkan | 455/555 |
| 2004/0248590 A1 * | 12/2004 | Chan et al. | 455/456.3 |
| 2004/0258233 A1 | 12/2004 | Poustchi et al. | |
| 2005/0152527 A1 * | 7/2005 | Kent et al. | 379/211.02 |
| 2005/0198321 A1 * | 9/2005 | Blohm | 709/228 |
| 2005/0215243 A1 * | 9/2005 | Black et al. | 455/417 |
| 2006/0025156 A1 * | 2/2006 | Campbell | 455/456.1 |
| 2006/0062369 A1 * | 3/2006 | Kent et al. | 379/207.02 |
| 2006/0193460 A1 * | 8/2006 | Cadiz et al. | 379/211.02 |
| 2007/0036135 A1 * | 2/2007 | Patron et al. | 370/352 |
| 2007/0168555 A1 * | 7/2007 | Dorenbosch | 709/245 |
| 2007/0172042 A1 * | 7/2007 | Winikoff et al. | 379/142.05 |
| 2008/0119165 A1 * | 5/2008 | Mittal et al. | 455/411 |
| 2008/0292086 A1 * | 11/2008 | Schwab et al. | 379/211.02 |
| 2009/0097632 A1 * | 4/2009 | Carnazza et al. | 379/211.02 |
| 2009/0154681 A1 * | 6/2009 | Kung et al. | 379/211.02 |
| 2009/0285204 A1 * | 11/2009 | Gallant et al. | 370/352 |
| 2010/0185584 A1 * | 7/2010 | Vendrow et al. | 707/622 |
| 2011/0142214 A1 * | 6/2011 | Kennedy | 379/93.17 |
| 2012/0016938 A1 * | 1/2012 | Gallant | 709/204 |

OTHER PUBLICATIONS

"FacetPhone Features", http://www.facetcorp.com/fp_features.html#gui.

"Group Call Forward Control", http://www.necunifiedsolutions.com/Downloads/PDFs/188242_200105_GrpCallFwdCtrl.pdf.

Horvitz et al, "Experiences with the Design, Fielding, and Evaluation of a Real-Time Communications Agent", http://research.microsoft.com/~horvitz/et_bestcom_tr.pdf.

Kelly, Brent E., "Crossing the Telephone-Computer Chasm-Integrating Telephony Call Control into Microsoft® Office Live Communications Server", http://www.wainhouse.com/files/papers/wr-telechasm.pdf.

* cited by examiner

| No. | Icon | Purpose |
|---|---|---|
| 1 | <none> | When the user is not UC enabled, then no icon is shown in the Phone Status button. |
| 2 |  | This is the default state. It indicates there are no call forwarding rules that are currently active on the phone. Note that this will be shown even if the user has configured answered call forwarding. This is because the user's phone will continue to ring for unanswered forwarding and there is no need to show feedback per se. |
| 3 |  | This indicates that call forwarding are currently active on the phone |
| 4 |  | This indicates that the phone is currently in Do Not Disturb mode. |

FIG. 6

| No. | Feature | Message |
|---|---|---|
| 1 | No call handling rules are set |  |
| 2 | Time + Group Call + Unanswered Call Forward |  |
| 3 | Time + Immediate Call Forwarding |  |
| 4 | Ring Team Directly |  |
| 5 | Simultaneous Ring |  |

FIG. 7

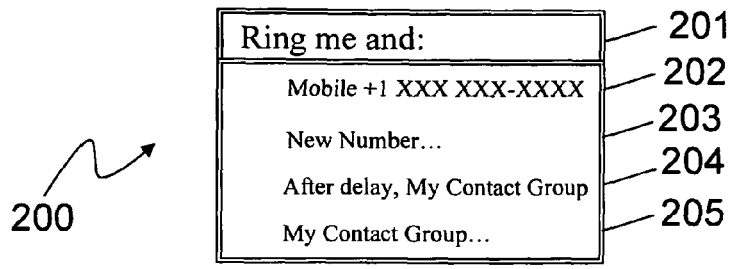
FIG. 12
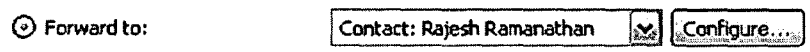
FIG. 13
| No. | Setting | Configure Button |
|---|---|---|
| 1 | Voicemail | Disabled |
| 2 | Registered phone numbers | Disabled |
| 3 | Contact | Opens Contact Picker |
| 4 | New number | Opens Enter Phone number 1-off dialog |
| 5 | Contact Group | Opens Group Selector |
FIG. 14
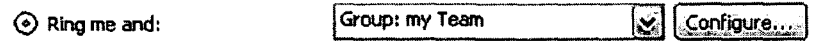
FIG. 15

| No. | Setting | Configure Button |
|---|---|---|
| 1 | Voicemail (default) | Disabled |
| 2 | Registered phone numbers | Disabled |
| 3 | Person | Opens Contact Picker |
| 4 | New number | Opens Enter Phone number 1-off dialog |
FIG. 16
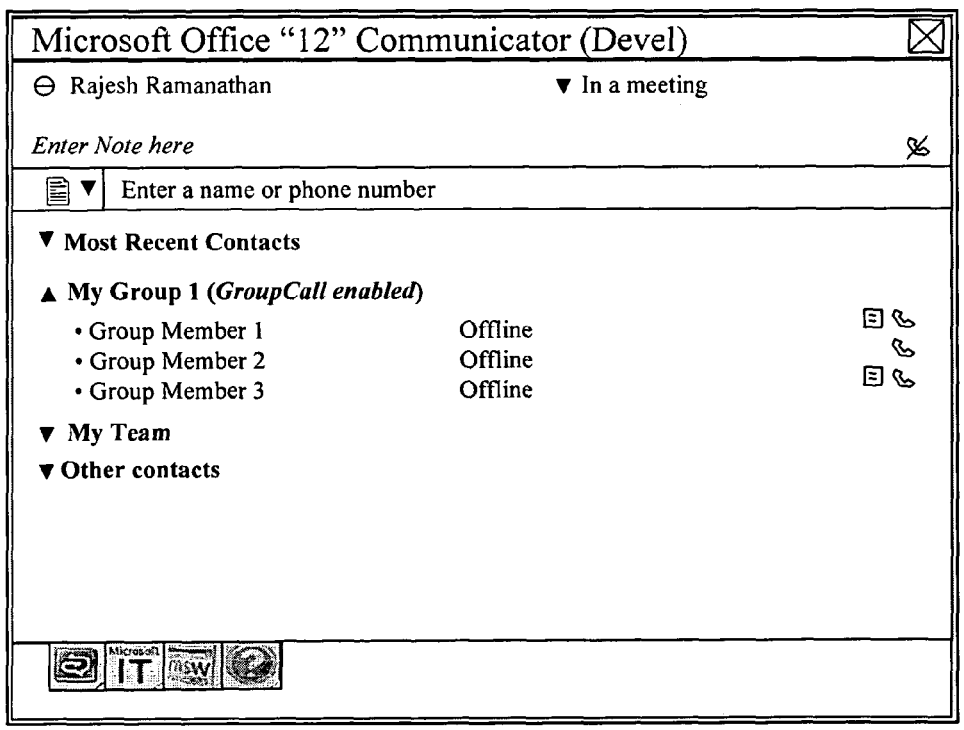
FIG. 17
FIG. 18

| Features | Scenario |
|---|---|
| Blocked List | No calls or voicemail from people who I blocked |
| Do Not Disturb | Set my phone rule to Do Not Disturb when the presence state is changed to Do Not Disturb |
| Time | Apply any incoming call rules only during working hours specified by the user |
| Forward Immediate | Immediately send incoming calls to one of the following<br>• Number<br>• Person (SIP URI)<br>• Voicemail |
| Simultaneous Ringing | Allows incoming calls to simultaneously ring a PSTN number |
| Ring my Assistant or Team | (1) Ring other people directly, do not ring me;<br>(2) Ring me simultaneously with my assistant or team;<br>(3) Ring me simultaneously with my assistant or team, ring me first for 10 seconds;<br>(4) Pick one person in random from my team;<br>(5) Do Not Ring my Team Members when I am Offline;<br>(6) Automatically configure my assistant to ring with my phone |
| Forward unanswered calls | (1) Send unanswered calls to one of the following:<br>• Voicemail (default)<br>• Number<br>• Person (SIP URI);<br>(2) Send calls to voicemail as the last destination |
| Deflect Call Manually | (1) Deflect call to:<br>• Any of my PSTN number<br>• Voicemail (not for TeamCall)<br>(2) Deflect app invite to PSTN |
| Location based Forwarding (RCC only) | (1) When using this computer, calls are forwarded to: Number;<br>(2) When using this computer do not forward calls;<br>(3) When I am not present anywhere (offline), calls are forwarded to: Number |

FIG. 19

| No. | Scenario | User phone rings | Simul ring | TeamCall ringing | Forward Immediate | Forward Unanswered | Voicemail |
|---|---|---|---|---|---|---|---|
| 1 | Caller is blocked | | | | | | |
| 2 | User is in Do Not Disturb mode | | | • | | | • |
| 3 | Incoming Call is directed for the user | • | • | • | • | • | • |
| 4 | Calls marked as "Private" | • | • | | • | • | • |
| 5 | Calls addressed to a particular EPID | • (only specified device) | | | | | |
| 6 | User is Offline | | • | • | • | • | • |
| 7 | User is "appear offline" | | • | • | • | • | • |
| 8 | User declined using 603 with Ms-Decline-Scope: All | • | | | | | |
| 9 | User declined using 6xx | • | • | • | | | • |
| 10 | Team member calls user | • | • | • (originating team member is excluded) | • | • | • |
| 11 | Video Only Calls | • | | | | | |

FIG. 22

| No. | Scenario | User phone rings | Simul ring | TeamCall ringing | Forward Immediate | Forward Unanswered | Voicemail |
|---|---|---|---|---|---|---|---|
| 1 | Caller is blocked | | | | | | |
| 2 | User is in Do Not Disturb mode | | | | | | |
| 3 | Calls addressed to a particular EPID | ● (only specified device) | | | | | |
| 4 | User is Offline | | | | | | |
| 5 | User is "appear offline" | (call silently rejected by endpoint) | | | | | |
| 6 | User declined using 603 with Ms-Decline-Scope: All | ● | | | | | |
| 7 | User declined using 6xx | ● | | | | | |

FIG. 23

| No. | Scenario | User | Team Member A | Team Member B |
|---|---|---|---|---|
| 1 | User Picks up the Call | Conversation History in CH folder (Generated by Communicator or IP Phone) | - | - |
| 2 | Team Member A Picks up the Call | Missed Call in Inbox indicates that call was picked up by Team Member. (Generated By Server) | Conversation History in CH folder indicates that call was picked on behalf of. (Generated by Communicator) | - |
| 3 | Call was not picked up, went to voicemail | Voicemail Message (Generated By Server) | - | - |
| 4 | Caller disconnects before the call is picked up | Missed Call in Inbox (Generated by Server) | - | - |
| 5 | Call Forwarding Fails on the server | Forwarding Failed Message (Generated by Server) | - | - |

FIG. 24

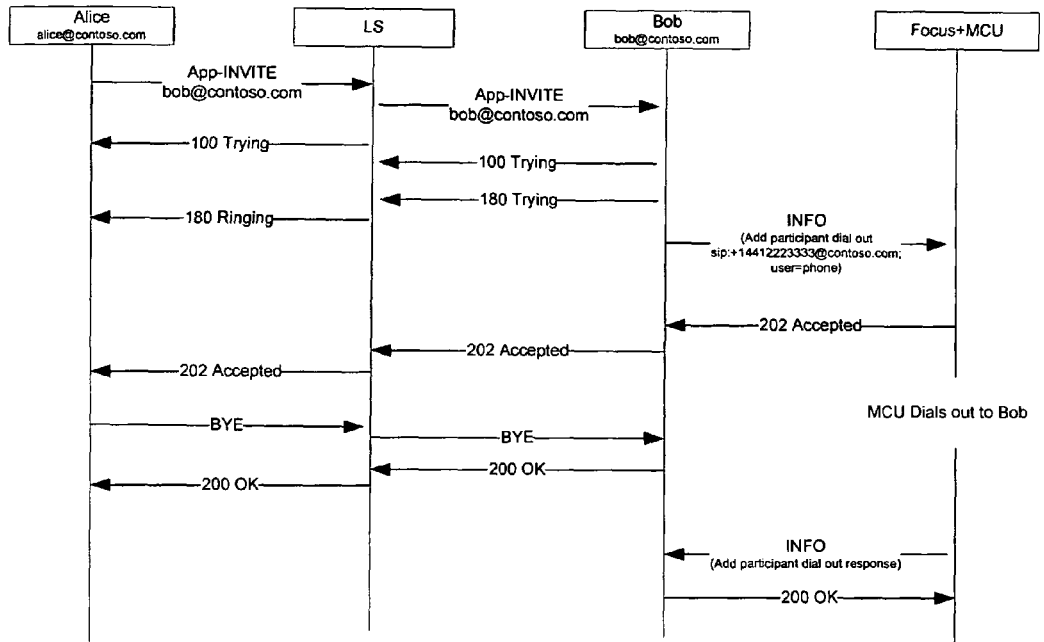

FIG. 51

| No. | Rule | Category | Stored in | Comment |
|---|---|---|---|---|
| 1 | General Rules for all incoming calls | routing | Low Container | This set of rules is applied to all incoming calls, and is configured from Options page. |
| 2 | Allow Interrupt Rules | routing | Exceptions Container | This is identical to set of rules as #1 with the difference that OC may never publishes the DND flag to this container. |
| 3 | Blocking Rules | routing | Blocked List container | This is a static set of rules on how blocking should work. These rules may never change and are not configurable by the user. |

FIG. 52

|  | Ring Me Only (all features Off) | Ring me first then Team | Ring me and team Simultaneously | Ring Team Directly, do not ring me | Forward Call | Simultaneous Ring with PSTN number |
|---|---|---|---|---|---|---|
| Flag | " " | "teamring_simultaneous" | "teamring_simultaneous" | "teamring_direct" | "forward_immediate" | "simultaneous_ring" |
| All Team members ring together | User: 20<br>Team1: 0<br>Team2: 0<br>Total: 20 | User: 10<br>Team1: 0<br>Team2: 10<br>Total: 20 | User: 0<br>Team1: 0<br>Team2: 20<br>Total: 20<br>Note: one way to make the simultaneous ring with team possible is to set user time to zero. The server accumulates ring time and will therefore ring the user and team together for 20 seconds. | User: 10<br>Team1: 0<br>Team2: 10<br>Total: 20 | User: 0<br>Team1: 0<br>Team2: 0<br>Total: 20<br>Note: The ring time is irrelevant in this case, server will have a static time of 60 secs | User: 20<br>Team1: 0<br>Team2: 0<br>Total: 20 |
| One member randomly ahead | - | Add "one_ahead" flag<br>User: 10<br>Team1: 5<br>Team2: 5<br>Total: 20 | Add "one_ahead" flag<br>User: 0<br>Team1: 5<br>Team2: 15<br>Total: 20 | Add "one_ahead" flag<br>User: 10<br>Team1: 5<br>Team2: 5<br>Total: 20 | NA | NA |

FIG. 53

| No. | Name | Type | Default | Values/Range | Representation |
|---|---|---|---|---|---|
| 1 | Ring Duration (seconds) | Number | 20 | 20 – 120 | The client actually breaks this time into four parts which the server understands, depending on the option selected. Note that the algorithm is: Static ring user first for 10 seconds, remaining team. Or Static ring user first for 10 seconds, 1 person randomly ahead for 5 seconds more and remaining team.<br>user: specifies the time the user's registered end points are ringed. If Ring me and Team Simultaneously is used, then the value of User is fixed at 10 seconds.<br>team1: specifies the time duration for ringing the first person. This is always fixed at 5 seconds if used.<br>team2: specifies the time duration for ringing the rest of the team. This may always set to (Total Time minus User minus Team1)<br>total: total time (used in conjunction with call forward immediate, and unanswered call forwarding).<br>Note that the server will accumulate the ring time if endpoints from the previous step are not available. E.g. if there are no registered end points for the user, the team1 time will include the time allocated for user. |
| 2 | Flag: Forward, Simultaneous Ring, Team Ring | Flag | - | forward_immediate teamring_direct teamring_simultaneous simultaneous_ring | These values are stored as a flag. One or more flags can be specified and are separated by a comma. Example:<br>`<flags name="features" value="teamring_direct, offline_no_teamring"/>`<br>Note the following favors of team ringing may be obtained by adjusting the team ring timers when teamring_simultaneous flag is used:<br>ring me first for 10 seconds before team<br>In addition, the following modifiers can be added to the teamring flags:<br>offline_no_teamring<br>one_ahead<br>The DND flag may always be present in the list of flags. The client has the option of turning the DND off by not providing this flag.<br>Dnd<br>If the user checks the "only during working hours" setting, then the following flag may be added to the list of flags:<br>work_hours |

FIG. 54A

| 3 | Do Not Disturb Time | | | | This is a time value that indicates when the DND is valid. It is only applied if the DND flag is specified.<br>Note that the time can include a start time and an end time to the range.<br><time name="dnd" range="-2006/02/14 11:59" utcoffset="-9:00"> |
|---|---|---|---|---|---|
| 4 | Group or Distribution Group | List | - | | OC will copy the team members from the Group or Distribution list into the list. To identify which Group or DG was expanded, the Group or DG will be identified using an Id, which belongs to OC's custom namespace. The DG Id will contain the distribution groups' email address.<br><list name="team"<br>    oc:GroupType="dg"<br>    oc:GroupId="dg@contoso.com" ><br><target uri="sip:bob@ms.com"/><br><target uri="sip:sally@ms.com"/><br><target uri="sip:jeff@ms.com"/><br></list> |
| 5 | Work Hours Start Time | String | 0000Z | | Working time is stored in the <time> element. Note that this element does not specify the Timezone. The timezone is specified under the <timezone> element. If there is no <timezone> element, then UTC time is assumed.<br>Example:<br><time name="work hours"<br>    dow="mon,tue,wed,thu,fri"<br>    range="8:30-11:59,13-17:00"> |

FIG. 54B

| | | | | | |
|---|---|---|---|---|---|
| 6 | Work Hours End Time | String | 2359Z | | |
| 7 | Working Days | String | - | | |
| 8 | Timezone | String | | | OC will pick up the Timezone from the `<timezone bias="tzi.Bias">`<br>`<standard name="tzi.StandardName"` (name is optional)<br>`bias="tzi.StandardBias"`<br>`year="tzi.StandardDate.wYear"`<br>`month="tzi.StandardDate.wMonth"`<br>`dayofweek="tzi.StandardDate.wDayOfWeek"`<br>`day="tzi.StandardDate.wDay"`<br>`hour="tzi.StandardDate.wHour"`<br>`minute="tzi.StandardDate.wMinute"`<br>`/>`<br>`<daylight name="tzi.DaylightName"` (name is optional)<br>`bias="tzi.DaylightBias"`<br>`year="tzi.DaylightDate.wYear"`<br>`month="tzi.DaylightDate.wMonth"`<br>`dayofweek="tzi.DaylightDate.wDayOfWeek"`<br>`day="tzi.DaylightDate.wDay"`<br>`hour="tzi.DaylightDate.wHour"`<br>`minute="tzi.DaylightDate.wMinute"`<br>`/>`<br>`</timezone>` |
| 9 | Immediate Forward Destination | List | - | | This is stored as a list with a single element. The following can be the values<br>Phone or SIP URI<br>Application=voicemail<br>`<list name="forwardto">`<br>`<target uri="sip:+2223334444@ms.com;user=phone"/>`<br>Or<br>`<target application="voicemail"/>` |
| 10 | Simultaneous Ring numbers | List | | | Use the `<list>` construct for this<br>`<list name="simultaneous_ring">`<br>`<target uri="sip:bob@ms.com"/>`<br>`</list>` |
| 11 | Unanswered Forward Destination | List | | | This is stored as a list with a single element. The following can be the values<br>Phone or SIP URI<br>Application=voicemail<br>`<list name="forward_unanswered">`<br>`<target uri="sip:+2223334444@ms.com;user=phone"/>`<br>Or<br>`<target application="voicemail"/>`<br>`</list>` |

FIG. 54C

FORWARDING CALLS IN REAL TIME COMMUNICATIONS

BACKGROUND

Call forwarding is a known feature of a communication system that is offered by most telephony and PBX vendors. The simplest form of call forwarding is to forward calls received at one number such as an office phone to another specific number such as a mobile phone or a residential phone. While this simple scheme is useful to many people, it often does not satisfy completely the needs of a corporate customer. A corporate customer may require more complex call forwarding features which, if present, may be cumbersome to activate and, in some cases, may be enabled only by IT administrators. End users often find themselves not using any of more advanced features provided for call forwarding operations because the features are not easily discoverable and are difficult to set.

Accordingly, it is desirable to provide a system, method and user interface that allows advanced call forwarding features to be more easily configured and navigated by a user and further provides for enhanced call forwarding features.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some embodiments of the system described herein control forwarding of an incoming call. The system receives the incoming call directed to an original recipient. Forwarding settings are processed for routing said incoming call. The forwarding settings may include a listing of at least one group having more than one member and at least one forwarding instruction based on the at least one group. The incoming call is forwarded according to said at least one forwarding instruction to at least one first member and at least one second member of said at least one group.

Some embodiments of the system described herein control forwarding of an incoming call by determining if a user communication device is accepting incoming calls. If the user communication device is accepting incoming calls, the incoming call is routed to the user communication device. If the user communication device is not accepting incoming calls, the system forwards the incoming call according to at least one forwarding instruction. The forwarding instruction includes information identifying at least one group having more than one member, wherein the incoming call is forwarded to at least two members of the group.

Some embodiments of the system use presence information to route forwarded calls. In some embodiments, an Inbound Routing Model may determine routing rules and preferences from scripts and XML documents. In some embodiments, the Inbound Routing Model may use a client-generated preamble to determine routing rules and preferences.

Some embodiments of the system described herein provide for configuring call forwarding settings. The system includes a graphical user interface. The graphical user interface includes at least one display prompt on a computer screen. The display prompt includes at least one routing list of a group having more than one member and least one user-alterable call forward setting for forwarding an incoming call. The user-alterable call forward setting includes at least one instruction for forwarding the incoming call to at least two members of said group.

DESCRIPTION OF THE DRAWINGS

FIG. 6 is a graphical tabular illustration of the Phone Status button according to the system described herein.

FIG. 7 graphically illustrates messages shown by the Communicator in accordance with a corresponding feature according to the system described herein.

FIG. 12 is an illustration of a display screen for the Ring me and . . . menu according to the system described herein.

FIG. 13 is an illustration of a dialog prompt showing a selected forwarding contact according to the system described herein.

FIG. 14 shows a graphical tabular illustration of a valid combination of Configure button settings according to the system described herein.

FIG. 15 is an illustration of a dialog prompt showing a selection for the Ring Me And . . . option according to the system described herein.

FIG. 16 shows a graphical tabular illustration of another valid combination of Configure button settings according to the system described herein.

FIG. 17 illustrates a display screen for the Communicator according to the system described herein.

FIG. 18 is a display screen showing a hover setting according to the system described herein.

FIG. 19 is a graphical tabular illustration of features and scenarios according to the system described herein.

FIGS. 22 and 23 illustrate supported forwarding rules for incoming calls according to the system described herein.

FIG. 24 graphically summarizes how Conversation History/notifications may be generated by the system described herein.

FIGS. 25-51 illustrate flow processes of various call forwarding features according to the system described herein.

FIG. 52 is a graphical tabular listing of rules that may be on a server of the system described herein.

FIG. 53 is a graphical tabular illustration showing how the settings are used to achieve a particular feature according to the system described herein.

FIGS. 54A-C are graphical tabular illustrations summarizing the various data elements that may be needed to store and roam in XML.

DETAILED DESCRIPTION

Figure 1:
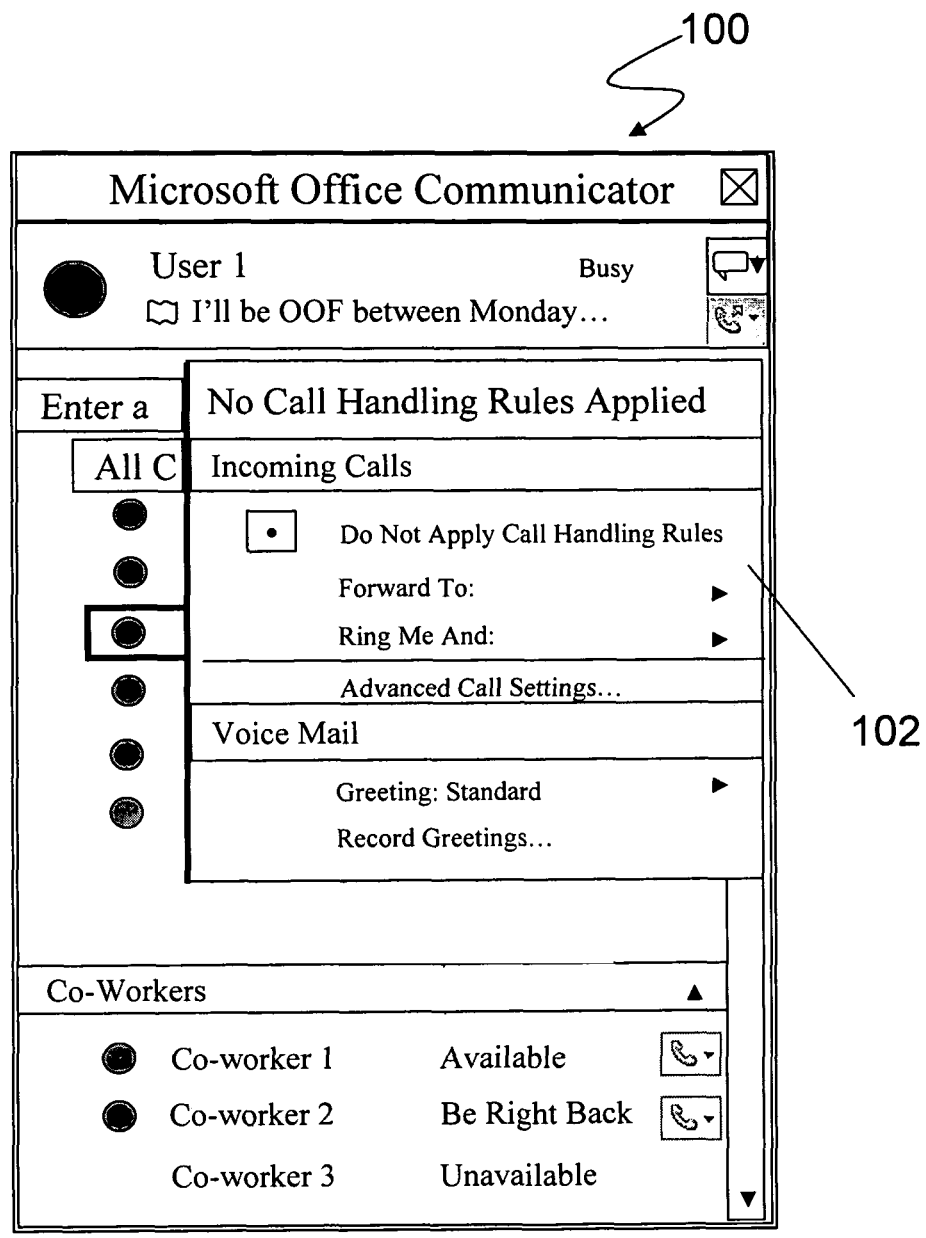
FIG. 1 is an illustration of a Communicator display screen according to the system described herein.

Described herein are various technologies and techniques for call forwarding systems and features. Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments described herein are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein may be referred to alternatively as operations, steps or modules.

The following terms and acronyms may be used herein and are explained as follows:

AVMCU—Audio Video Multipoint Control Unit;
DND—Do Not Disturb;
EPID—Endpoint ID;
GAL—Global Address List, such as in Microsoft Exchange;
GRUU—Globally Routable User Agent URI;
ICE—Interactive Connectivity Establishment—allows media to traverse firewalls;
IM—Instant Messaging;
INVITE—used for creation of a session;
IRM—Inbound Routing Model;
IW—Information Worker;
LS—Live Server, also referred to as LCS or Live Communication Server;
MPOP—Multiple Points of Presence, an aggregated view of a user's presence, typically as reported or inferred from multiple communication devices;
PSTN—Public switched telephony network (which may include mobile as well as fixed communication devices);
NAT—Network Address Translators;
Presence—refers to the user's availability and willingness to communicate;
REFER—used for call transfer, call diversion, etc.;
RTP—Real-time Transport Protocol (a standardized format for delivering audio and video over packet-based networks);
SIP URI—Session Initiation Protocol Uniform Resource Identifier
STUN—Simple Traversal of UDP through NAT;
TEL URI—Telephone Uniform Resource Identifier
TURN—Traversal using Relay NAT;
UC—Unified Communications;
UDP—User Datagram Protocol;
UX—User Experience;
UM—Unified Messaging;
VoIP—Voice over Internet Protocol (i.e., IP Telephony—the routing of voice communications over the Internet or any other packet-based network; some embodiments may include multimedia such as video communications);
Deflect calls/Redirect calls—send the caller to some other number;
Retarget calls—server proxies the request to other endpoints on its own;
Forward calls—user has set a rule to automatically retarget calls to a certain destination;
TeamCall/GroupCall—where incoming calls ring a team of people that is selected by each user, as more fully described elsewhere herein.

According to various embodiments of the system described herein, the following beneficial features may be attained. Some embodiments of the system may provide: the ability to easily configure call forwarding from the Communicator's main UX; an easy to understand advanced options page for configuring Team ringing and using a group of people defined in a contact list as a team; the ability to call team and other people (team ringing) when the user's phone rings directly, simultaneously, rings the user first and then team members, and/or rings one team member randomly ahead; team ringing behavior that is different for an incoming team call, different for an incoming call notification for an incoming Team call, and/or indicates who the call was originally meant for; special actions for an incoming team call from a notification pop-up window (or Toast) (e.g., send to original user's voicemail, send calls to Boss, send to user's mobile communication device, etc); settings to disable incoming Team ringing during certain times of the day and/or settings to disable incoming Team ringing in a specific device; feature interactions with other features when team ringing takes place, including Do Not Disturb behavior, Blocking Behavior, Call Forwarding on the team member, Stop ringing the team members and reject the call entirely, and Appearing offline; and storage of call forwarding rules according to the user's presence document certain embodiments of such rules may include forwarding calls automatically based on the user's presence state, forwarding calls when user's state is offline, forwarding calls based on other presence states, such as, for example, "In a Meeting", or "Busy," and/or forwarding calls based on how many calls in which the user is already involved. Some embodiments of the system may provide for flexible call processing rules based on specific identifications of groups, such as the following groups: "people near me," "people in my workplace" and/or "personal contacts." Some embodiments of the system may provide for XML language for storage of call forwarding rules. Some embodiments of the system also may allow for certain people to always reach the user, allows people to interrupt the list, and/or allows for the ability to set a different forwarding number or forwarding behavior for certain people. Under some embodiments, the system also provides for simultaneously ringing a PSTN telephone number with a desk phone and/or forwarding calls when unanswered to various destinations such as, but not limited to, voicemail, email, IM, or PSTN number of the callee or designated third parties. Some embodiments of the system also provides for signaling protocol changes for Team call, distinguishing incoming Team call from other forwarded calls. Some embodiments of the system may allow for Call Forwarding only during pre-defined hours, rules specified by user that only execute during pre-defined hours, and/or obtaining the call forwarding hours automatically from Outlook including Outlook calendar and/or Outlook's working hours setting.

In one embodiment, a system is disclosed for configuring and integrating call forwarding rules via a graphical computer interface. The system may be referred to herein as a "Communicator" or an "OC". Integrated features may include Inbound Routing features, roaming forwarding rules, and VoIP features such as Executive/Assistant, TeamCall etc., as further described elsewhere herein. FIG. 1 illustrates a call-handling rules selection display screen 102 of the Communicator 100 according to the present system. In the embodiment shown, the Communicator 100 is running on a client device such as a mobile communication device or personal computer. In some embodiments, Communicator 100 is client-side software that interacts with Live Server to provide communication capability. In some embodiments, Communicator 100 could operate in a peer-to-peer environment and provide communication capability without interacting with Live Server.

Figure 2:
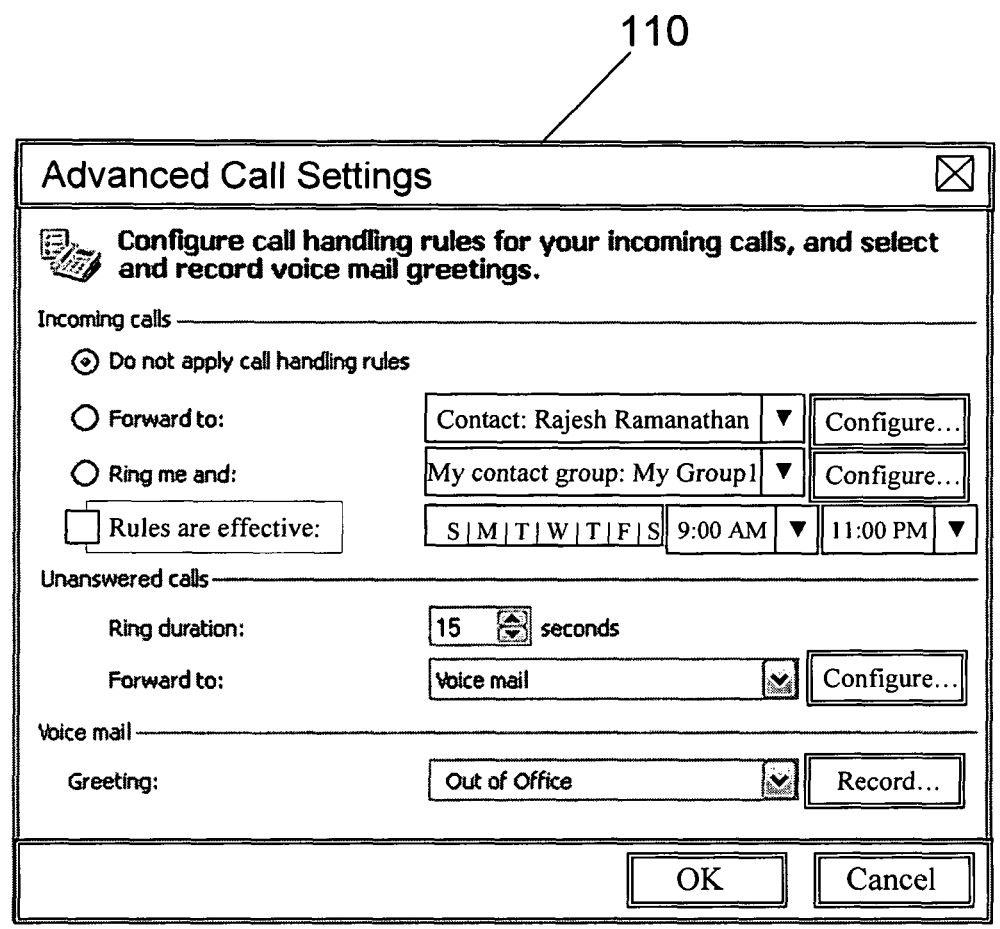
FIG. 2 is an illustration of a display screen for configuring Advanced Call Settings according to the system described herein.

The following describes features provided by some embodiments of the Communicator system. A user selects the phone options and is presented with the current call settings. The user selects "Advanced Call Settings" and is presented with advanced option that allows configuring team calling etc, as further described elsewhere herein. FIG. 2 illustrates a display screen 110 showing the call forwarding options for the Advanced Call Settings. Using the present system, call forwarding rules may be predictable and easy to understand and change. Further, the current forwarding state may be clearly presented to the user at all times. For example, an embodiment of the current system may provide for the following operability: (1) the user can quickly turn on call forwarding to selected destinations; (2) the user can quickly turn off all rules on their phone; (3) the users can immediately determine that a call forwarding or a rule is set on the phone; (4) the user can set other phones to ring, such as a team or group; (5) the user can configure a time for forwarding calls or ringing their group/team, for example time configuration allows the user to set days of the week and time when the forwarding rules may be applied on an incoming call. If the incoming call is to be forwarded immediately, no team signalization may occur and incoming calls may be forwarded to the designated destination (e.g., SIP URI, PSTN phone number, voicemail, etc.) immediately. The above-noted features are further described elsewhere herein.

According to some embodiments of the present system, users are able to set their forwarding settings from the Phone Status button in the "my status" area of the Communicator. For purposes of ease of the user experience, the entry point for the user to change their incoming call related settings may be configured to only be in the "my status" area. There are three main parts to the user experience (UX), described as follows. One part is the Phone Status button and menu in the my status area. The Phone Menu allows the user to set immediate call forwarding or get to the more advanced settings (Advanced Call Settings). The second part is the Advanced Call Settings page that allows the user to configure call forwarding immediate, TeamCall/GroupCall or set unanswered call forwarding destination. The third part is the Contact List that shows visible feedback of the Group or Distribution Group that has been selected by the user as a TeamCall/GroupCall group.

Figure 3A:
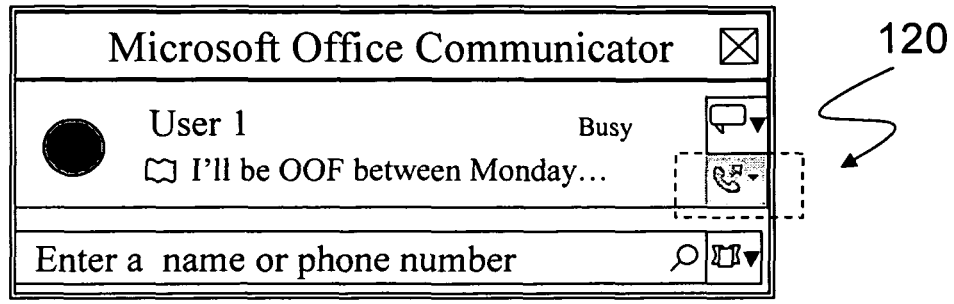
FIGS. 3A-3G are illustrations of display screens showing the user experience according to the system described herein.
Figure 3B:
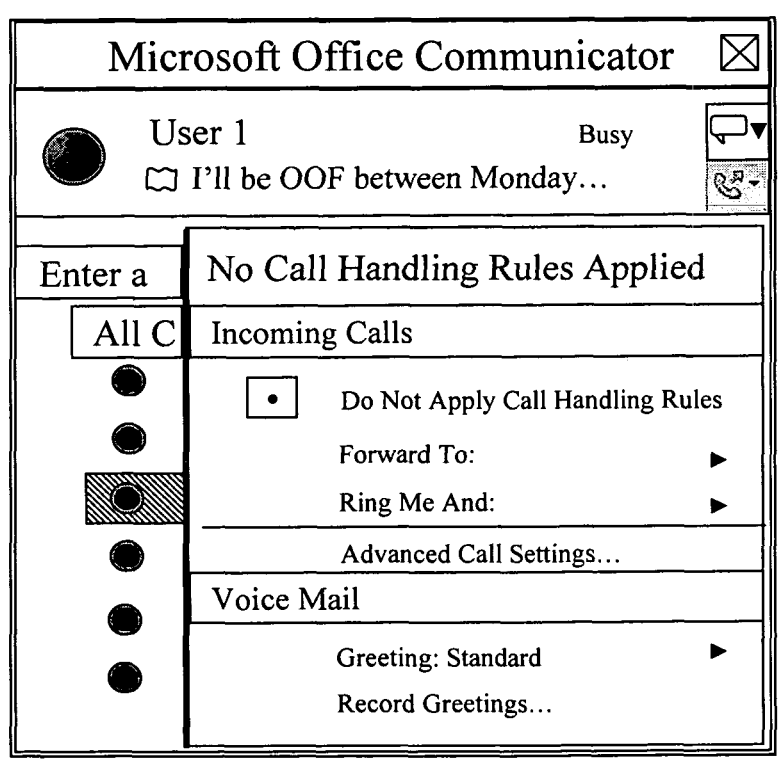
Figure 3C:
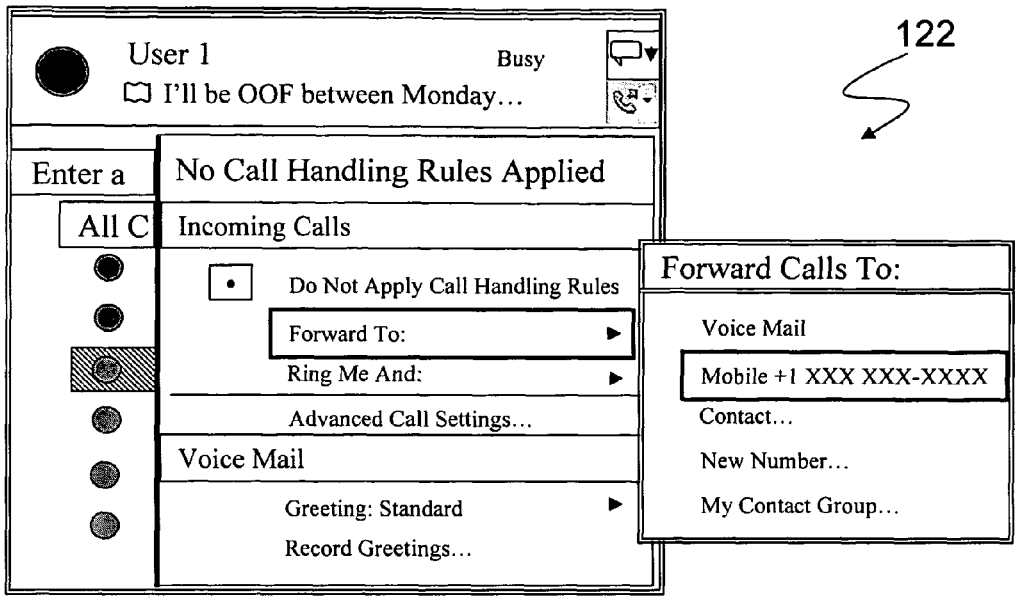
Figure 3D:
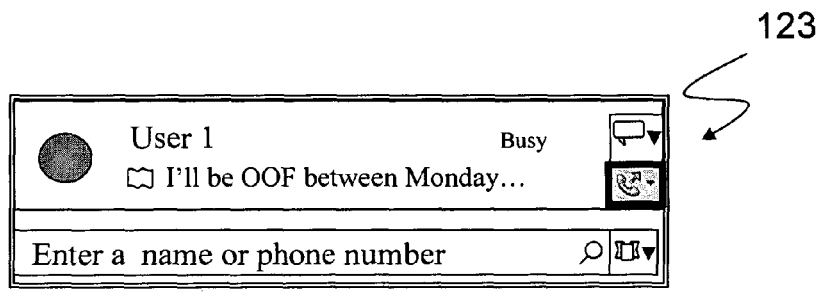
Figure 3E:
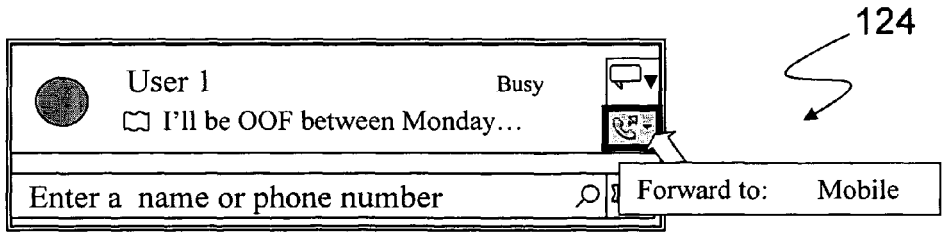
Figure 3F:
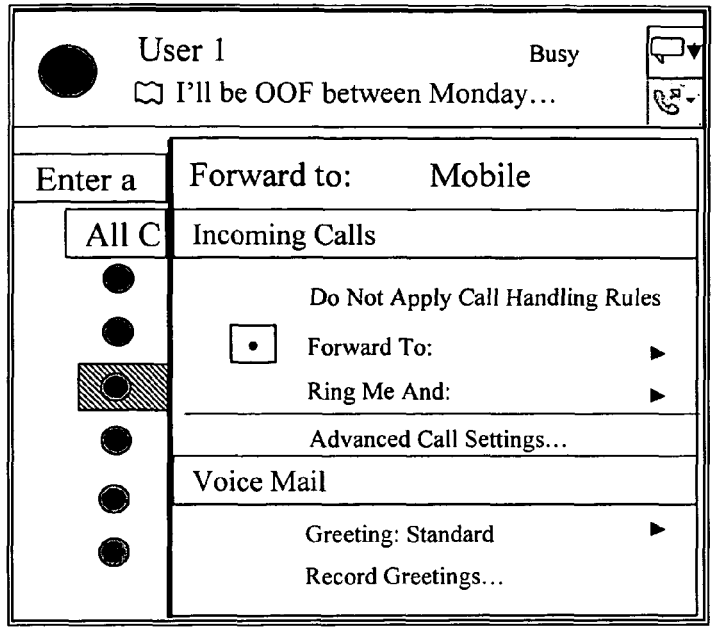
Figure 3G:
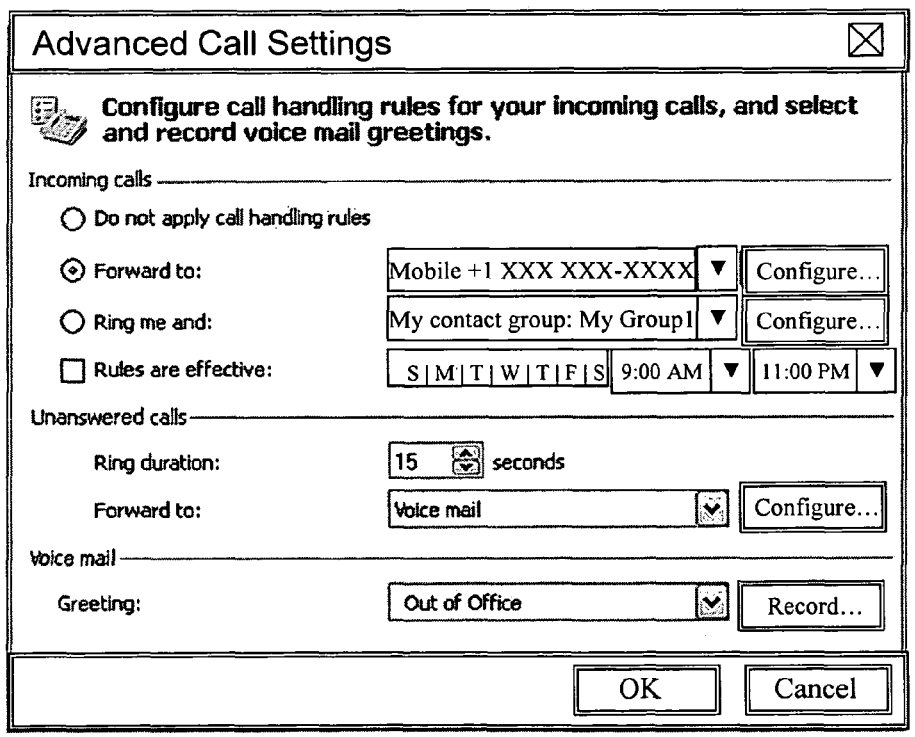

The following example, as illustrated in FIGS. 3A-3G, schematically illustrates the user experience provided by the Communicator system 100. As shown in FIG. 3A, the user clicks on the phone options in my status area 120. As shown in FIG. 3B, the current phone forwarding status is shown and a menu drops down 121. As shown in FIG. 3C, the user hovers on Forward To: and selects to set it to his mobile number 122. As shown in FIG. 3D, the phone status area displays feedback that the call is being forwarded 123. As shown in FIG. 3E, the phone status area shows hover feedback on the forwarding status 124. As shown in FIG. 3F, when the user clicks on the phone status, then the current selection and forwarding location is shown 125. As shown in FIG. 3G, the user may choose to select Advanced Call Settings to set the working hours for forwarding the calls 126.

Figure 4:
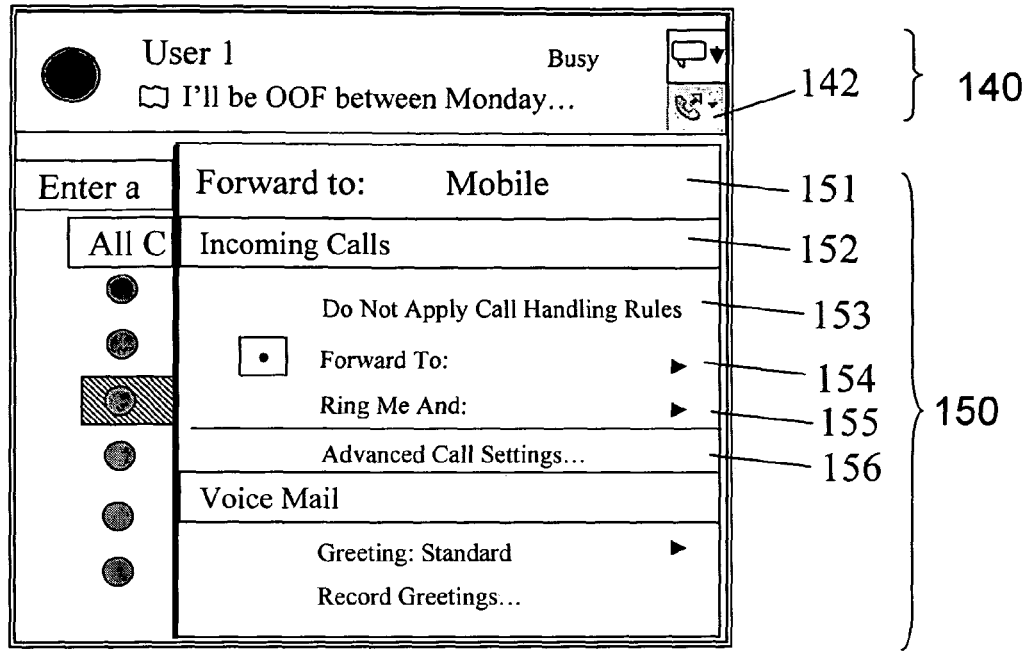
FIG. 4 is a display screen showing the Phone Status and Phone Menu dialogs according to the system described herein.
Figure 5:
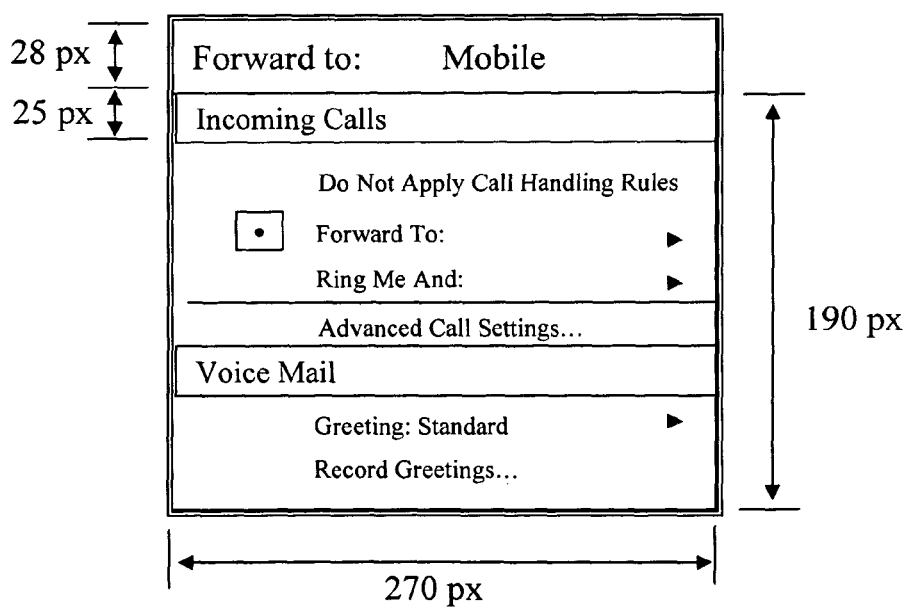
FIG. 5 is a display screen according to the system described herein.

The phone settings according to the present system will now be described. FIG. 4 shows a display screen 130 illustrating the Phone Menu 150 that is accessible from the Phone Status area 140. FIG. 5 illustrates the dimensions of an embodiment of a dialog box of the Phone Menu. The phone status button 142 in the Phone status area 140 shows the current forwarding state and allows the user to open the forwarding menu. In the embodiment shown, this is the main entry point for configuring the forwarding options. The Phone Menu 150 has the following components. The Forwarding Summary area 151 displays the current rules that are being applied to the user's phone. This region may not be clickable. A Separator 152 acts as a section header, labeled Incoming Calls. In the Do Not Apply Call section 153, handling rules may be a quick way to turn off all rules on the phone. In the Forward To (or, alternatively, Forward Calls To) section 154, the user may select the fly out to set the immediate forwarding to his preferred number, to a contact or to a new number. In the Ring me and setting section 155, the user can select this fly out to set ringing to one of the preconfigured groups. In the Advanced Call Settings section 156, the dialog allows the user to make advanced settings, add a time or set the simultaneous ring phone device.

As shown in FIG. 6, the phone status button (142, see FIG. 4) may provide indications to the user of the state of the call forwarding features. The phone status button may provide a tool tip that describes the current forwarding settings on hover. For example, if call forwarding immediate was selected, it would provide feedback indicating the selection. The hover feedback may provide the same information that is available in the Forwarding Summary area when the user clicks on it.

The following are more detailed description of the areas and features shown in FIG. 4.

The Forwarding Summary area allows the user to view at a glance what the current forwarding status for the phone is. FIG. 7 graphically illustrates messages shown by the Communicator in accordance with a corresponding feature. The background color of the forwarding summary area may be controlled to be different if there are no call handling rules that are currently set by the user. In some embodiments, text may not wrap in this area. If not, as the text grows larger, it is truncated by ellipses. An example scenario where this can happen is when the Forward To destination is a SIP URI without a display name.

The following is example syntax for the summary:

<immediate forwarding or selected rule>:<forwarding destination>

Syntax line 1 may indicate one of the following: No Call Handling Rules Applied (default); Do Not Disturb; Forward calls to a registered device name (Mobile, Home, Other), a phone number, a name of a person or a SIP URI of the person if there is no display name, a name of a group or a distribution group and/or voicemail; and Ring Me And a name of a group or a distribution group, a registered device name (Mobile, Home, Other), and/or a phone number.

<unanswered call setting>:<unanswered call destination>

Syntax line 2 may indicate that unanswered call destinations can be: a registered device name (Mobile, Home, Other), a phone number, and/or a name of a person.

<effective time settings>: <time setting>

Syntax line 3 may only be used if the user has selected to apply rules during a specific time.

Selecting Do Not Apply Call turns off all rules, including call forwarding or ringing. Note that the user's unanswered calls may continue to be forwarded to the number indicated in the advanced settings. When the user selects this option, then the configuration changes may be made immediately.

Selecting Forward To allows the user to specify an immediate call forwarding location. If the user had never selected any forwarding location, then the Forward To: shows blank. Clicking on this area immediately opens the forwarding locations sub menu and allows the user to select a number. Once the number is selected, it is reflected back in the Forward Calls To: string. If the user has selected a phone number from the personal numbers, then that number is shown preceded with the name of the location.

Figure 8:
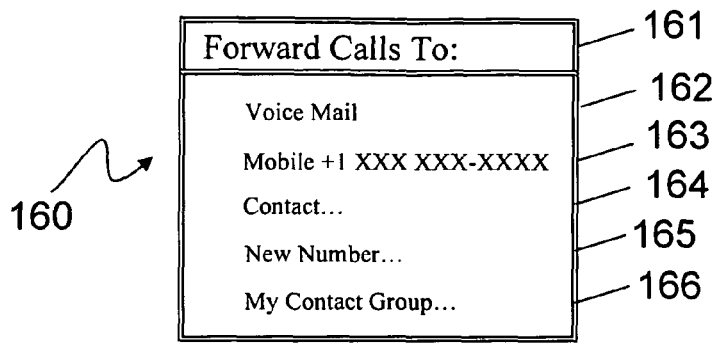
FIG. 8 is an illustration of the Forward Calls To fly out screen according to the system described herein.

FIG. 8 is an illustration of the Forward Calls To fly out screen 160 according to one embodiment of the system. The Forward Calls To fly out provides the current phone numbers and voicemail as possible forwarding destinations. The fly out allows the user to set a new number as a forwarding destination. In the example below only the Mobile number is shown. The Forward Calls To area may show the user's other numbers as well (Mobile, Home, Other), except the Work phone (which may be excluded because it is the same number as the current phone). The Header 161 is a standard, non-clickable area. Selecting Voice Mail 162 sets the default destination as voicemail. The Mobile option 163 may be the user's personal number or numbers configured from Options). The Contact . . . option 164 is used to select a contact from a database of contacts such as, for example, an Outlook contact folder, GAL, etc. The New Number option 165 brings up an Enter Phone number dialog and allows the user to enter phone numbers that are not in the contact database. The My Contact Group option 166 brings up the GroupCall/TeamCall selector. The user left or right clicks on a selection or the menu is closed when the user clicks outside without making any selection. In the latter instance, the current selection would not be changed.

Figure 9A:
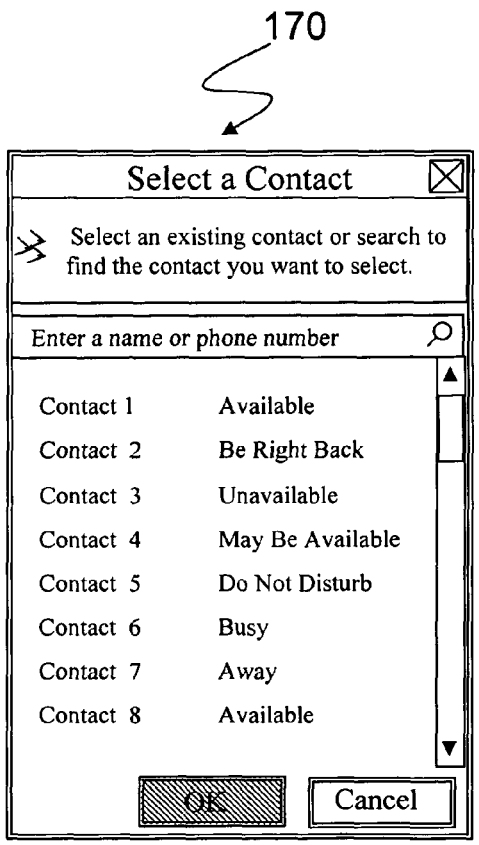
FIGS. 9A and 9B illustrate display screens of the contact picker according to the system described herein.
Figure 9B:
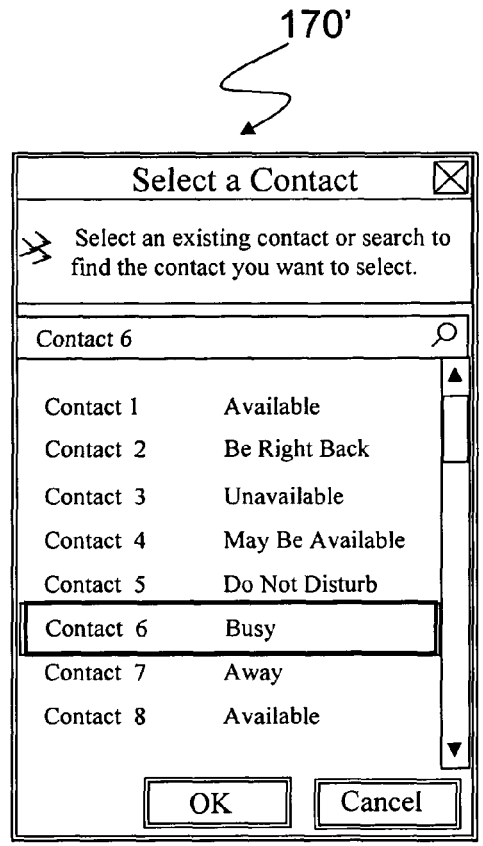

Selecting Contact . . . from the Forward To fly out brings up the contact picker and allows selecting a contact. FIGS. 9A and 9B illustrate the contact picker display 170, 170'. In some embodiments, only the SIP URI of the contact is selectable, i.e. the user cannot select any other phone numbers. The user can search for contacts in GAL, or Outlook contacts. In some embodiments, the system may be configured so that a user cannot multi-select. In some embodiments, the system may be configured so that the user cannot start an IM from this dialog or start a call. In some embodiments, the user can add an arbitrary SIP URI. When there is a previously selected contact (e.g. the user had used forwarding to Contact feature earlier and then turned if off), some embodiments of the contact picker may show up with the name of that contact in the find well. In this case, the OK button would be enabled and the default (see FIG. 9B). When there is no previously selected contact (e.g. user had not used this feature or had used call forwarding to a number), then the contact picker may have the OK button disabled till the user makes a selection (see FIG. 9A).

Figure 10:
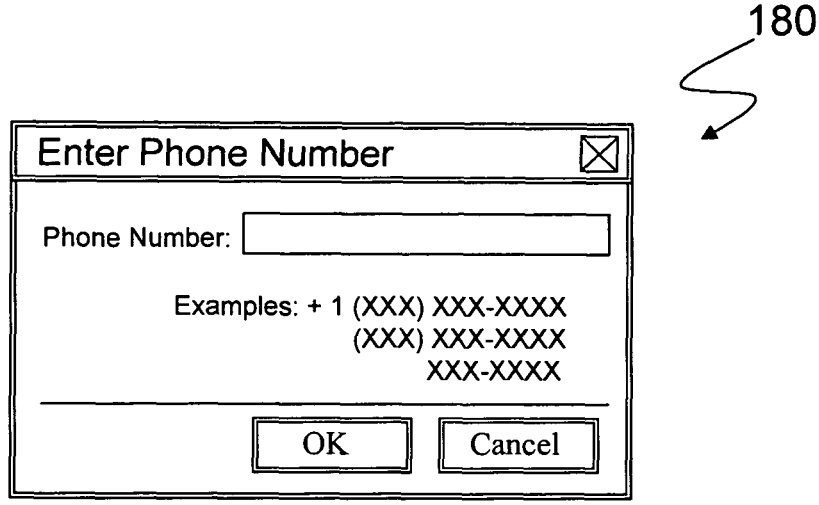
FIG. 10 is an illustration of a display screen showing the Enter Phone Number dialog according the system described herein.

The new phone number entry dialog may be shown when the user selects "New Number . . . " in the Forward Calls To fly out. When the user selects New Number . . . , a "edit phone number" 1-off dialog is shown that allows the user to enter a phone number. It should be noted that the dialog is modal and the user would need to take an action, and the dialog allows the user to enter any number in any format, including international numbers. FIG. 10 illustrates a display screen 180 showing the Enter Phone Number dialog according to one embodiment of the system.

Figure 11:
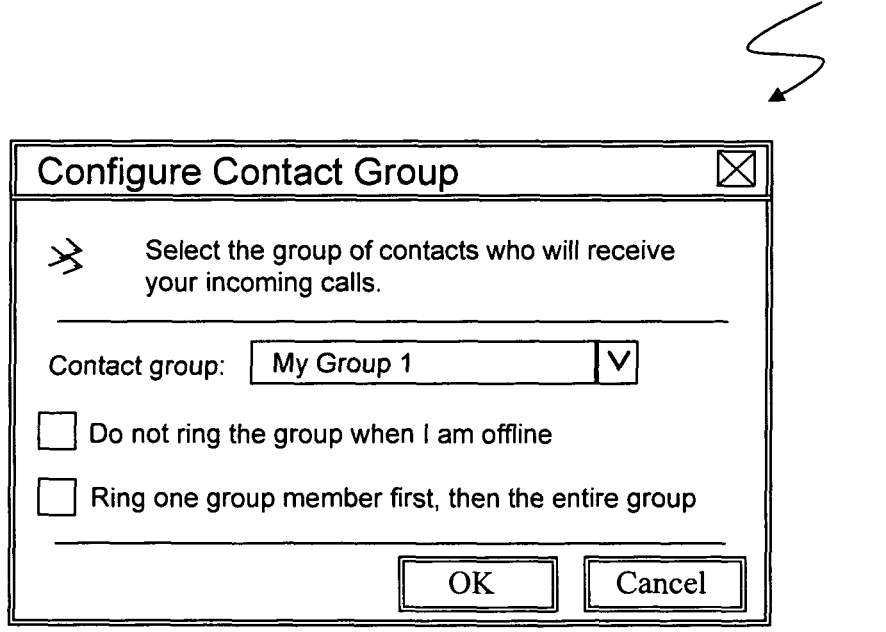
FIG. 11 is an illustration of the display screen for the configure contact group dialog according to the system described herein.

The configure contact group dialog may be shown when the user selects "My Contact Group . . . " from the Forward Calls To fly out. FIG. 11 is an illustration of the display screen 190 for the configure contact group dialog according to one embodiment of the system.

Both the check boxes may be OFF by default. The dropdown may be initialized with the list of Groups and Distribution Groups in the user's contact list. The user will have at least one group by default. The first group is shown in the dropdown. The system may be configured such that users would need to use preconfigured groups to be able to add the groups to the GroupCall/TeamCall list. The groups in the dropdown may be arranged according to the order in which they appear in the Contact List in the Standard view. It is also contemplated to set a team ringing directly from a buddy list in the Communicator. The scenario may be that the user selects a group from the buddy list, right clicks and sets incoming calls to ring the group, as described elsewhere herein.

The Ring Me And . . . menu allows the user to ring the user and a group, or simultaneously ring the user with a PSTN number. FIG. 12 is an illustration of a display screen 200 for the Ring me and . . . menu. The following options may be provided. Note that 202, 203 are Simultaneous Ring PSTN number options, whereas 204 and 205 are TeamCall/GroupCall options, as discussed elsewhere herein. The Header 201 is a standard, non-clickable area. The Mobile option 202 shows the user's personal number configured from Options, and may include other numbers—Home/Other if the user filled them in. The New Number option 203 brings up Enter Phone number dialog and allows the user to enter 1-off phone numbers. The After delay, My Contact Group option 204 allows the user to select a contact group, but ring them after a 10 second delay. The My Contact group option 205 allows the user to ring the team immediately when the user's phone rings. Selecting this brings up the Configure Contact Group modal dialog (see, for example, FIG. 11).

Referring to FIG. 3G, the Advanced Call Settings dialog allows the user to view the current settings and configure advanced features such as GroupCall/TeamCall, Simultaneous Ring or call forward on unanswered. The various components of this dialog are described as follows. The Configure information section is not clickable and displays information on the functionality of the section. The Do Not Apply Call handling rules section may be the default option when there are no phone rules selected. The Forward To option allows for immediate call forwarding. The Ring me And: option is the simultaneous ring phone option. The Rules are effective: option allows for selecting the working time The Ring duration: option is the total time that the user's phone would ring. The Forward to: unanswered call option provides for forwarding to a destination, such as Voice Mail.

Referring still to FIG. 3G, the Forward To: option may provide the same options as the fly out in the Phone Menu. One difference may be that the Configure button would now be used to open the Contact Picker, New Number selector or Group selector. Once an option (Contact, Number etc) has been selected, the combo box option changes to display the current selection. For example, as shown in FIG. 13, the user has selected Forward to a contact with name Rajesh Ramanathan.

FIG. 14 shows, in graphical tabular format, a valid combination of Configure button settings. When there is no contact previously selected (Combo box shows Contact: without a name following it) and the user selects Contact, then the Contact Picker is opened immediately. When the user had used forward to contact previously, then the Contact Picker is not opened immediately. The user would need to click on Configure to open the contact picker. This same rationale may apply to new number and contact group as well.

The Ring ME And . . . option may provide the same features as the fly out in the Phone Menu. One difference may be that the Configure button is now used to open the Contact Picker, New Number selector or Group selector. Once an option (Contact, Number etc) has been selected, the combo box option changes to display the current selection. As shown in FIG. 15, the user has selected to simultaneously ring the "my Team" group.

FIG. 16 shows, in graphical tabular format, another valid combination of Configure button settings. When there is no group previously selected (Combo box displays Group: without a name following it) and the user selects Contact Group then the Group Selector is opened immediately. When the user had selected a Contact Group previously, then the Group Selector is not opened immediately. The user would need to click on Configure to open the Group Selector. This same rationale applies to new number and After Delay, Contact Group.

The Rules Are Effective . . . check box may be checked OFF by default. The user can select a day with a single click selection (toggle on/off) on one of S/M/T/W/T/F/S boxes. (Alternatively, a checkbox may be added to load the rules from Outlook.) A shaded box implies selection, a white box implies that the day is not selected. The system may be configured such that the user cannot unselect all boxes and at least one day must remain selected. For setting the time, the system may be configured such that the user is able to set times only if the times are consecutive and do not roll over to the next day (for example, Start 11:00 PM and end 1:00 AM would not be allowed). The system may be configured such that The From: time has to be less than the To: time. The system may be configured so as to not allow the time settings that span multiple days (i.e. the specified time range has to be within the 24 Hr interval from 12:00 AM to 11:59 PM). If the user had End time set to 2:00 AM and now changes the start time to 1:00 PM, then the end time may automatically be changed to the next upper end time, which is 1:30 PM. The user can enter time in at thirty minute granularity. The system may be configured such that the user cannot type into the drop down and would have to select from one of the options provided. The options may scroll after eight entries. The time range may be from 12:00 AM to 11.30 PM in the options box. Alternatively, the system may be configured to pull or receive data from Outlook/Exchange12 (including Outlook calendar and/or Outlook's working hours setting) for operable working hours and other settings.

The Ring time option allows the user to set the maximum time desired for the phone to ring before the call is set to voicemail, or before call forwarding if no answer kicks in. The following are the default values for Ring duration: Min: fifteen seconds; Max: one hundred twenty seconds. The system may be configured such that the user cannot type into Ring duration box and will have to use the spinner control. If the user clicks on the spinner control for three seconds, then the control may start incrementing/decrementing in steps of five. The timer values may be configured as required. For example, a minimum time value may be set at fifteen seconds or twenty seconds.

The Unanswered Forward To: option is similar in functionality to the forward immediate option. One difference is that the group option may not be available in this selection.

When the user selects a group or Distribution List for TeamCall (or GroupCall), the main UI will reflect the selection against the name of the group. A string "GroupCall Enabled" may be included after the name of the group. FIG. 17 illustrates a display screen 210 for the Communicator system showing a GroupCall distribution list.

Referring back to FIG. 6, the Phone Status button may provide a tool tip that describes the current forwarding settings, such as hover settings. For example, if call forwarding immediate was selected, it would provide feedback as shown in the dialog box in FIG. 18. The hover feedback may provide the same information that is available in the Forwarding Summary area when the user clicks on it. Although, one difference may be that the tool tip color may remain the same.

Now will be described various call forwarding features and the logical rules for these features as applied, for example, in the Communicator. The call forwarding features described herein may be implemented in a VoIP (audio and audio/video) telephony strategy. The call forwarding features may be designed to provide for the following functionalities: allow the user to forward calls to PSTN phones; allow the user to forward calls to other users; allow team or assistant to be able to answer calls on a user's behalf; allows calls to be forwarded if unanswered by user, team or assistant; allow forwarding rules to work at predefined hours everyday; support simultaneous ringing of one other PSTN phone along with the VoIP phone; allow interoperability with other applications, for example, using an XML based call forwarding schema.

The following scenarios may be implemented by the present system and apply to VoIP (audio and audio/video) calls:

Block calls: Ichiro has added Jon to his list of blocked contacts. Ichiro does not receive any calls or voicemail from Jon. Note that no team ringing may occur for this scenario.

Do Not Disturb: Patrick is taking an important presentation and does not want his mobile to ring during this time. Patrick has configured team ringing, and also has forwarding rules set to forward calls to his mobile when his team members do not pick up. When Patrick is taking the presentation, Communicator may show an incoming call notification with the option to set Do Not Disturb. Patrick selects Do Not Disturb and further calls ring his team or go to voicemail. When Patrick is finished taking the presentation, his DND status is reset by Communicator automatically.

Forward Call Immediately—Quick Forward: Patrick is expecting an important call from a customer. He chooses to forward incoming calls to his mobile as he does not want to ring his assistant or team. After he receives the call, he selects to remove the immediate forwarding.

Forward Call Immediately—Work hours: Patrick wants incoming calls to be forwarded to his mobile only during work hours.

Forward Call Immediately—Travel: Patrick does not want to miss any calls when he is traveling. He in on the road every Monday from 9.00 am to 12.00 pm and sets calls to be forwarded to his mobile number during this time.

Simultaneous ring: Patrick is away from his desk a lot of times. He is either visiting a customer, or is in a meeting within the company. He wants all incoming calls to always ring his mobile phone number along with this desk phone so that he is able to pick up the call from either location.

Simultaneous ring—Work hours: Patrick wants incoming calls to simultaneously ring his mobile only during work hours.

Ring my Assistant or Team: Melissa works in the sales office of Dial corp. She wants every incoming call to her number be picked up by someone else when she is not able to answer within the first 10 seconds (TeamCall).

Other scenarios where team calling may be useful:

Ad-hoc group: Patrick is having a critical project for a customer and is working with two other members of this team. He wants all incoming calls to his number to ring his team members so that they can talk to the customer.

Helpdesk: Ichiro sets up an informal helpdesk and adds two other of his team members so they can take support calls on his behalf.

Customer Support: Sara works in a bank's customer service desk and often gets calls from customers regarding specific product offerings. She wants someone from her team to pick up the call so that the customer's questions are addressed immediately.

Distribution Group: Patrick has created a distribution group "Patrick' Team" that contains all his team members. Patrick can choose to add this as his TeamCall group.

Assistant always: Patrick's incoming calls are always received first by his assistant Sara. Sara talks to the person on the line and calls Patrick to consult him about the call. Patrick decides to accept the call and Sara transfers the call to Patrick.

Other scenarios include:

First me, then me and assistant: Patrick is in a meeting and wants the call to ring his assistant Sara when he does not pick up within the first 10 seconds.

Me and Assistant together: Patrick's incoming calls always rings his assistant Sara as well. Sometimes Patrick decides to ignore the call and let Sara pick up the call depending on who the caller is.

Work Hours: Patrick wants his incoming calls to be sent to his assistant only during work hours. Outside work hours, he wants his calls to be sent to voicemail directly.

Private Calls: Sara wants to talk to Melissa only, and does not want to talk to her team members. Sara initiates a new call and marks it as "private". Melissa's Team Ringing rules are not applied to the call. Note, this feature may not be available for the scenario where Patrick has set to ring his assistant only.

Appear Offline: Patrick is working from home and is logged on to Communicator. Patrick has configured team ringing, and also has forwarding rules set to forward calls to his mobile when his team members do not pick up. Patrick changes his presence state to "Appear Offline", and does not want to take any incoming calls when in this state. All incoming calls to Patrick are routed to his team first, when no one picks up then his forwarding rules are applied and his mobile starts ringing.

Do not ring my team when offline: Patrick wants his Team-Call settings to be effective only when he is logged on to OC at work. When he goes home, he logs off his computer, and his call forwarding settings apply for incoming calls.

Automatic Assistant Configuration: Patrick has added Sara as his Delegate in Outlook so Sara can also look at Patrick's calendar etc. When Patrick starts OC, he automatically gets an option to add Sara as his TeamCall delegate.

Forward unanswered calls: Patrick wants to forward calls to his mobile number when his assistant Sara does not answer the call. Melissa wants all incoming calls to her number to be forwarded to her mobile only when no one in her team picks up the call. Melissa wants all incoming calls to her number to be forwarded to her receptionist when no one picks up the call.

Deflect Calls: Patrick gets an incoming call and selects to deflect it to voicemail. Patrick has set team ringing for his Assistant Sara. When Sara sees an incoming call notification for Patrick, she selects to deflect it to her mobile phone.

The following scenarios may be implemented by the present system and apply to VoIP (audio and audio/video) calls. A Location based scenario in which Patrick chooses to forward incoming calls to his mobile if he is not logged on to any clients so that he does not miss calls during work hours. A Location based scenario in which Patrick uses Communicator in his home computer. He sets a rule to forward incoming calls to his home phone when he is using his home computer. A Static scenario in which Patrick chooses to forward all incoming calls to his mobile number.

FIG. 19 is a graphical tabular illustration of call forwarding features proved by various embodiments of the present system. The call forwarding features may change based on the system architecture.

The following describes the high level concepts behind the present system according to various embodiments. The concepts follow the logical steps of what happens when an incoming call is received.

The first concept concerns the "time" dimension. Users often want that the rules for incoming calls work only during specific times, which is usually their working hours. For example, it may not be desirable for a user to have calls statically forwarded outside work hours, or even the calls to be picked up by the assistant outside work hours. The concepts in the sections below may apply only after the time dimension rule is met. Note that it is optional for a user to provide a working time set for the rules. Also, the present system may simplify the design to have a single time element that applies to all incoming call rules, so that users are able to clearly understand their call forwarding settings.

Another concept concerns ring my phone, which may be expanded to have extended phones, such as my team phones or simultaneous ring phones. Note that it is expected that users have configured either a team or an assistant, but not both in this scenario. Therefore the concept of "team" and "assistant" into may be simplified into one. Similarly, the use of Simultaneous ringing may be simplified to ring only one PSTN number. The user may choose one or more of the following settings for his team ringing/or simultaneous ring: (1) Ring me only; (2) Ring me simultaneously with team; (3) Ring me first and then ring me simultaneously with team—the user is always ringed first for ten seconds, before ringing the team; and/or (4) Ring my PSTN numbers (simultaneous ring). If the user has selected options 2 and 3 then the user will be able to optionally specify the following: Ring one person randomly ahead. If the user selects this option, then one person from the team will be ringed for a fixed time of 5 seconds before the other people are tried. The option may be useful when the team is in a common seating configuration where it may be annoying for all the phones in the company to ring together all the time.

For TeamCalls, the TeamCall member may be able to call the user directly, or transfer someone else to the user which may be used for the scenario when the Assistant transfers the call to the Executive/Boss, or the Assistant calls the Boss directly.

"Forwarding" happens when a user chooses to send calls to certain numbers without ringing "my phones". This implies that all calls should be forwarded without ringing the user's phones. When the user selects this option, the calls are forwarded immediately to the specified numbers, person or to the Team. The user can choose the following forwarding destinations: (1) My phone numbers (TEL URIs); (2) A person (sip URI); (3) My team or Assistant; and/or (4) Voicemail. The option Ring my team only, do not ring me is used in boss/admin scenarios as a special type of forwarding in the UX. There may be special behaviors associated with this option. For example, only the Assistant(s) can transfer calls to the boss, or call the boss directly. If the user selects option 3, then the following additional settings can be specified: Ring one person randomly ahead. If the user selects this option, then one person from the team will be ringed for a fixed time of five seconds before the other people are tried. This option will be useful when the team is in a common seating configuration where it will be annoying for all the phones in the company to ring together all the time.

If the incoming call is not forwarded, or answered by the user or the team, then the user may specify the destination of the call. The default final destination for the call may be Voicemail. However, it is possible that there is no voicemail system in the company, or that the user wants to specify another destination for the call such as a receptionist.

Figure 20:
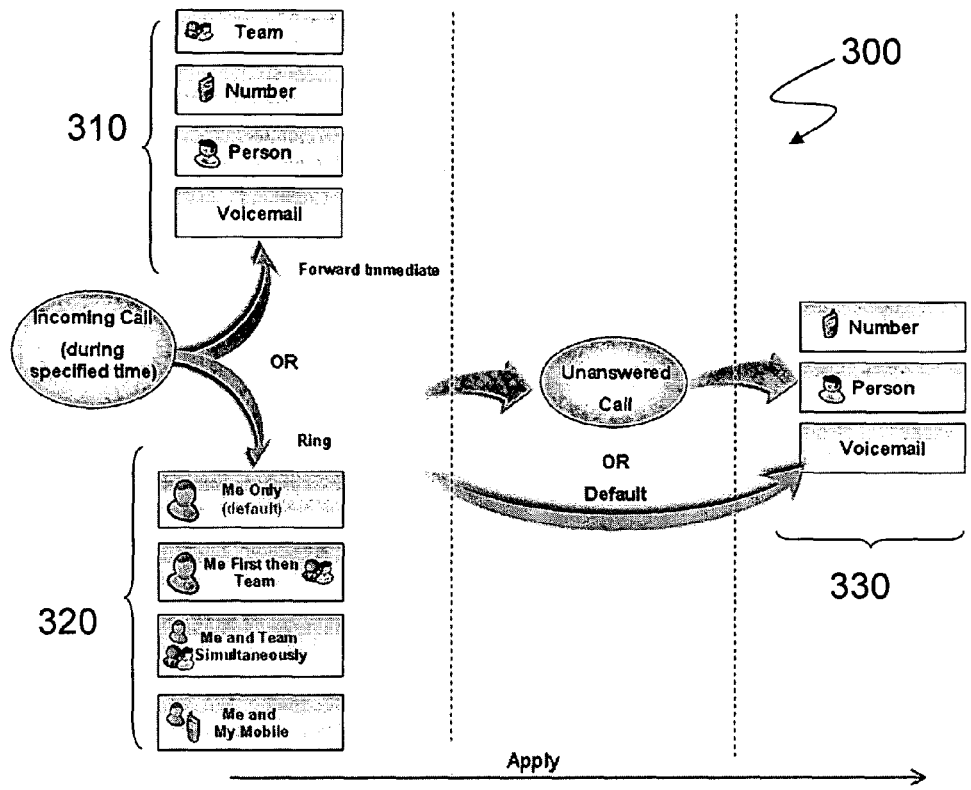
FIGS. 20 and 21 are schematic diagrams illustrating call forwarding operations according to the system described herein.
Figure 21:
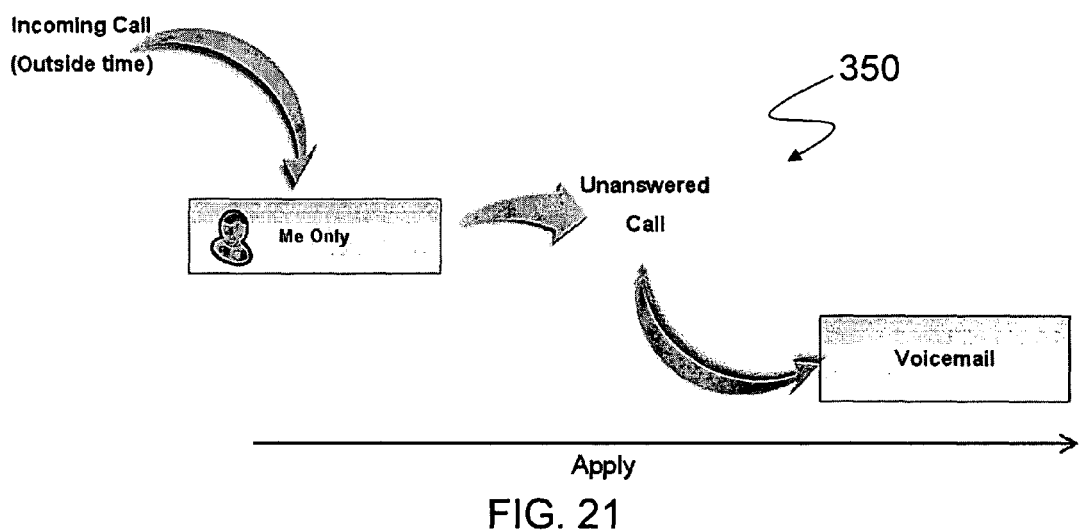

FIG. 20 is schematic diagram 300 illustrating call forwarding operations during a specified time according to one embodiment of the system. An incoming call may be forwarded immediately to Voicemail, a person, a number or a Team 310. Or, the call may ring Me only (as the default), Me first then Team, Me and Team Simultaneously, or Me and My mobile 320. If the call remains unanswered, the call can then subsequently be forwarded to another person, number or voicemail 330. FIG. 21 is a schematic diagram 350 illustrating the forwarding flow outside the specified time according to one embodiment of the system.

When a user sets his presence state to DND, then the server may ensure that the following occurs automatically: the user's phone does not ring; the user's simultaneous ring phone does not ring; the user's call forwarding rules do not apply; the team continues to ring; and/or the calls are routed to the user's voicemail system directly. When a user blocks someone, then the user will not get any calls or voicemail, or missed calls from the blocked person. The system may locally block the user from making any calls to the blocked user, which may be existing logic on the client side.

In various embodiments, the following rules may be imposed for the call forwarding design to keep the design simple and understandable to users.

The system may be configured such that TeamCalls cannot be nested with Simultaneous Ring phones. This reduces the chances that a third party mobile phone provider or answering machine always answers the call. Consider the scenario following scenario:

A has configured TeamCall ringing and adds B to his team;
B has configured simultaneous ringing on the PSTN number that has voicemail;
C calls A.
A's phone would ring.
B's phone would ring.
B's PSTN number would not ring.
Note that if B's PSTN number were allowed to ring, then there may be scenarios where the caller always hears B's voicemail before A's.

The system may be configured such that TeamCalls cannot be nested with TeamCalls. The server may enforce this restriction. Thus rule may reduce feature interaction, and the load on the server. Consider the following scenario:

A has configured TeamCall ringing and adds B to his team.
B has configured TeamCall ringing and adds C to his team.
D calls A.
A's phone would ring.
B's phone would ring.
C's phone would not ring.

The system may be configured such that a user's Call Forwarding rules will not be applied to incoming TeamCalls. This is again for reducing feature interaction and nesting of calls. Consider the following scenario:

A has configured TeamCall ringing and adds B to his team.
B has set forwarding on no answer to forward calls to B's mobile.
C calls A.
A's phone would ring.
B's phone would ring.
Call would not get forwarded to B's mobile due to B's rules.
Call would get to A's voicemail.
Note that if the forwarding rule were not applied, then the call can be answered by B's mobile provider's voicemail system, which may not be an ideal experience for people calling A.

The system may be configured such that calls originated by Team members will not be looped back to the same Team member. This is to reduce confusion to the user and provide a cleaner user experience. Consider the following scenario:

A has configured TeamCall ringing and adds B and C to his team.
B calls A.
A and C's phone rings.
Note that we do allow C's phone to ring in this case. Since the incoming call notification has information on who is calling, C may not pick up if C is an Assistant. Or C may pick up to inform B that A is away.

The system may be configured to allow Call Break Through when Team member calls or refers. Team members can always call the user, even when the user has set to ring only the team. Team members can also transfer other people using a blind or consultative transfer. This is to enable the Assistant to reach the Boss. What this means is that the people in the TeamCall list are implicitly trusted to be able to call the user. In a consultative or blind transfer scenario, the server will perform the validation to ensure that only those users who are referred (either using blind or using consultative transfer) by the admin are allowed to reach the boss. One proposed solution is that the server can add a cookie to the Refer-To string. Clients will round-trip the cookie with the INVITE as per the REFER semantics as part of the Referred-By. When the caller receives this REFER, an INVITE may be generated with the Referred-By that contains this cookie. The server checks for the cookie in Referred-By before it splits or "forks" the call to the boss. If the cookie is invalid, then the server rings the assistant.

If a call is forwarded to a "person" or SIP URI, then it would be treated similar to the call being addressed to that person directly. All the team ringing, and call forwarding rules set by that person shall apply. Consider the following scenario:

A has configured to forward calls to B on no answer.
B has configured a TeamCall and adds C to her team.
D calls A.
B and C's phones ring.

The system may be configured such that only the original callee gets a missed call or voicemail. Thus, Team members never get missed calls or voicemails for calls for other users. Consider the following scenario:

A has configured TeamCall and adds B and C.
D calls A.
No one answers.
A gets a missed call.

Note that for the scenario where the boss has chosen to forward all the calls to the secretary, the boss will still get the missed calls and voicemails. In this scenario, the secretary would most likely have access to the boss's inbox as a delegate and will be able to view the missed calls or listen to the voice messages.

The system may be configured such that a user whose team member picked up the call on his behalf will get a missed call notification with an indication of who picked up the call. Consider the following scenario:

A has configured TeamCall and adds B and C.
D calls A.
B picks up the call.
A gets a missed call notification with information that B answered the call on A's behalf.

Note that this notification may be generated by the server because the client can be offline or unavailable to generate this notification.

The system may be configured such that when a Team member picks up the call, then the caller can identify the name of the Team Member and will also be able to add other modes to the call with the Team member. A Globally Routable User Agent URI (GRUU) may be used identify the person who picked up the call. When a Team member picks up a call, the Contact URI will contain the GRUU of the team member. The system may use the user identity part and use reverse number lookup to identify the team call member. Alternatively, P-Asserted-Identity may identity the user who picked up the call. P-Asserted-Identity is a header field used among SIP entities in a service provider's network to carry the identity of the user sending a SIP message.

The system maybe configured to send out INVITEs with specific endpoint IDs for the following scenarios: adding a mode to an existing conversation, such as escalating to voice; consultative transfer; and/or deflect to user's specific endpoints (e.g. transfer call to a particular device). When an INVITE has an Endpoint specified, it may be routed only to that specific endpoint and: no call forwarding rules applied; no TeamCall or Simultaneous Ring rules applied; and/or no routing to Voicemail on no answer. This keeps the user experience and the feature interactions simple. Some examples below:

Escalating to Voice:
A has configured Teamcall and adds B and C.
D is on IM with A.
D escalates the IM to a voice call.
A picks up the Voice call from Communicator and the call does not ring B or C.

Note that if the escalation fails, then the client may have an option to re-INVITE without specifying the EPID so that A's other phone as well as Team can ring again.

The system may be configured such that an incoming call may not be forked to the Team when the INVITE has a Ms-Sensitivity: private header set (scenario: user making a private call to another user). This mechanism allows secretaries to call the boss without having to ring the other secretaries in the TeamCall list, or for users to directly reach other users without ringing team members. The following scenario illustrates this behavior:

A has configured TeamCall to ring only B and C simultaneously with A.
D originates a call to A and marks it "private".
A's phone rings, B and C's phone do not ring.

One exception may be if the user has selected to ring only the team (forward to team scenario), then this rule shall only apply to calls originated by team members. The call may be sent directly to voicemail if non Team members call with the private flag. Consider the scenario below:

A has configured TeamCall to ring only B and C directly.
D originates a call to A and marks it "private".
The call is sent to A's voicemail.
B originates a call to A and marks it "private".
A's phone rings.

The system may be configured such that any SIP URI's can be added as Team members. This will allow the user to add users in federated orgs to the team, especially for inter domain federation. E.g. bob@contoso.com can add carol@admin.contoso.com to the team. However, it may be that SIP TEL URIs (PSTN numbers) are not allowed as team members. For example "sip:+14254423333@contoso.com; user=phone" may not be allowed to be a team member. The client may check this number before adding it to the Team list.

The system may be configured such that team members who have been blocked by the caller will not be ringed (i.e., their communication device will not be paged). Consider the following scenario:

A has blocked C.
B has C in the team call.
A calls B.
No team ringing for C.

The system may be configured such that team members will not be ringed for incoming calls from a blocked user. Consider the following scenario:

B has C in his team.
B blocks A.
A calls B.
No team ringing for C.

The system may be configured such that when Team ringing is in progress, a team member may deflect the call to his PSTN telephony device. For example, any "3xx" sent by the user will be honored and Team ringing may be stopped. This mechanism can be used by clients to interrupt the forwarding mechanism that is active on the server.

The system may be configured such that when Team ringing is in progress, if a team member declines the call, then the other phones may continue to ring. For example, any "6xx" from the user will stop ringing on the user's endpoints, but the Team will continue to ring. Any "4xx" will have the same behavior, but ringing will stop with only the endpoints that returned the "4xx". When the team members do not pick up, then the call may be routed directly to voicemail.

The system may be configured such that team members will be able to deflect the call to their personal PSTN numbers. Team members may not be able to deflect the calls to their own voicemail or to the original user's voicemail.

The system may be configured such that error codes returned by Team members are treated special by the server: a "6xx" from a Team member stops ringing all the endpoints of the Team member; and/or a "4xx" from a Team members stops ringing just that endpoint for the Team member.

The system may be configured such that the last destination for TeamCalls is always the original user's voicemail. Consider the following scenario:

A has configured TeamCall ringing and adds B and C to his team.

D calls A.

A, B, C's phone ring.

No one answers.

Call is forwarded to A's voicemail.

Note that the user may be able to disable voicemail. There may be an IT admin setting on the server to do so. Users can choose to forward calls to PSTN numbers or locations such as a common receptionist if they do not want to choose voicemail.

The system may be configured such that when the user is Offline or set to Appear Offline, then the user's phone is not ringed, but the call forwarding rules are still applied The system may be configured such that when the user is set to Do Not Disturb, then the user's call forwarding rules are not applied and the user's phone does not ring. The calls are sent directly to team and then to voicemail.

The system may be configured such that team members who are set to Do Not Disturb will not be ringed.

The system may be configured such that team calls and call forwarding rules shall not be applied for Video-only calls.

Figure 28:
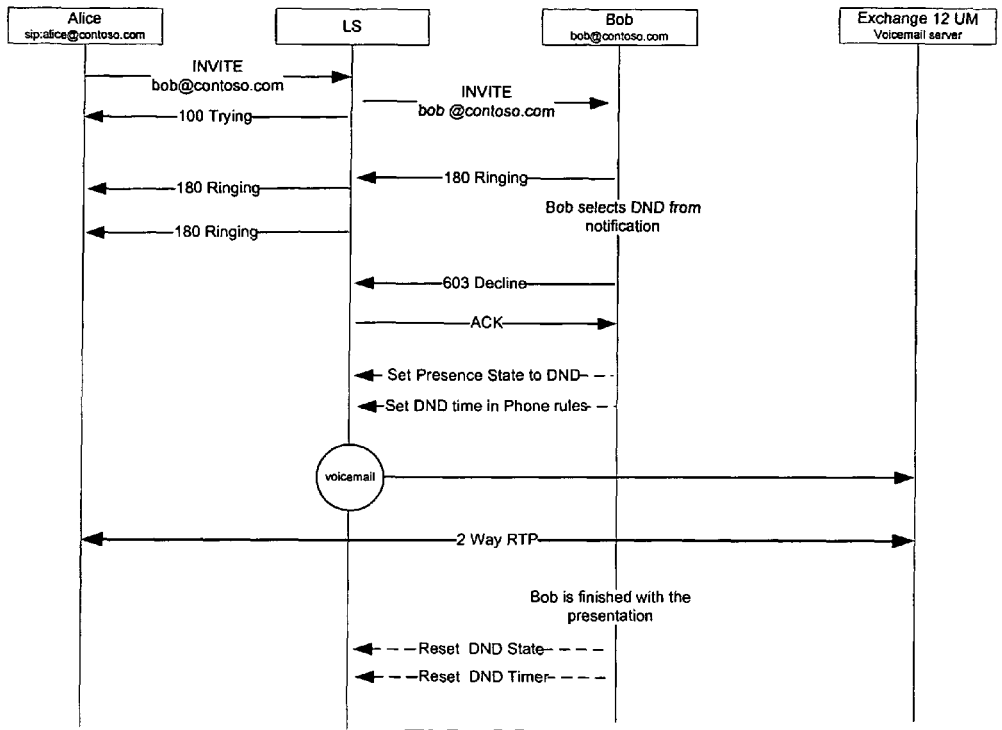
Figure 29:
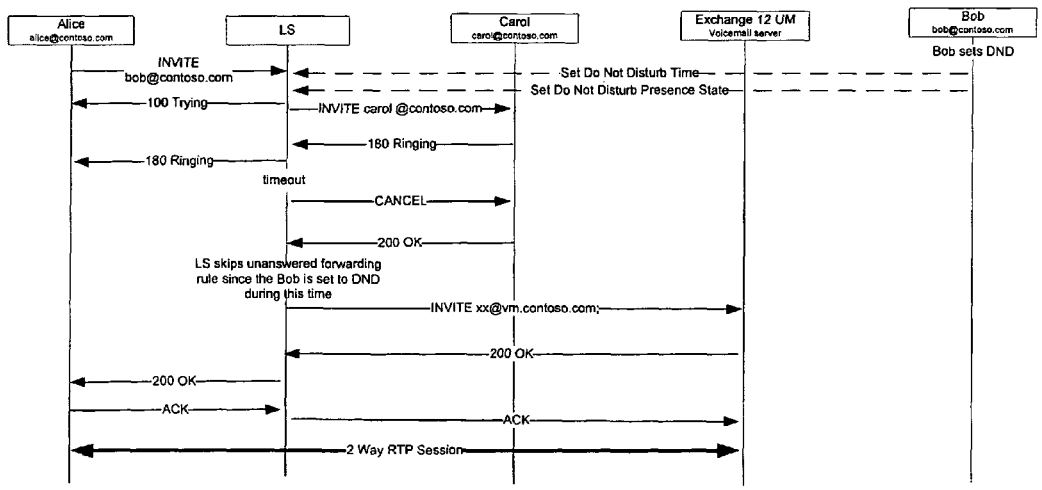

FIGS. 28 and 29 graphically summarize the system supported forwarding rules stated above. FIG. 22 illustrates the supported forwarding rules for an incoming call that is a direct call to a user. FIG. 23 illustrates the supported forwarding rules for an incoming call that is a TeamCall. It should be noted the system may be configured such that INVITEs with the headers "Ms-Sensitivity: private" and/or "Ms-Sensitivity: private-no-diversion" never reach TeamCall. FIG. 24 graphically summarizes how Conversation History/notifications may be generated by the system according to one embodiment.

The call forwarding functionality may be implemented on the server side. Communicator clients configure the forwarding rules on the server. Live Server may implement the call forwarding rules for static forwarding, as well as for Team ringing. The server may also enforce the time for the call forwarding rules.

The high level flows are as follows:

Communicator configures the forwarding and TeamCall rules on the server by sending out the configuration in the user's presence containers (for example, "blocked," "allow interrupt (exception)" and "low"). Communicator can also set other rules such as Do Not Disturb in the Low container if the user selects to go into the DND mode on the client.

An incoming calls come to Live Server's inbound routing logic, as further described elsewhere herein.

The inbound routing logic in LS retrieves the routing rules based on the From (or the P-Asserted-Identity) header. Depending on the presence rules that apply to the caller (Blocked, Exception or default), LS gets only one applicable rules set. This rules set can contains the user's preferences for the caller type. Some examples are:

If the caller is in the blocked list, then the call is rejected straightaway with a 480.

If the user has configured forwarding to static number or person, then LS retargets the calls to the forwarding destinations straightaway without ringing the Team or the user. LS will ring the person/number for a fixed duration before applying the call forwarding on no answer rules.

If the user has configured Simultaneous Ring, then LS forks (or splits) the call to the PSTN gateway directly.

If the user has configured TeamCall, then LS forks the call to the team members.

If the caller is not in exceptions container, and the user is set to DND, then LS receives the rules from the Low container with DND flag set. In this case, LS does not fork the call to the user's endpoint, but continues to fork it to the Team members. LS also skips call forwarding rules if the user is DND.

LS forks the call to the user's endpoints if the call is directly from the Team member, or if the call is Referred-By the team member.

LS would run the call timers. When there is no answer, LS would send out a CANCEL for the existing INVITEs, and ensure that the right forwarding rules are applied on no answer. LS also ensures that the time criterion for forwarding calls are respected.

LS finally retargets the call to the call forward on no answer destination, which is usually set to Voicemail for UC enabled users.

The following SIP protocol changes may be made for enabling the scenarios:

Ms-Target-Class:

The server will add the following header for the INVITE sent to the original callee and the Team member: Ms-Target-Class: primary—This indicates that the call was intended for the user; Ms-Target-Class: secondary—This indicates that the call is a TeamCall.

Ms-Decline-Scope: All

A special header may be introduced that can be used by the client to stop all team call forking. This header may be sent as part of the 6xx response that is sent by the client. A typical scenario for this is when the user wants to reply to a call with Instant Message. The Communicator may add this header in scenarios where the call is required to be declined completely.

Ms-acceptedby in CANCEL Reason:

When a team member picks up a call then LS will send a CANCEL to other team members as well as the user. The CANCEL Reason in this case shall indicate the SIP URI of the user who answered. This will be displayed by other endpoints in the call toast (as an informational toast).

CANCEL . . .

Reason: SIP; cause=200; ms-acceptedby="sip.:johnpaul@contoso.com"

History-Info for incoming calls:

History-Info (RFC 4244) may be used in the incoming call to display the caller that the call was originally intended for. The server will add History-Info for Team Call or forwarded calls. The server will use History-Info for applying outgoing call policies. Consider the following scenario:

A forwards the call to C.

C sets team call and adds D.

B calls A.

D's phone rings and D sees that the call was for C.

In this case, History is added to the call as follows:

A forwards to C.

LS originates an INVITE to C with:

Supported: histinfo
History-Info: <sip:A@P1.example.com>;index=1,
<sip:C@P2.example.com>;index=1.1

LS forks to D (Team call) with:

---
Supported: histinfo
History-Info: <sip:A@P1.example.com>;index=1,
<sip:C@P2.example.com;Reason=SIP302>;index=1.1,
<sip:D@P3.example.com>;index=1.1.1
---

D figures that the call is meant for C and displays "on behalf of C" in the incoming call toast.

The Communicator may use P-Preferred-Identity/P-Asserted Identity to determine the connected party information.

The following describes call flows according to various embodiments of the system.

Figure 25:
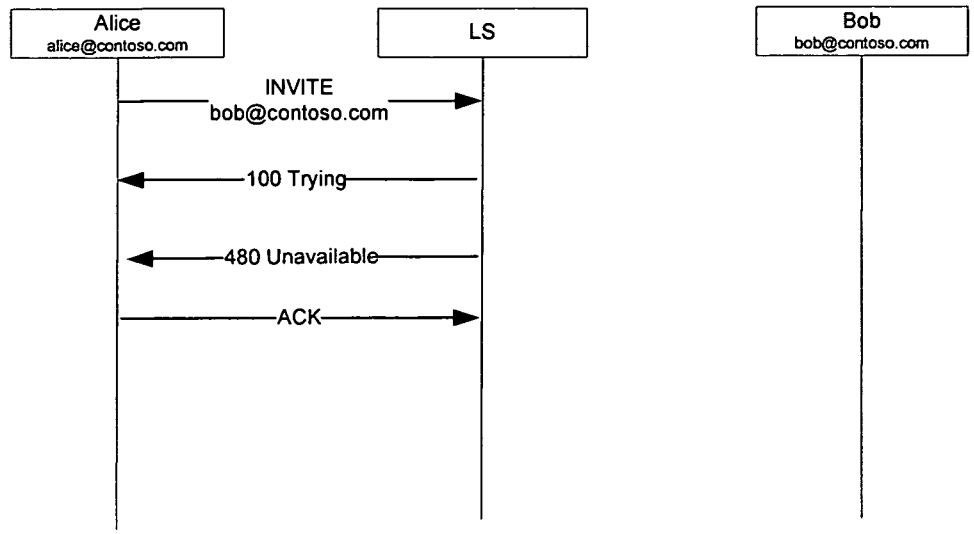

The call blocking feature allows the user to block other users from calling them. Blocking rules often are implemented on the server to prevent blocked caller's from gaining access to the called party's voicemail when the called party is not present. In the exemplary embodiment shown, pre conditions are that Alice and Bob are not in a call; and Bob has blocked Alice. Post conditions are that Alice gets a notification that Bob is offline or unavailable. FIG. 25 illustrates the flow of call blocking according to the present system. The flow is as follows:

Alice calls Bob.

LS checks Bob's call routing rules on the incoming call and determines that Alice is blocked.

LS returns a "480" Temporarily Unavailable indication to Bob.

Alice gets a notification that Bob cannot be reached because he is offline or not available.

Alice hangs up.

Note that the call does not get directed to voicemail.

Figure 26:
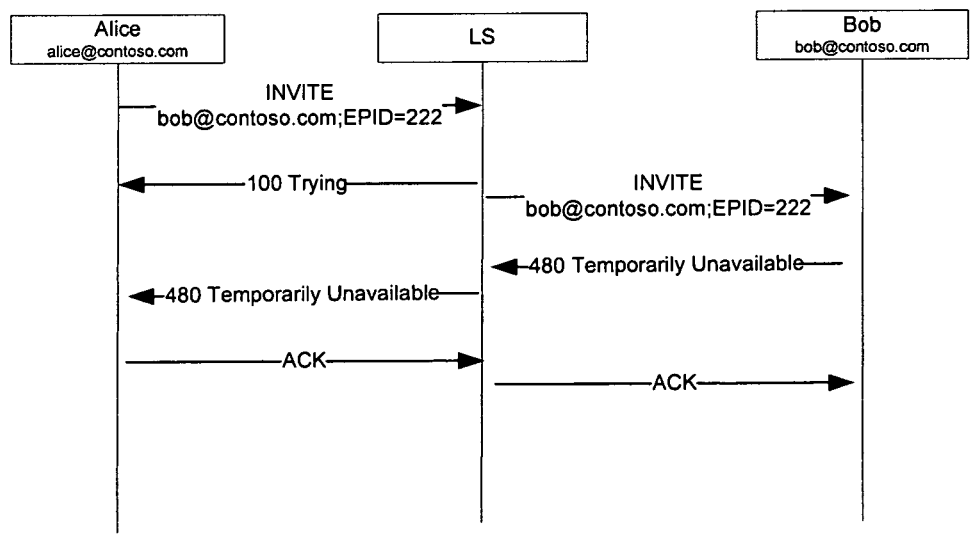

Alternatively, when calls are directed to a specific endpoint, then LS may disable forking or TeamCall and send the call directly to the endpoint. In this case, the client (not the server) may enforce the blocking rules and reject the call with a "480". Note that the server does not send the call to voicemail if the invite is directed to specific endpoint. FIG. 26 illustrates blocking when calls are directed to a specific endpoint (e.g., EDIP).

Figure 27:
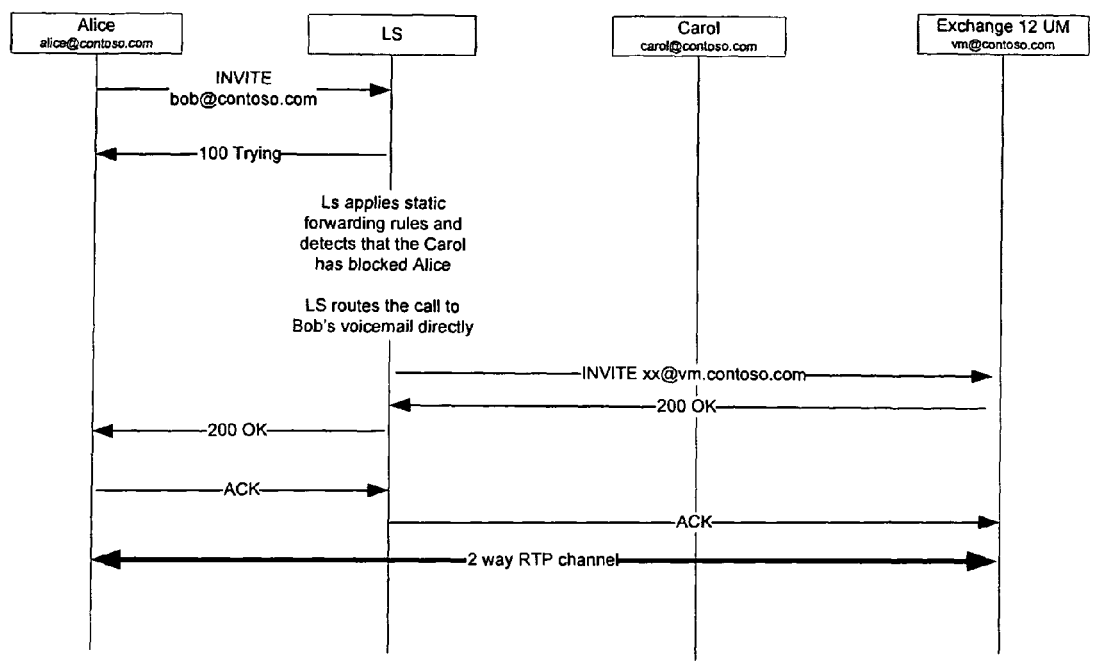

Another scenario involves Forward to a person, which person has block the user, as illustrated in FIG. 27. In this scenario, the person whom the call is forwarded to has blocked the caller. LS will check the blocked list, and route the call to the original callee's voicemail.

Bob has set forwarding his calls to Carol.

Carol has blocked Alice.

Alice calls Bob.

LS applies static rules and forwards the call to voicemail—LS also sends a "181" Call is Forwarded indication to Alice's OC. (not shown for clarity of explanation)

Alice sees a visual notification in OC that the call is being forwarded.

LS checks Carol's blocking list and detects that Carol has blocked Alice. LS does not ring Carol's phone.

LS routes the call to Bob's voicemail system.

Alice hears Bob's voicemail greeting.

Alice records her message and hangs up.

Bob gets a new voice message from Alice.

If the Team member or Assistant has blocked the caller, then the TeamCall may not ring those team members. If all the team members have blocked the caller, then the call may be redirected to voicemail.

The Do Not Disturb feature allows the user to set the phone to Do Not Disturb when the user's presence state is Do Not Disturb.

In some embodiments, the server may also check if there are registered endpoints before enforcing any DND rule. If there are no registered endpoints, then the DND rules may be bypassed and the server ends up following the call forwarding on no answer settings. Pre conditions are that Bob has set his state to Do Not Disturb manually. Post conditions are that Alice is talking to Bob's voicemail or to Bob's team. FIG. 28 illustrates the basic flow of the Do Not Disturb feature according to one embodiment of the present system, described as follows:

Bob is taking a presentation.

Alice calls Bob.

Bob gets an incoming call notification.

Bob selects to set Do Not Disturb from the notification.

Bob's OC sends a 603 Decline to the server to reject the call.

All of Bob's MPOP endpoints stop ringing.

Bob's OC sets DND presence state on server.

LS routes the call to voicemail.

Bob is finished with his presentation.

OC puts Bob off DND state automatically.

Alternatively, if the Team/Assistant does not pick up, and the user is in Do Not Disturb mode, the LS detects that the user's presence is set to DND, then LS will not apply the call forwarding rules and shall route the calls straight to voicemail. FIG. 29 illustrates the basic flow of the DND and Call Forwarding On No Answer feature according to one embodiment of the present system, described as follows:

Bob sets his state to Do Not Disturb manually from OC.

Bob's OC sets DND presence state on server.

Alice calls Bob.

LS forks the call to Carol directly, because of Bob's DND setting.

LS also adds Ms-Target-Class: secondary header indicating that the call was a Team ringing.

Alice hears ring back tone.

Carol's phone rings and she does not pick up.

Call times out on the LS and a CANCEL is sent out to Carol's OC.

LS checks that call forwarding on no answer was set, but also that Bob is in DND mode.

LS routes the call to Bob's voicemail.

Figure 30:
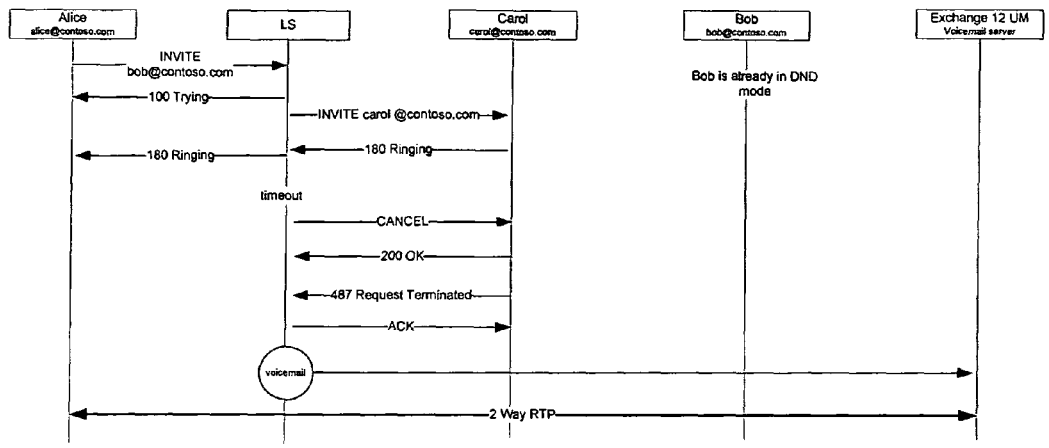

In the case of Team Ringing, user in DND mode, when LS detects that the user's presence is set to DND, then LS will not apply the call forwarding rules. FIG. 30 illustrates the basic flow of the Team Ringing, user in DND mode feature, described as follows:

Bob is taking a presentation and has set himself to DND mode already.

Alice calls Bob.

LS forks the call to Carol and does not ring Bob because of his DND status.

LS also adds Ms-Target-Class: secondary header indicating that the call was a Team ringing.

Alice hears ring back tone.

Carol's phone rings and she does not pick up.

Call times out on the LS and a CANCEL is sent out to Carol's Communicator.

LS checks that call forwarding on no answer was set, but also that Bob is in DND mode.

LS routes the call to voicemail.

Figure 31:
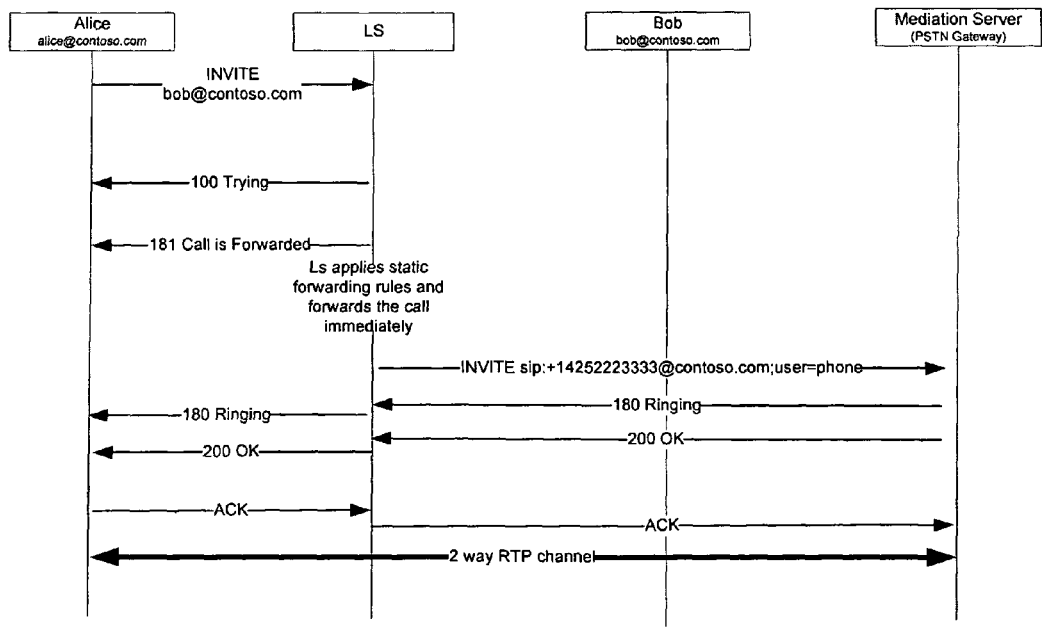

The Forward Calls Immediately feature allows a user to forward all incoming calls to other numbers/destinations. The user can choose to apply static forwarding based on time. The following rules may be supported: Forward calls to This number; This person; Voicemail. Pre conditions are that: Alice and Bob not in a call; Bob has set static call forwarding to one of his mobile numbers. Post conditions are that Bob's call is forwarded to his mobile number. FIG. 31 illustrates the basic flow of the Forward Calls Immediately feature, described as follows:

Alice calls Bob.

LS applies static rules and forwards the call to the Mediation Server.

LS also sends a "181" Call is Forwarded indication to Alice's OC.

Bob's mobile number rings.

Bob answers and talks to Alice

Note: When LS is re-targeting a request, it would keep the To: and From: URI's the same. In this case, only the request URI may change.

Alternatively, Forward Calls Immediately flows are described as follows.

When LS forwards to a Person, the person who receives the forwarded call may get the information on who the call was originally intended to from the History-Info header. The flow is as follows:

Alice calls Bob

LS applies static rules and forwards the call to Carol.

LS also sends a "181" Call is Forwarded indication to Alice's OC.

Alice sees a visual notification in OC that the call is being forwarded.

Carol's phone rings.

Carol answers.

Alice's OC indicates that the call is now picked up by Carol.

Alice talks to Carol.

The following is the flow for Forward to person, when person has set routing to voicemail:

Alice calls Bob.

LS applies static rules and forwards the call to Carol.

LS also sends a "181" Call is Forwarded indication to Alice's OC.

Carol's phone rings.

Carol does not pick up.

Call is routed to Carol's voicemail system.

Alice hears Carol's voicemail greeting and leave a voice message.

Carol receives a new voice message.

The following is the flow for Forward to person, person has set TeamCall. When calls are forwarded to a person, then that person's TeamCall rules may apply:

Bob has set forwarding his calls to Carol.

Carol has set up TeamCall ringing and adds Dan.

Alice calls Bob.

LS applies static rules and forwards the call to Carol.

LS also sends a "181" Call is Forwarded indication to Alice's OC.

Alice sees a visual notification in OC that the call is being forwarded.

Carol and Dan's phone ring.

Dan picks up the phone.

Alice's OC indicates that the call is now picked up by Dan.

Alice talks to Dan.

The following is the flow for Forward to voicemail:

Alice calls Bob.

LS applies static rules and forwards the call to voicemail.

LS also sends a "181" Call is Forwarded indication to Alice's OC.

Alice sees a visual notification in OC that the call is being forwarded.

Alice hears Bob's voicemail greeting.

Alice records her message and hangs up.

Bob receives a new voice message.

The following scenarios describe possible call forwarding error conditions and features of the present system that address the error conditions.

Figure 32:
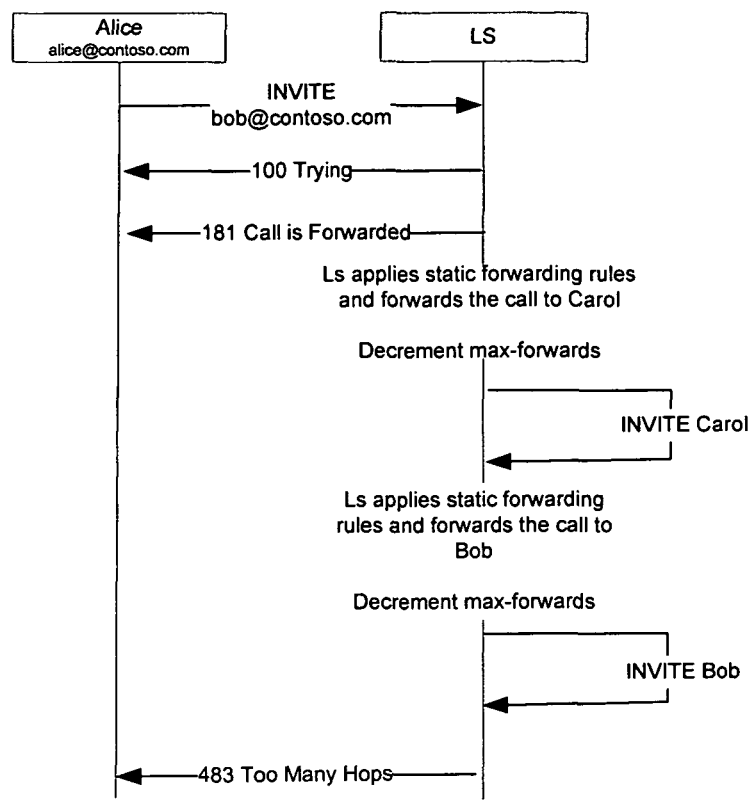

It is possible for two users to configure call forwarding to each other (i.e., a forwarding loop). A user does not have any indication of what the settings that the other user has made. The system may take care of loop detection by decrementing the "Max Forwards" to ten the first time the call is forwarded, and by one each subsequent time. FIG. 32 illustrates the basic flow for addressing a Forwarding Loop, described as follows:

Bob has set his calls to be forwarded to Carol and Carol has set her calls to be forwarded to Bob.

Alice calls Bob.

LS applies static rules and forwards the call to Carol's number.

LS also sends a "181" Call is Forwarded indication to Alice's OC.

LS sets Max Forwards to ten if it is larger than ten.

Alice sees a visual notification in OC that the call is being forwarded.

LS applies forwarding to Bob's number based on Carol's rules.

LS also sends a "181" Call is Forwarded indication to Alice's OC.

LS decrements the Max Forwards by one.

Eventually, Max Forwards becomes zero.

LS times out the call and returns a "483" Too Many Hops.

Alice gets a call failed notification.

Figure 33:
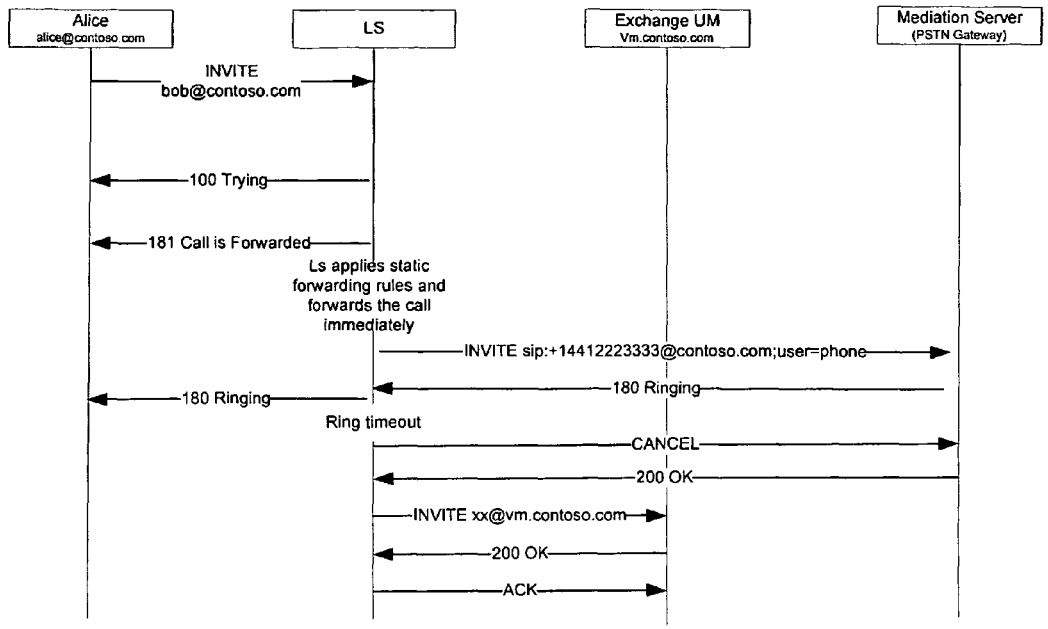

It is possible that the call is forwarded to a destination that does not answer within the user's specified ring duration. In this case, the system may time out the call and route the call to voicemail. FIG. 33 illustrates the basic flow for addressing a forwarding destination that does not answer, described as follows:

Alice calls Bob.

LS applies static rules and forwards the call to Bob's mobile number immediately.

LS also sends a "181" Call is Forwarded indication to Alice's OC.

Alice sees a visual notification in OC that the call is being forwarded.

Bob's mobile number rings.

Bob does not answer within the ring timeout.

LS times out the call and routes it to the voicemail server.

If the forwarding destination is a blocked international number, then a server of the system may reject the incoming call immediately. The server of the system may generate a forwarding error notification in this case, and forward the call to voicemail.

If the forwarding Gateway is down, then the system may time out the request and generate an error message for the client. The system may also route the call to the voicemail after the appropriate ring duration. The flow for this condition is described as follows:

Alice calls Bob.

LS applies static rules and forwards the call to outgoing PSTN Gateway.

LS also sends a "181" Call is Forwarded indication to Alice's OC.

Alice sees a visual notification in OC that the call is being forwarded.

Outgoing Gateway was down and LS returns a "504" timeout error.

Inbound call routing in LS generates an error notification.

Inbound call routing in LS diverts the call to voicemail.

Alice gets connected to voicemail and leaves a voice message.

Figure 34:
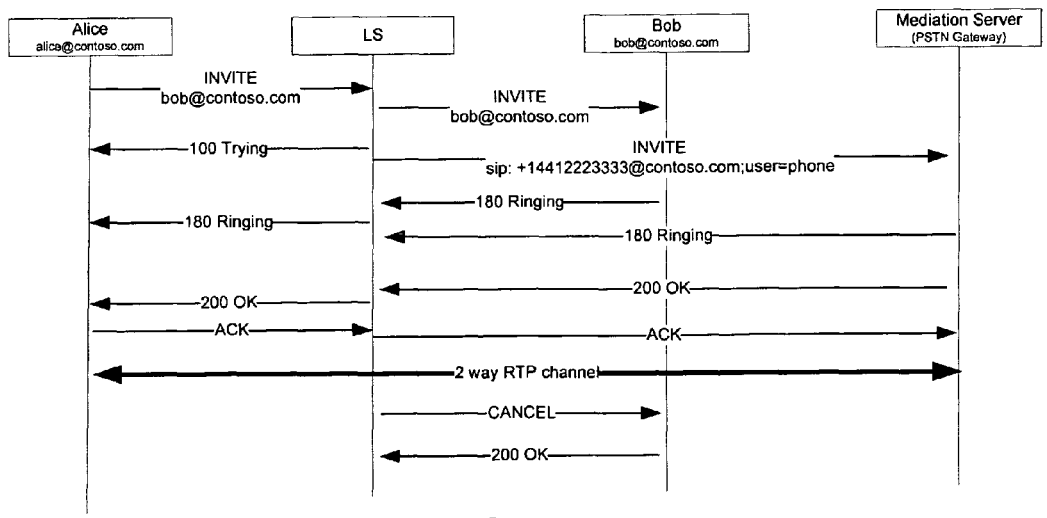

A Simultaneous Ring PSTN number feature allows the user to add a PSTN number to ring simultaneously (i.e., to begin parallel paging; simultaneously does not necessarily mean that each device will notify the user at exactly the same time) when the user's phone rings. The user can add different PSTN local numbers, and can also add international numbers. Although the Communicator may not block the user from setting any number as a simultaneous ring number, the server may have policies for blocking international numbers and the simultaneous ring may never go through. The system may be configured such that the user never gets any Team Calls in the simultaneous ring number, but forwarded calls are allowed to ring this number. In one scenario, the user can sometimes have more than one missed calls (e.g. the cell phone provider generating a missed call) in this configuration. In some scenarios the users main phone may never ring. For example, if the user has a mobile phone which is turned off, then the provider may immediately send the call to voicemail. Pre conditions are that Alice and Bob not in a call. Post conditions are that Alice is talking to Bob on his mobile number. FIG. 34 illustrates the basic flow of the Simultaneous Ring PSTN number feature, described as follows:

Alice calls Bob.

LS applies Bob's forwarding rules and forks the call to outgoing PSTN Gateway

Bob's OC rings.

Bob's mobile number rings after a few seconds.

Bob sees that the incoming call is from Alice's phone number.

Bob picks up from the mobile phone.

Bob talks to Alice.

The following describe an alternate flow for the Simultaneous Ring PSTN number feature. Dual Answer from PSTN/OC is a corner case scenario when the user answers both from OC as well as the mobile phone. Depending on which 200 OK reaches first, the appropriate call leg will be canceled. Note that the PSTN Gateway is assumed to accept a CANCEL following a 200 OK.

If the user has configured simultaneous ringing and has turned the mobile phone OFF, then the mobile phone provider's voicemail system will most likely accept the call immediately. The caller will be taken to the mobile providers' voicemail system directly.

In a situation where the PSTN Gateway is down, the system may continue to ring if the PSTN Gateway is down. The user gets no feedback on this state.

The system may be configured such that the Server administrator can block simultaneous ringing by setting a policy. In this case, the user will not be able to configure the setting from OC.

Figure 35:
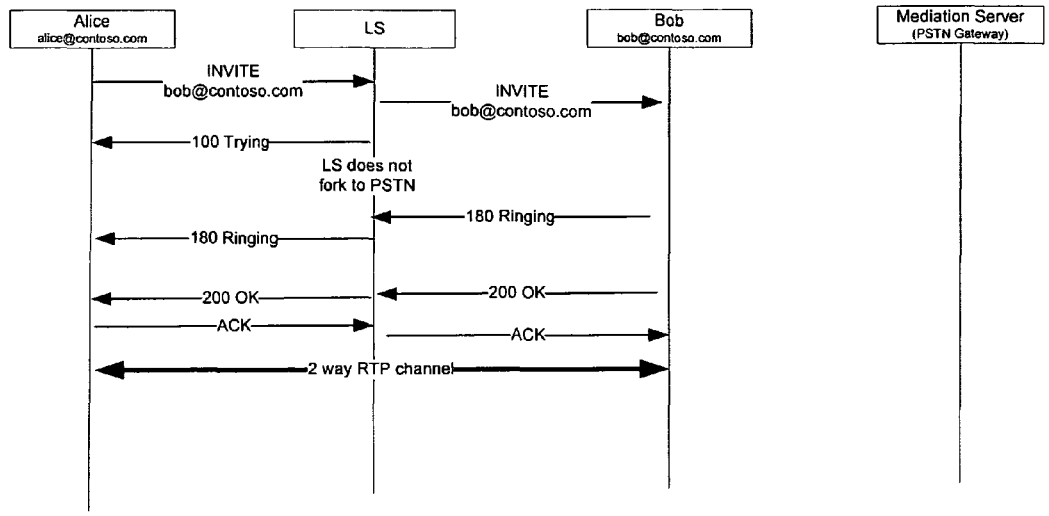

If the administrator has blocked international number dialing, and the user had added an international number to the Simultaneous Ring list, then LS shall not fork the call to the PSTN number. Note that the user's OC will continue to ring. FIG. 35 illustrates the flow for a Simultaneous ring block number feature according to one embodiment of the system.

Figure 36:
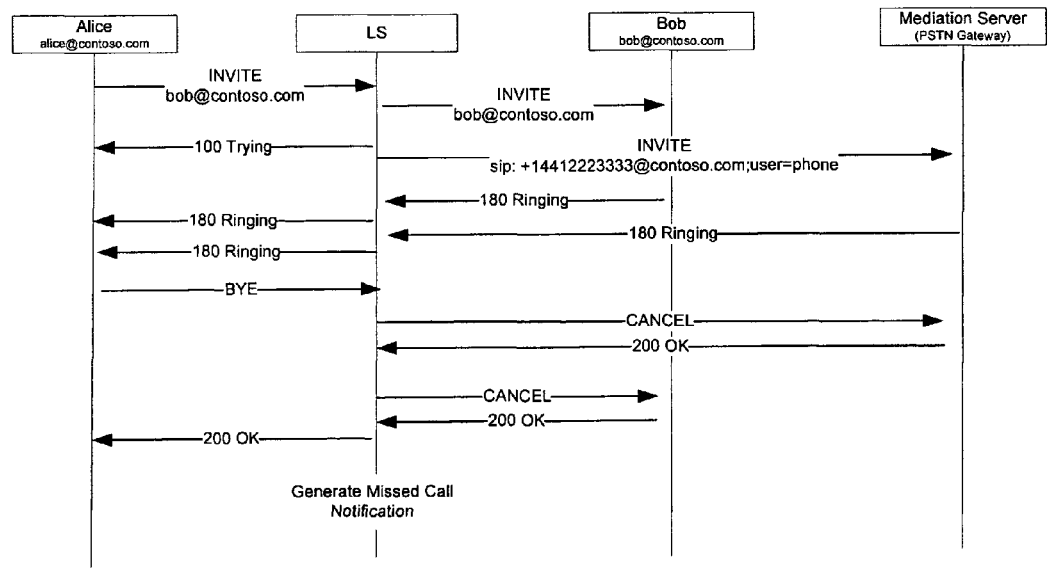

If the caller hangs up before answer, then the server may generate a missed call notification. FIG. 36 illustrates the flow for the situation where a caller hangs up before answer according to one embodiment of the system, described as follows:

Alice calls Bob.

Bob's OC rings.

Bob's mobile number rings.

Bob sees that the incoming call is from his company's dial number

Alice hangs up.

Bob gets a missed call from Alice in Outlook.

Bob gets a missed call from Alice in the mobile phone provider.

Figure 37:
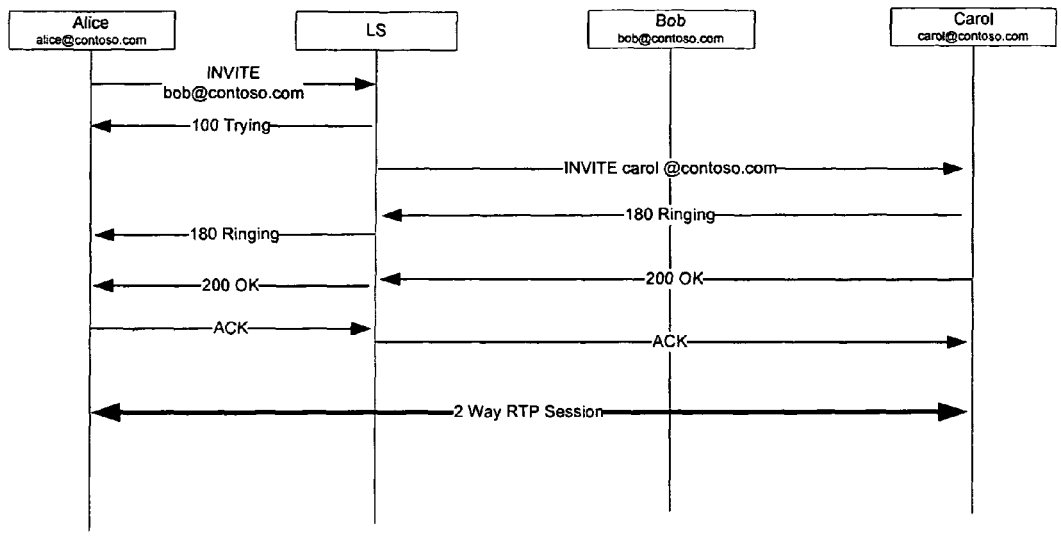

A Forward to Team/Assistant (Ring Team Directly) feature allows the Boss/Assistant scenario where one Boss can have one or more Assistants receive the calls. In this flow, the user (Boss) designates his team members who can receive his calls. The user can choose to ring one person randomly ahead. When that is set, LS would pick one person randomly and ring that person for 5 seconds before ringing other team members. Note that if the Assistant were truly a delegate of the Boss, then the Assistant would have delegate permissions to the Exchange mailbox as well and would be able to access the voicemail messages on behalf of the Boss. If the scenario is of a Team Call rather than a Boss/Assistant, then the Team members don't want to get missed calls or voice messages on behalf of the original callee. Pre conditions are that: Alice and Bob not in a call; Carol is Bob' assistant and Bob has set OC to always ring Carol. Post conditions are that Alice is talking to Carol. FIG. 37 illustrates the flow for Forward to Team/Assistant feature according to one embodiment of the system, described as follows:

Alice calls Bob.

LS routes the call to Carol directly, because of Bob's Forward to Team setting.

LS also adds Ms-Target-Class: secondary header indicating that the call was a Team ringing.

Alice hears ring back tone.

Carol gets an incoming call notification with information that the call was intended for Bob.

Carol picks up the call.

Carol talks to Alice.

Carol's conversation history indicates that the call was received on behalf of Bob.

Bob receives a missed call notification with indication that Carol picked up the call.

Alternate flows for the Forward to Team/Assistant feature are possible. Certain scenarios as described as follows.

Figure 38:
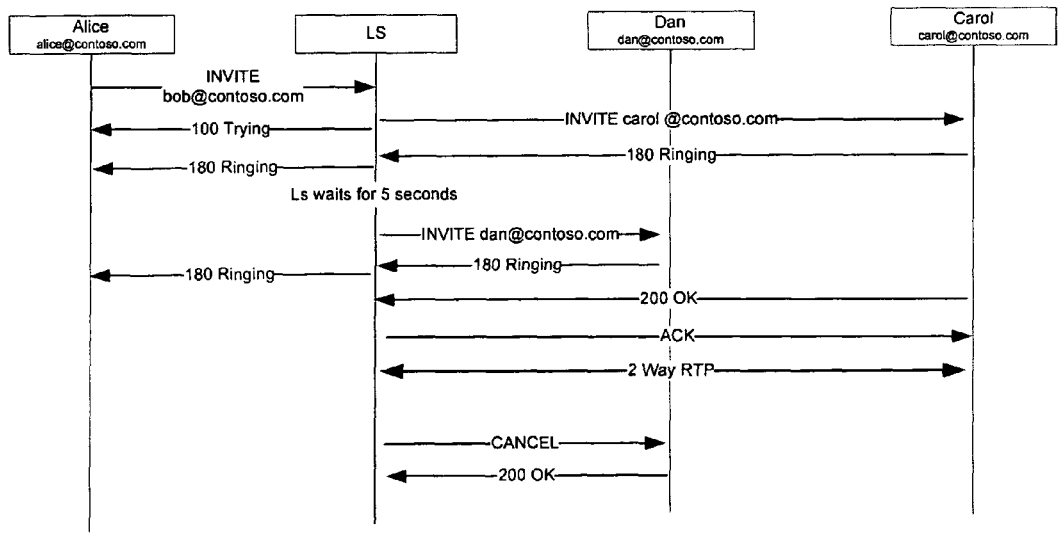

In one scenario for a One Person Randomly Ahead feature, Bob has selected to ring Dan and Carol and has checked the one person randomly ahead option. FIG. 38 illustrates the flow for the situation for the One Person Randomly Ahead feature according to one embodiment of the system, described as follows:

Alice calls Bob.

LS selects to ring Carol first.

LS also adds Ms-Target-Class: secondary header indicating that the call was a Team ringing.

Alice hears ring back tone.

Carol gets an incoming call notification with information that the call was intended for Bob.

After 5 seconds, LS also rings Dan.

LS also adds Ms-Target-Class: secondary header indicating that the call was a Team ringing.

Dan gets an incoming call notification with the information that the call was intended for Bob.

Carol picks up the call.

Carol talks to Alice.

Carol's conversation history indicates that the call was received on behalf of Bob.

Bob gets a missed call notification with indication that the call was picked up by Carol.

Figure 39:
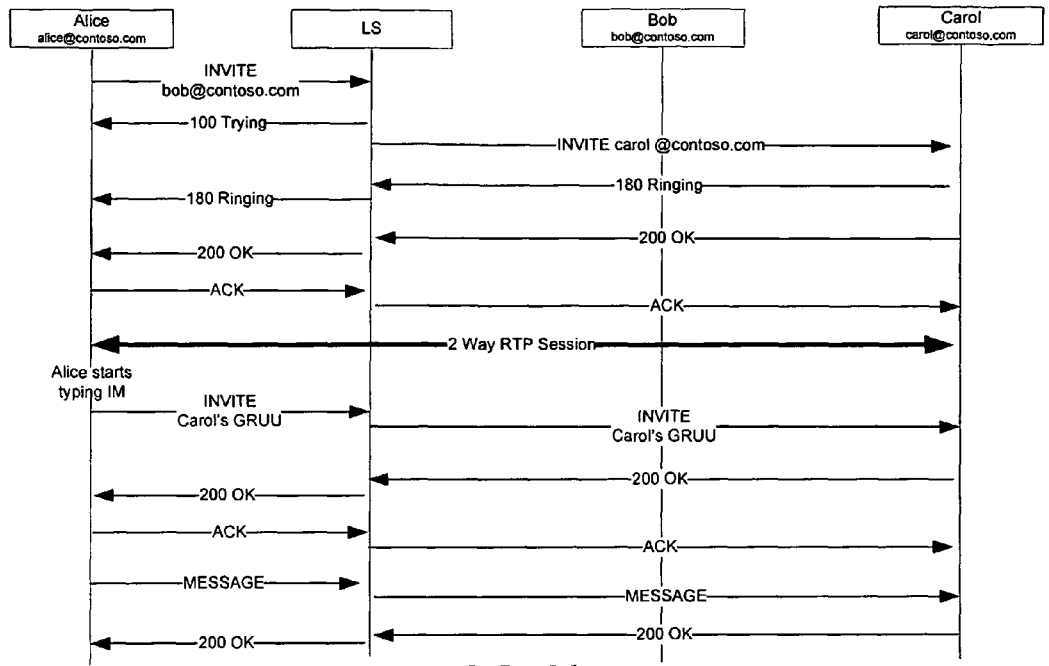

In another scenario, a Team/Assistant picks up a call, and caller adds IM mode. The caller can add IM or other modes to the existing VoIP conversation. The caller knows the identity of the TeamCall member based on the P-Asserted-Identity that was returned in the "200" OK response. FIG. 39 illustrates the flow of the IM with Team Member feature according to one embodiment of the present system, described as follows:

Alice calls Bob.
LS selects to ring Carol.
LS also adds Ms-Target-Class: secondary header indicating that the call was a Team ringing.
Alice hears ring back tone.
Carol gets an incoming call notification with information that the call was intended for Bob.
Carol picks up the call.
The "200" OK from Carol carries P-Asserted-Identity identifying Carol's endpoint
The "200" OK also has a Contact header that contains Carol's GRUU.
Carol talks to Alice.
Alice adds IM mode and starts typing IM.
Carol's conversation history indicates that the call was received on behalf of Bob.
Carol's conversation history also contains information about the IM session with Alice.
Bob gets a missed call notification with indication that the call was picked up by Carol.
Bob conversation history has no information on subsequent IM sessions between Carol and Alice.
Note: subsequent INVITEs for IM are addressed to Carol directly based on the GRUU.

Figure 40:
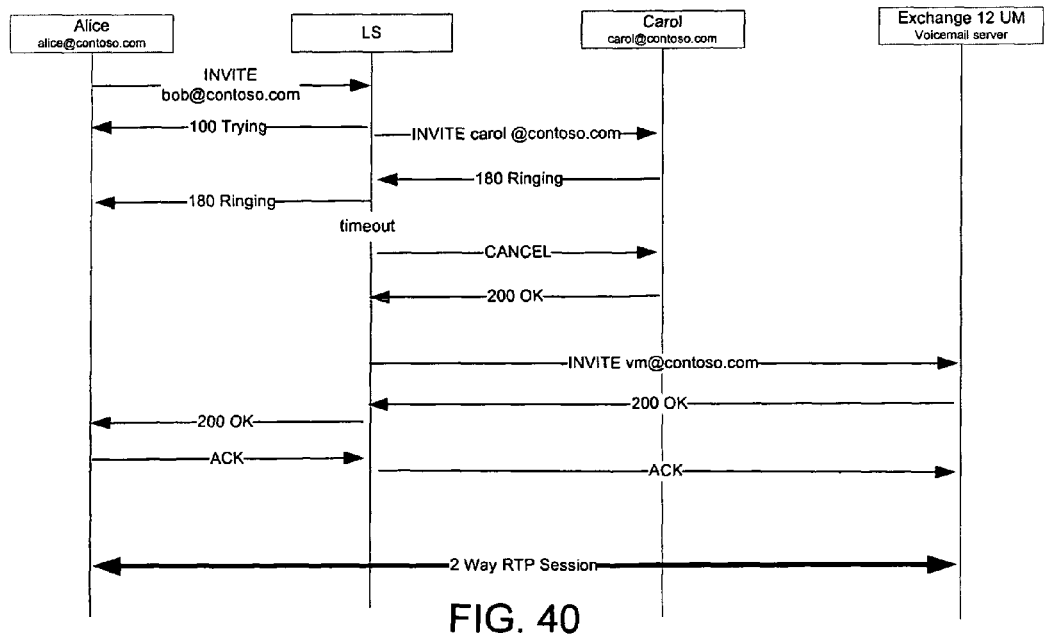

In another scenario, the Team/Assistant does not pick up or ignores call and the call is forwarded to voicemail. When the team or admin does not pick up the call, then the call is automatically routed to the original user's voicemail system. FIG. 40 illustrates the flow of the Team/Assistant ignores call-forward to voicemail feature according to one embodiment of the present system, described as follows:

Alice calls Bob.
LS forks the call to Carol directly, because of Bob's setting.
LS also adds Ms-Target-Class: secondary header indicating that the call was a Team ringing.
Alice hears ring back tone.
Carol gets an incoming call notification with information that the call was intended for Bob.
Carol decides to ignore the call.
Call times out on the LS and a CANCEL is sent out to Carol's OC.
LS retargets the request to the voicemail server.
The original To: is still addressed to bob@contoso.com.
There is a Deflection header added for Exchange UM (see voicemail spec for details).
Voicemail server answers the call.
Alice's OC connects to the VM and connects to Bob's voicemail.
Alice hears Bob's voice message and records her message.
Bob receives a new voice message.

Figure 41:
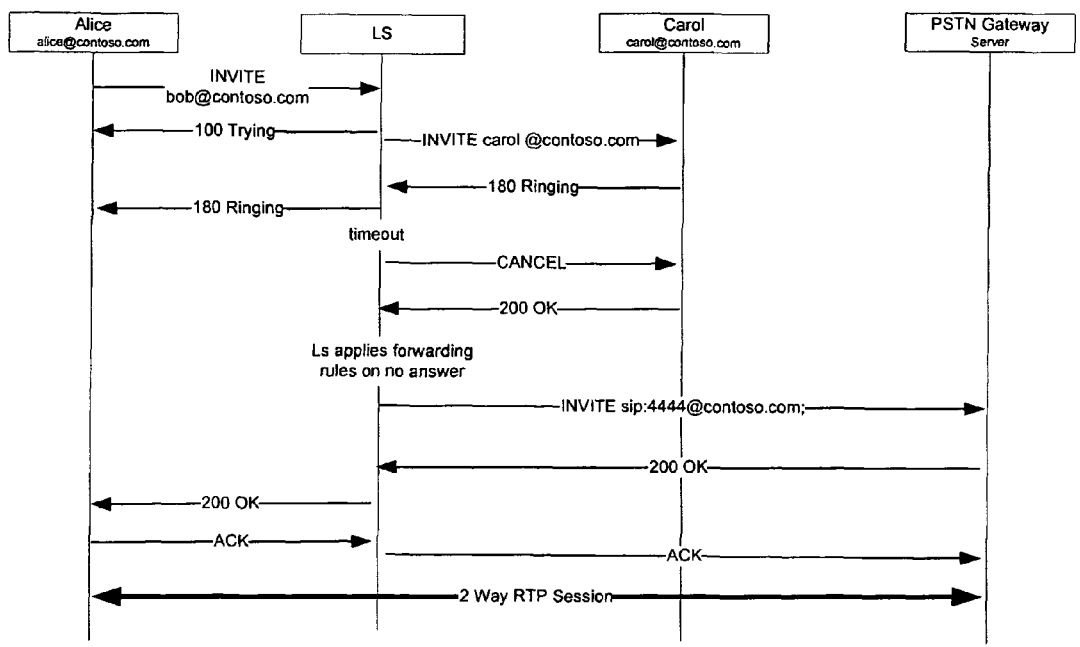

In another scenario, a Team/Assistant does not pick up or ignores call and the call is forwarded on no answer. In this flow, the Bob has set to forward his calls to his mobile number when no one picks up the call. FIG. 41 illustrates the flow of the TeamCall+Forward on No Answer feature according to one embodiment of the present system, described as follows:

Alice calls Bob.
LS forks the call to Carol directly, because of Bob's setting.
LS also adds Ms-Target-Class: secondary header indicating that the call was a Team ringing.
Alice hears ring back tone.
Carol's phone rings and she does not pick up.
Call times out on the LS and a CANCEL is sent out to Carol's OC.

LS checks that call forwarding on no answer was set, and retargets the call to Alice's forwarding destination. LS first checks that the working time criterion for the forwarding rules is met.
Bob's cell phone rings.
Bob picks up the call.

Figure 42:
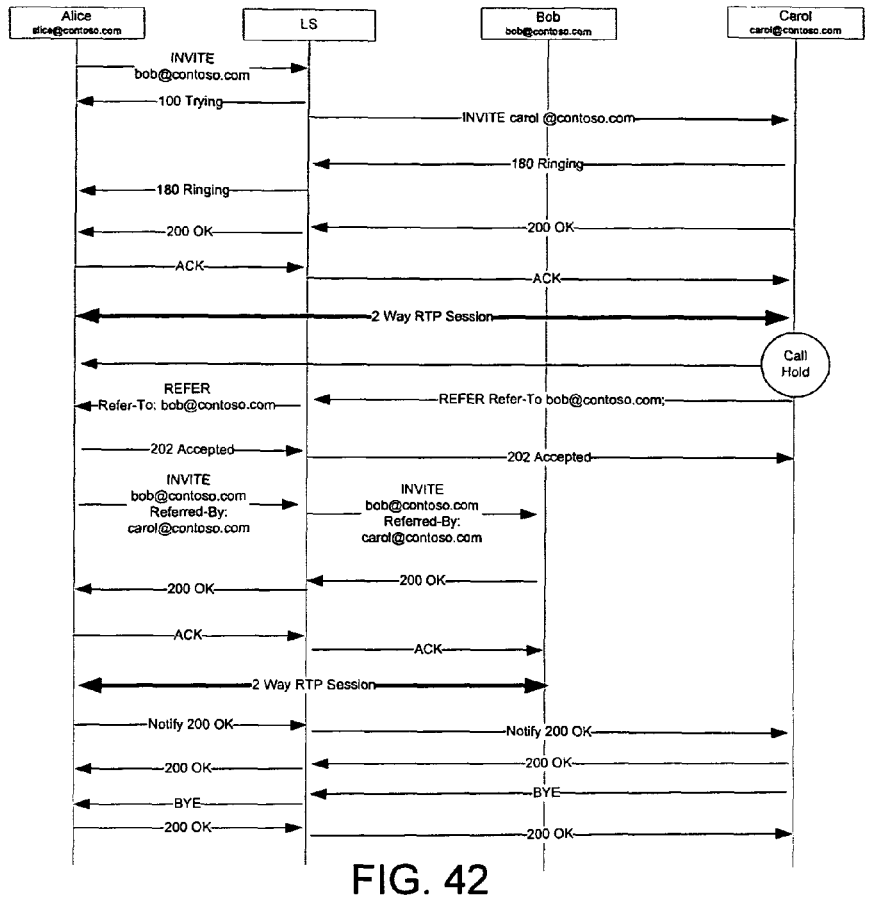

In another scenario, a Team member/Assistant forwards to the Original Callee. When the assistant transfers to Boss, the Referred-By header in the INVITE may be used to detect that the assistant should not be ringed again. Note that there would be some security considerations that would be used to verify that the call was indeed forwarded by Carol. FIG. 42 illustrates the flow of the Assistant/Team member Transfers Call to original callee feature according to one embodiment of the present system, described as follows:

Bob has set forwarding to his assistant Carol.
Alice calls Bob.
LS forks the call to Carol directly, because of Bob's setting.
LS also adds Ms-Target-Class: secondary header indicating that the call was a Team ringing.
Carol's phone rings.
Alice hears ring back tone.
Carol picks up the call and talks to Alice.
Carol decides to forward the call to Bob.
Alice's OC receives the REFER and sends out the INVITE to Bob's client with the Referred-By header.
LS detects the Referred-By and does not fork the call to Carol, instead forks the call directly to Bob.
LS also adds Ms-Target-Class: primary header indicating that the call is intended for Bob.
Bob's phone rings.
Alice hears Bob's phone ringing
Bob picks up the call and talks to Alice.
Carol's Conversation history records that she picked up a call on behalf of Bob and that she transferred the call to Bob.
Bob gets a missed call notification that the call was picked up by Carol
Note: LS may be validating Referred-By. In the REFER, LS may put a cookie in the Refer-To header that is returned by the Alice's OC in the new INVITE that contains the Referred-By. LS validates this cookie before attempting to ring Bob.

In another scenario, a Team member/Assistant consults the original callee and transfers the call. In this flow, the Team member first consults the original callee before transferring the call. The difference in this approach from the blind transfer is that the transfer occurs with the EPID of the original callee.

Figure 43:
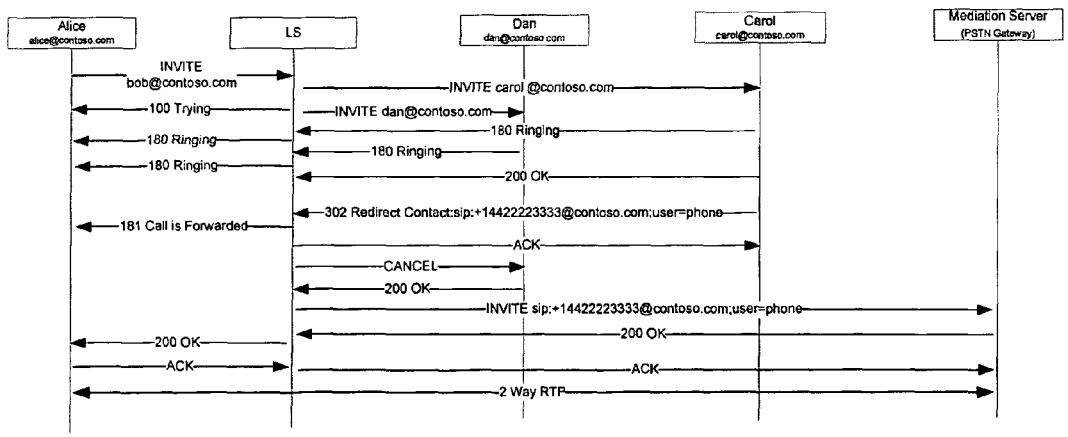

In another scenario, a Team member deflects call to mobile. In the scenario, Bob has selected to ring Dan and Carol. When Carol sees the incoming call, she selects to deflect the call to her mobile number. FIG. 43 illustrates the flow of the Team member deflects call to mobile feature according to one embodiment of the present system, described as follows:

Alice calls Bob.
LS ring Carol and Dan.
LS also adds Ms-Target-Class: secondary header indicating that the call was a Team ringing.
Alice hears ring back tone.
Carol and Dan gets an incoming call notification with the information that the call was intended for Bob.
Carol selects to deflect the call to her mobile number.
Alice gets an indication that the call is being forwarded.
Carol's mobile number rings.
Carol picks up the call and talks to Alice.
Carol's conversation history indicates that the call was received on behalf of Bob.

Bob receives a missed call notification with an indication that the call was picked up by Carol.

The following scenarios describe error conditions for the Forward to Team/Assistant feature and features by which the present system address the error conditions.

Figure 44:
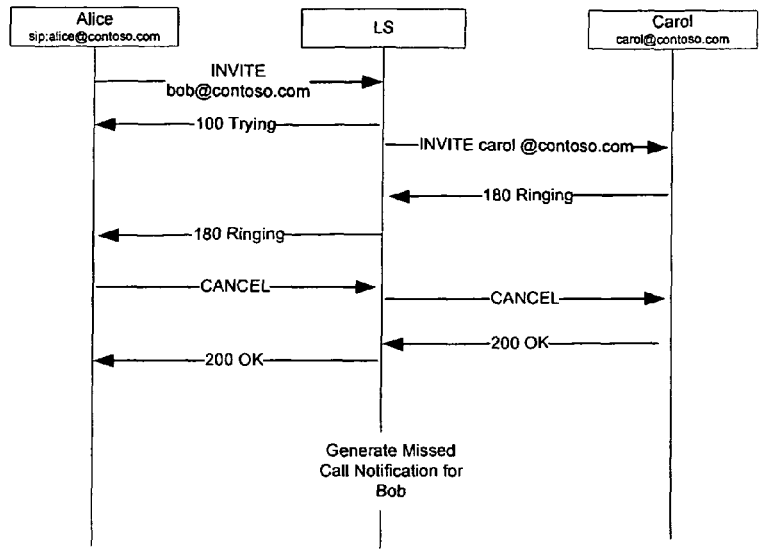

In one error condition, the Caller hangs up before the Team/Assistant answers. FIG. 44 illustrates the flow for the system addressing the Missed Caller error condition according to one embodiment of the present system, described as follows:

Alice calls Bob.
LS forks the call to Carol directly, because of Bob's setting.
LS also adds Ms-Target-Class: secondary header indicating that the call was a Team ringing.
Carol's phone rings.
Alice hangs up before Carol can answer.
LS cancels Carols' call.
Carol's OC stops ringing.
LS generates a missed call notification (Exchange may generate the missed call notification. Live server may send a message to Exchange UM instructing it to generate missed call).
Bob gets a missed call notification.

Figure 45:
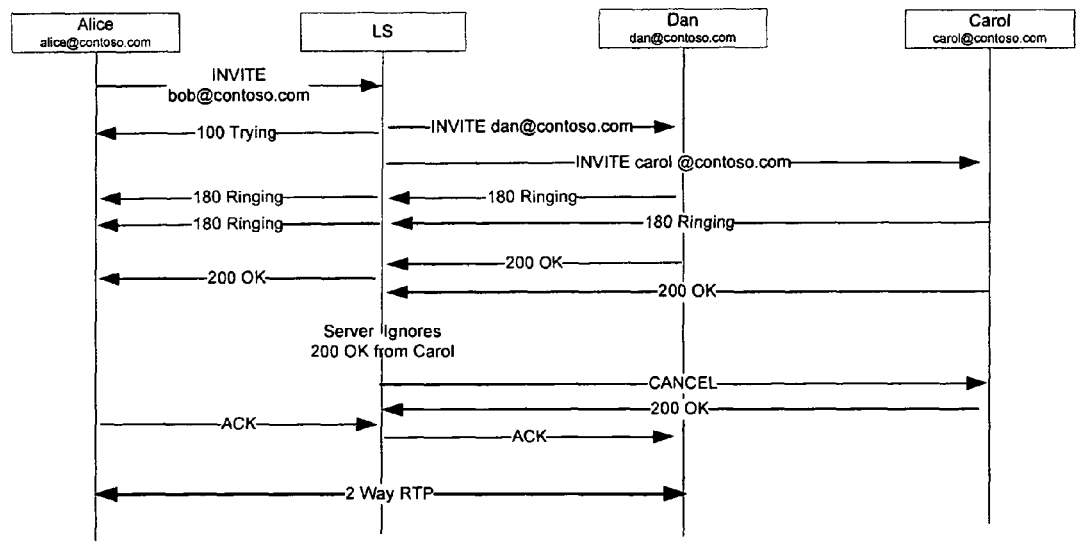

In another error condition, two users answer at the same time. In this scenario, Bob has set Carol and Dan to receive calls on his behalf. FIG. 45 illustrates the flow for the system addressing the Double Answer error condition according to one embodiment of the present system, described as follows:

Alice calls Bob.
LS forks the call to Carol and Dan directly, because of Bob's setting.
LS also adds Ms-Target-Class: secondary header indicating that the call was a Team ringing.
Carol and Dan's phone ring.
Both Carol and Dan pick up at the same time.
Dan is able to talk to Alice.
Carol gets an error notification.
Carol hangs up.

Figure 46:
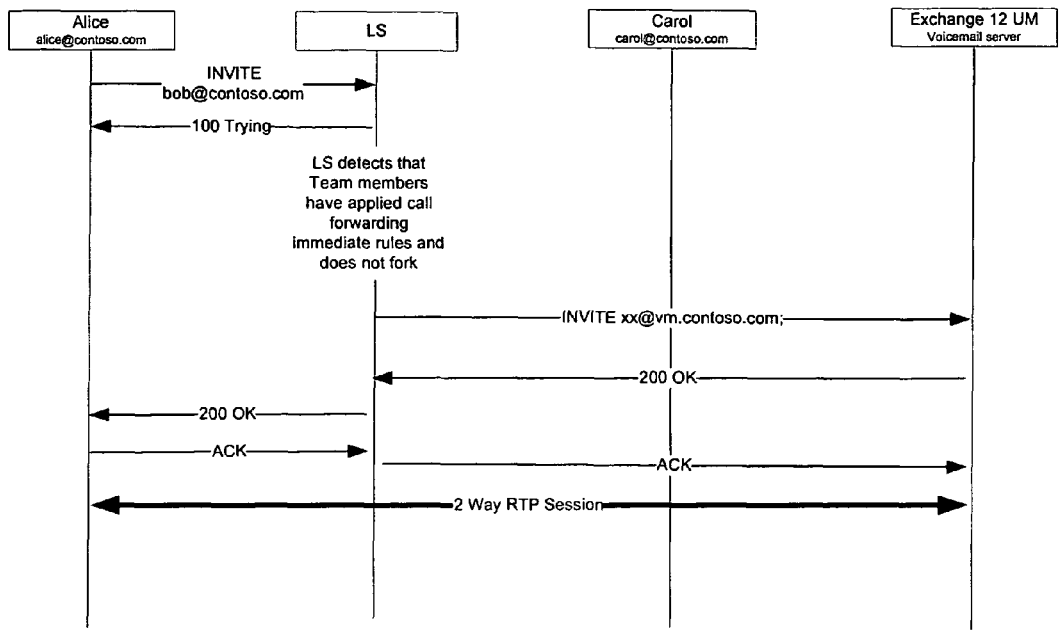

In another error condition, the Team/Assistant has set up call forwarding. A user's call forwarding rules may be applied if the incoming call is a TeamCall. This is to prevent a cascading effect on the server. FIG. 46 illustrates the flow for the system addressing the Team member has set call forwarding error condition according to one embodiment of the present system, described as follows:

Alice calls Bob.
Bob has set the phones of Carol and Dan to ring.
Both Carol and Dan have forwarding rules which are active at this given time. LS detects this condition and does not fork the INVITE to their endpoints.
LS redirects Bob's call to voicemail directly.

In another error condition, the Team/Assistant has set up Team/Assistant [nesting]. The system may not allow for cascading of TeamCalls with TeamCalls. The incoming call may ring the user directly and will bypass any TeamCall ringing for that user.

Figure 47:
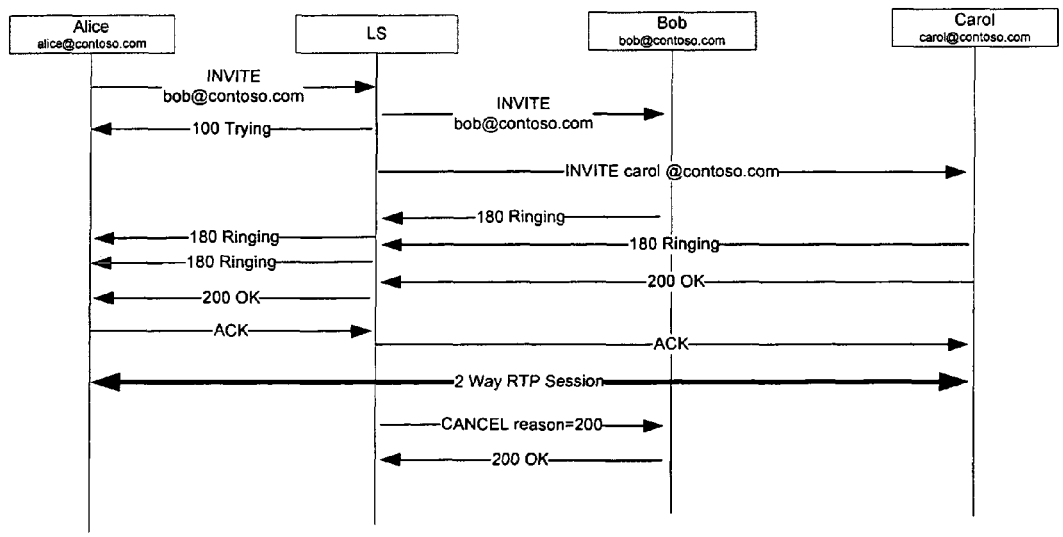

In another feature of the system, the Ring Me and Then Team scenario, the Team/Assistant and the user may be ringed simultaneously. The user has an option to ring the Team/Assistant simultaneously, or ring the user first for a preconfigured amount of time (say ten seconds) before ringing the Team/Assistant together. In addition, the user can select to choose to ring one person randomly ahead and LS will ring that person for five seconds before ringing other team members. Pre conditions are that: Alice and Bob not in a call; Carol is Bob' assistant and Bob has set OC to ring Carol and him together. Post conditions are that Alice is talking to Carol. FIG. 47 illustrates the flow of the Ring Me and Then Team feature according to one embodiment of the present system, described as follows:

Alice calls Bob.
LS forks the call to Bob first.
LS also adds Ms-Target-Class: primary header indicating that the call is meant for Bob.
Bob gets an incoming call notification. Bob does not pick up in ten seconds
LS forks the call to Carol.
LS also adds Ms-Target-Class: secondary header indicating that the call was not originally intended for Carol.
Carol gets an incoming call notification with information that the call was intended for Bob.
Carol picks up the call and talks to Alice.
Carol's conversation history indicates that the call was received on behalf of Bob.
Bob receives a missed call notification with an indication that the call was picked up by Carol.

Alternative flows are possible for the Ring Me and then Team scenario. Examples of which are described as follows.

Figure 48:
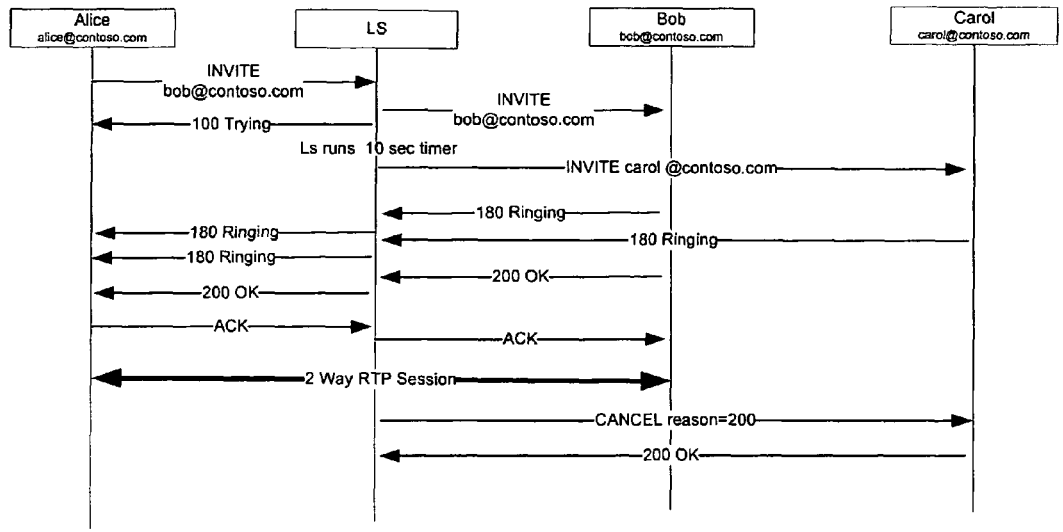

In one scenario, the original callee, Bob, picks up the call before Carol. FIG. 48 illustrates the flow of the Original Callee pick up feature according to one embodiment of the present system, described as follows:

Alice calls Bob
LS forks the call to Bob first
LS also adds Ms-Target-Class: primary header indicating that the call is meant for Bob
Bob gets an incoming call notification. Bob does not pick up in ten seconds
LS forks the call to Carol
LS also adds Ms-Target-Class: secondary header indicating that the call is not meant for Carol.
Carol's OC can know that the call is meant for Bob from the To: header.
Carol gets an incoming call notification with information that the call was intended for Bob.
Bob picks up the call and talks to Alice
Bob's conversation history records that he received a call.

Other scenarios described elsewhere herein with respect to other features are also applicable to the Ring Me and Then Team feature, including: User or Team member/Assistant deflect to voicemail; Team member/Assistant forwards to Original Callee; and/or Team member/Assistant consults the Original Callee and Transfers Call.

Error conditions described elsewhere herein with respect to other features are also applicable to the Ring Me and Then Team feature, including: Caller hangs up before the User or Team/Assistant answers; Multiple users answer at the same time; Team/Assistant has set up call forwarding; and/or Team/Assistant has set up Team/Assistant (nesting).

Figure 49:
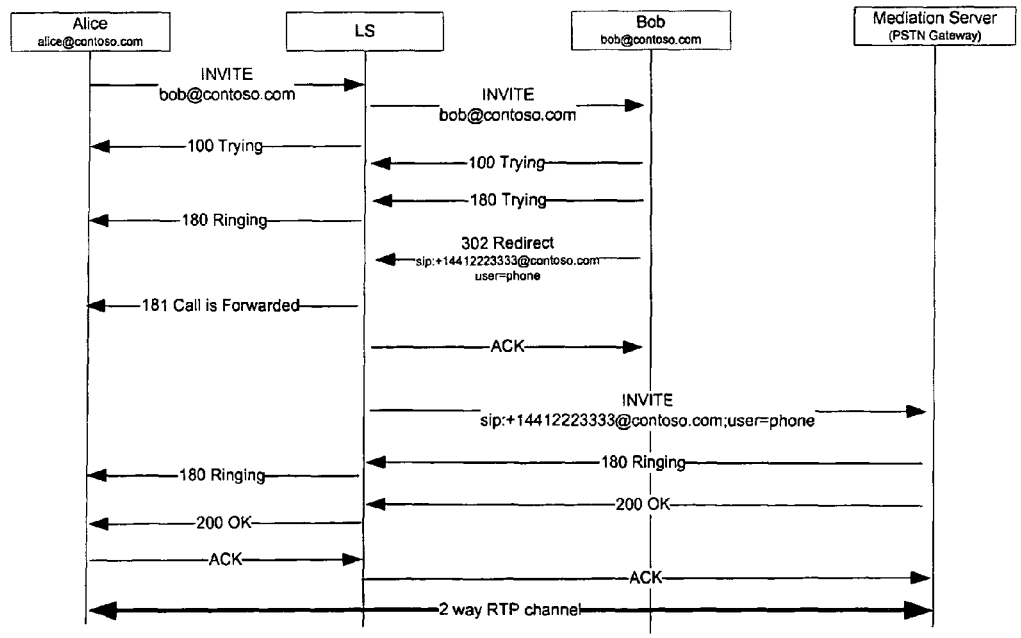

In another feature of the system, termed Deflect Calls, the user may manually select to deflect incoming calls to other numbers or send the call to voicemail. In this context, "Deflection" means manual deflection from the incoming call notification. Pre conditions are that Bob and Alice not in a call. Post conditions are that Bob has deflected Alice's call to another destination. FIG. 49 illustrates the flow of the Deflect Calls feature according to one embodiment of the present system, described as follows:

Alice calls Bob.
Bob sees an incoming call notification.
Bob selects to deflect the call to his mobile number from the incoming call notification.
OC sends out a "302" redirect indicating the SIP URI with user-phone setting.

LS sends out an INVITE to the PSTN gateway based on the user=phone URI.

Bob's mobile rings.

Bob picks up and talks to Alice.

Alternative scenarios for the Deflect Calls feature are possible. Examples of which are described as follows.

Figure 50:
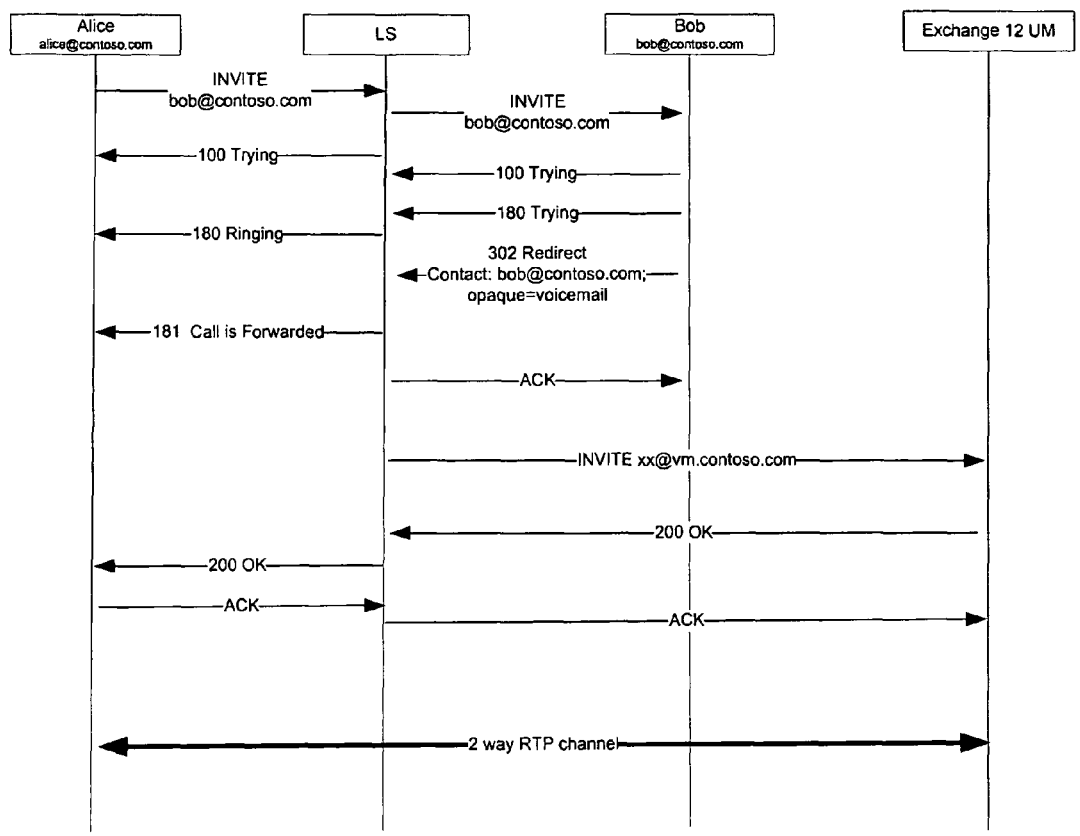

In one scenario, termed Deflect Calls to Voicemail, users may deflect incoming calls to voicemail so that it is not picked up by call forwarding or Team settings. FIG. 50 illustrates the flow of the Deflect Calls to Voicemail feature according to one embodiment of the present system, described as follows:

Alice calls Bob.

Bob sees an incoming call notification.

Bob selects to deflect the call to his voicemail.

OC sends out a "302" redirect with bob's SIP URI and opaque=voicemail indicator.

LS retargets the request to dialplan@vm.contoso.com based on the request received from Alice.

Alice hears Bob's voicemail greeting and decides to leave a voice message.

In another scenario, termed Deflect app-INVITE to other number, the user deflects the app-INVITE for an incoming conference to a PSTN number. FIG. 51 illustrates the flow of the Deflect app-INVITE to other number feature according to one embodiment of the present system, described as follows:

Alice is in a conference with Carol and Dan.

Alice adds Bob to the conference.

Bob sees an incoming call notification.

Bob decides to deflect the call to his mobile number.

Bob's OC sends a C3P AddUser command to the AVMCU requesting Dial Out.

MCU dial's out to Bob's mobile number.

Bob sees an incoming call on his mobile.

Bob accepts the call and joins the conference.

One Error condition that may be addressed by the present system include when the Caller hangs up on receiving the "302". In this case, there will be no trace of the calls that were missed in the system. Another error condition occurs when the Caller hangs up when ringing the redirected endpoint In this case, there will be a missed call notification that is deposited with the new destination.

The forwarding rules, further described elsewhere herein, may be stored in the users presence document. The users presence document may be available to all Communicator clients, and to future versions of applications and the IP Phone.

FIG. 52 is a graphical tabular listing of rules that may be on the server of the present system. The OC may send out this configuration in the presence doc to the server to indicate which options have been turned on. If there is no routing XML published, then server may continue to ring the user's registered endpoints but the call will not be redirected to voicemail on no-answer. The OC may need to set up the XML on first-run when it detects that there are no forwarding rules. On startup, OC may detect if the user is UC enabled, and decide to publish the routing rules.

A combination of the following elements may be used to achieve the desired call settings according to various embodiments of the present system.

The following flags may control forwarding: none; teamring_simultaneous; teamring_direct; simultaneous_ring; forward_immediate.

The following flags are complementary and may be added in addition to the flags above:

one_ahead: only applies to teamring_direct and teamring_simultaneous dnd: applies do not disturb. This is set when the client wants to turn on DND. Note that DND wait time should also be set appropriately for the feature to work correctly.

block: applies blocking rules. This is set if the user wants to block all calls. It may only used in the blocking rules.

There are four ring durations that the client may need to fill up depending on what the user selects. Total: is always the number that the user selected in the ring duration. This duration is re-used in the Call-Forward immediate scenario as the maximum time to ring the destination. User: is the time that the user's own phone rings. It is set to zero if teamring_simultaneous is true, otherwise user=10. Team1: is the time that the first team member shall be ringed. It is valid only when one_ahead flag is selected from the checkbox. Therefore Team1 will be: five seconds when one_ahead is specified, zero seconds otherwise. Team2: may always be set to (Total—User−Team1).

When teamring_simultaneous, or teamring_direct setting is selected, then a list with the expanded team members may be specified. Note that the server may not have the capability to expand the team. OC will also add the oc:GroupType and oc:GroupId parameters identifying the group so that it can be kept up to date. Example syntax is:

```
<list name="team" oc:GroupType="dg" oc:GroupId="dg@contoso.com">
<target uri="sip:dan@ms.com"/>
<target uri="sip:carol@ms.com"/>
</list> .
```

Note:
GroupType can currently by "dg" or "group".

The following XML illustrates direct team ringing, with one person randomly ahead and with call forwarding on no answer set to a user's mobile number. The user has also set himself to the DND state.

For Low Container:

```
<category name="routing" flag="do_not_notify">
<routing xmlns="http://schemas.com/02/2006/sip/routing"
xmlns:oc="http://schemas. com/02/2006/sip/routing/oc">
<preamble>
<list name="team" oc:GroupType="dg" oc:GroupId="dg@contoso.com">
<target uri="sip:dan@ms.com"/>
<target uri="sip:carol@ms.com"/>
</list>
<!-- Single entry list with either voicemail or cell-phone -->
<list name="forward_unanswered">
<target uri="sip:+2223334444@contoso.com;user=phone"/>
</list>
<wait name="user" seconds="10"/>
<wait name="team1" seconds="5"/>
<wait name="team2" seconds="5"/>
<wait name="total" seconds="20"/>
<!-Flags for features that are enabled -->
<flags name="features" value="dnd, teamring_direct, work_hours"/>
<!-If no <timezone> flag is present then UTC Offset is assumed-->
<time name="work hours" dow="mon,tue,wed,thu,fri"
range="8:30–17:00" >
<time name="dnd" range="-2006/02/14 11:59">
<timezone>
<.... Timezone information...>
</timezone>
</preamble>
</routing>
</category> .
```

Note:
The category name and flag are examples. OC may set DO NOT NOTIFY in the category so that other users are not able to subscribe for notifications on these rules.

For Exceptions Container:

```
<category name="routing" flag="do_not_notify">
<routing xmlns="http://schemas.com/02/2006/sip/routing"
xmlns:oc="http://schemas.com/02/2006/sip/routing/oc">
<preamble>
<list name="team" oc:GroupType="dg" oc:GroupId="dg@contoso.com">
<target uri="sip:dan@ms.com"/>
<target uri="sip:carol@ms.com"/>
</list>
<!-- Single entry list with either voicemail or cell-phone -->
<list name="forward_unanswered">
<target uri="sip:+2223334444@contoso.com;user=phone"/>
</list>
<wait name="user" seconds="10"/>
<wait name="team1" seconds="5"/>
<wait name="team2" seconds="5"/>
<wait name="total" seconds="20"/>
<!--Flags for features that are enabled -->
<!-Note that DND flag is never added to this container -->
<flags name="features" value="teamring_direct, work_hours"/>
<!-If no <timezone> flag is present then UTC Offset is assumed-->
<time name="work hours" dow="mon,tue,wed,thu,fri"
range="8:30–17:00" >
<timezone>
<.... Timezone information...>
</timezone>
</preamble>
</routing>
</category>.
```

Note:
The category name and flag are examples. OC may set DO NOT NOTIFY in the category so that other users are not able to subscribe for notifications on these rules.

For the Blocked List container, the call blocking rules may be special and statically configured:

```
<routing xmlns="http://schemas.com/02/2006/sip/routing">
<preamble>
<!-Flags for features that are enabled -->
<flags name="features" value="block"/>
</preamble>
</routing>.
```

FIG. 53 is a graphical tabular illustration showing how the above settings are used to achieve a particular feature according to various embodiments of the present system. FIGS. 54A-C are graphical tabular illustrations summarizing the various data elements that may be needed to store and roam in the XML.

The system may fill the following timezone information into the rules.

```
<timezone bias="tzi.Bias">
<standard name="tzi.StandardName" (name is optional)
bias="tzi.StandardBias"
year="tzi.StandardDate.wYear"
month="tzi.StandardDate.wMonth"
dayofweek="tzi.StandardDate.wDayOfWeek"
day="tzi.StandardDate.wDay"
hour="tzi.StandardDate.wHour"
minute="tzi.StandardDate.wMinute"/>
<daylight name="tzi.DaylightName" (name is optional)
bias="tzi.DaylightBias"
year="tzi.DaylightDate.wYear"
month="tzi.DaylightDate.wMonth"
dayofweek="tzi.DaylightDate.wDayOfWeek"
day="tzi.DaylightDate.wDay"
hour="tzi.DaylightDate.wHour"
minute="tzi.DaylightDate.wMinute"/>
</timezone>.
```

Time for DG expansion can be twenty seconds. It may be desirable to not block the UX when a DG expansion is being attempted. To keep the user experience smooth and to reduce situations where it may be needed to bubble up group expansion errors, it may only be allowed that expanded DG's be added as a team. Users may first need to expand the DG in the contact list before adding them as a Team. Note that whenever the DG is expanded (8 hr intervals), then the routing rules may need to be updated appropriately if there are DG's set as team in the routing rules.

There may be several reasons why the server may not to configured to automatically set the DND state. Dipping into the presence for each incoming call would may cause a performance hit on the server, especially when very few (2%) of users will actually be in DND state. Having the server interpret the Presence states may make the server presence-aware, which may not be desirable. Keeping the DND as a flag may help have the granular control on turning it on and off from the client side.

The following data may be sent to the client via inband provisioning.

There may be a new per-user setting to indicate to the client that the user is UC enabled. This may be a Boolean value. Type: Boolean; Apply: Per-User; Provisioning method: inband (user-identity).

Voicemail URI is a string that may contain the voicemail URI for the user. LS will set this to <user's SIP URI>; opaque=voicemail. Type: String; Apply: Per-User; Provisioning method: in-band (user-identity).

Allow Team Ringing is a setting that may be used by the admin to allow or deny team ringing. The default would be to allow team ringing. Type: Boolean; Apply: Per-User; Provisioning method: in-band (user-identity).

Allow Simultaneous Ringing is a setting that may be used by admin to allow or deny simultaneous ringing. If this is set, then the user will not be able to configure simultaneous ring (the option will not be shown in the list box drop down). Type: Boolean; Apply: Per-User Provisioning method: in-band.

Now will be described routing functionality for a Live Server to handle incoming calls in case the user is unavailable. The user can choose the preferred call flow behavior by setting the team and call forwarding (absence) rules, as described elsewhere herein, that allow other users to answer the call on behalf of the called user and/or allow to forward the call to e.g. the users cell phone or his voicemail. The following description explains team and absence scenarios, for example for an enterprise Information Worker (IW). Functionality for addressing team and absence scenarios may be needed to allow the user to define routing rules on incoming calls so that according to the user's way of working and current situation, a call is answered in the—from the user perspective—most accurate way.

An Enterprise IW has become more and more mobile that includes travels, in-house and outside appointments, meetings, working from home, etc. The result is that there are several reasons why people may not be immediately available for communications at their workspaces. A variety of communication devices allow IWs to choose the right communication device for the right situation. The Live Server Inbound Routing functionality handles two important tasks: Distributing incoming communication requests to other available users in case the called user is unable to answer the call; Forwarding incoming communication requests to endpoints for automatic answering. Without intelligent inbound routing on Live Server important information for the user might be lost when he is not present. Note that the term "absence functionality" in may be used as a synonym for "call forwarding functionality".

Figure 55:
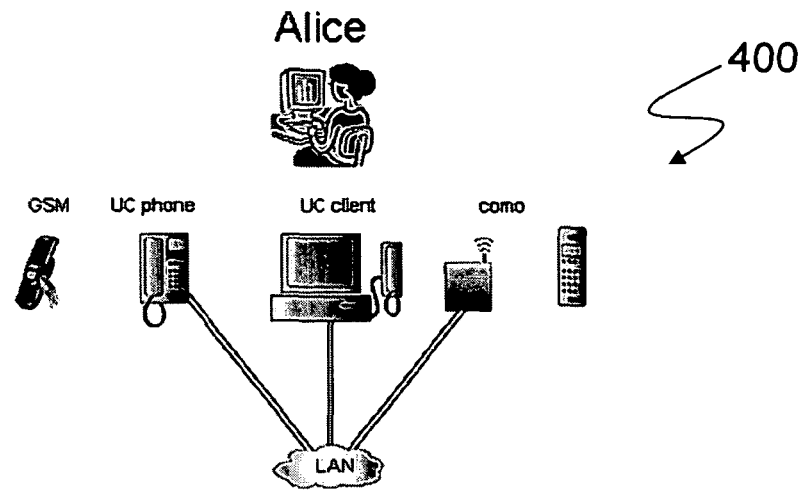
FIGS. 55-79 are schematic illustrations of call forwarding flow processes and configurations according to the system described herein.

A standard Information Worker in an enterprise that is using UC technology may have up to n devices registered for him/her at the same time, as schematically shown in the schematic diagram 400 of FIG. 55. An as example consider the scenario where IW Alice sits in an office together with three of her colleagues, Will is one of them. She is leaving the room for a meeting and may or may not lock her PC. Bob is calling Alice from outside the company. One or more of Alice's registered devices are ringing but she is not able to pick up the call right now. Alice's colleagues are unwilling or unable to pick up the call immediately from Alice's workspace phone. After 10 s ringing the call will be presented as a "team call" to Alice's colleagues (team inc. Will) and each one of them is able to pick up the call from their workspace. Will picks up the team call on behalf of Alice. Will as one of Alice's team members is able to answer the callers question immediately. Therefore Bob has been helped faster than leaving a voicemail message for Alice and waiting for her to reply. Apart from that it is much more polite and convenient for the caller to talk to a real person than to voicemail. (Maybe Alice was not even the right person to talk to.)

In addition to the team signalization for Alice's team member, Alice has to be informed about what has happened while she was absent. She has to receive an incoming call notification with the information that Will accepted the call on behalf of her. The reason for that is if Will isn't a reliable person and forgets to inform her that he accepted an incoming call on behalf of her, she wouldn't know that the call came in and wouldn't be able to track the answering of this call by asking Will what the caller wanted from her.

To realize the example above, the Live Server may provide "team signalization" functionalities since it may be the only component in the UC infrastructure that has complete control on all registered devices as well as access on presence states. A "team signalization" is a forked INVITE to one or multiple SIP URIs that are registered with Live Server using it's SIP URI. It is able to fork an INVITE parallel to one or n registered devices. The system may be configured such that only registered devices should be able to receive INVITEs as a result of a "team signalization". Non-SIP devices within the PSTN network may not be able to become team members.

In another example, Alice attends a meeting outside of her office. The only available communication device is her cell phone. As she is working in a team she wants the other team members to be able to pick up her calls (Bob calls) at first (team signalization). If no team member is able to pick up the call in a configurable time frame, the call may be forwarded to her cell phone number by the Live Server.

As with team signalization Alice may be getting an absence notification that Bob's call has been forwarded to her cell phone. The reason for that is that if she were unable to answer the call on her cell phone or the voicemail of the cell phone picked up the call but Bob decides not to leave a message for her, she would still be able to get the information that Bob originally tried to call her. Now she can call him back.

To realize the example above, Live Server may provide "call forwarding" functionalities since it may be a component in the UC infrastructure that has complete control even if there is no SIP device currently registered for the user. Call forwarding destinations may be registered SIP devices, PSTN phone numbers or voicemail. Voicemail may be the final place to store a message for the user when no one else is able to get this information on behalf of the user.

For Team & Absence functionalities for incoming IMs and Videos (VI), it is contemplated herein to answer incoming IMs and video requests automatically by Live Server Inbound Routing. Live Server Inbound Routing as described in this document may handle INVITEs flagged as "audio" or "audio/video". The reason that Inbound Routing will also handle "audio/video" is that a user could be part of an audio/video conversation even if his currently used device is just capable of handling audio.

Figure 56:
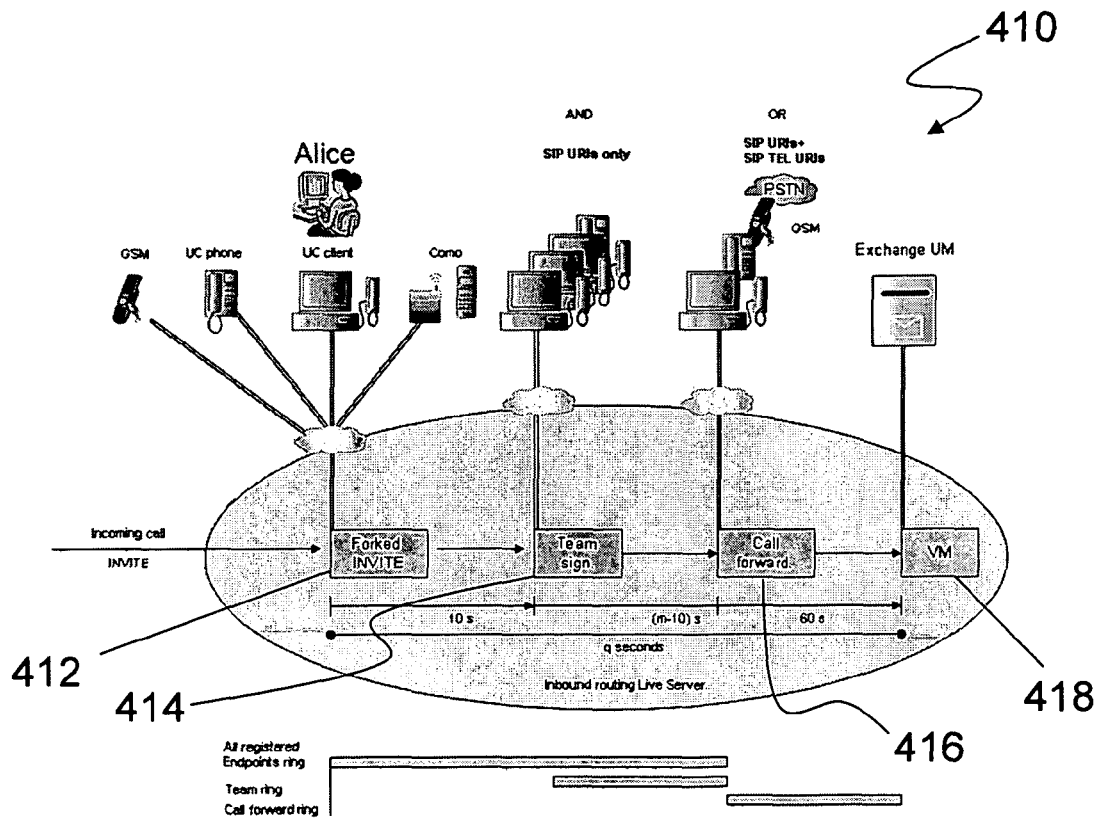

In a standard office environment with lots of Information Workers the combination of team and absence functionalities may allow the user to choose the best way to handle incoming calls according to his/her current situation. FIG. 56 shows a standard inbound call flow schematic diagram 410 with a combination of team and absence (call forwarding) functionalities according to one embodiment of the system. On an incoming call (media type "audio") the call may be forked to any users registered devices. If the user has simultaneous call ringing enabled, incoming calls will even be forked to external devices like a cell phone. If none of the registered devices accepts the incoming call within ten seconds (e.g., hard coded on Live Server, not configurable), the INVITE will be forked 412 to the callee's team members. In addition to the registered devices that signalize the incoming call, all team members' registered devices (no PSTN phones) may signalize the incoming call for the originally called user as a team signalization 414. Now the user with all its registered devices as well as each team member with all its registered devices to Live Server will be able to accept the call. Live Server may provide an addition to INVITE messages that allow registered devices to differentiate between an INVITE as a result of a team signalization and an INVITE as a result of an incoming direct call or a forwarded call.

If none of the team members accepts the team signalization within (m−10) seconds (m is configurable on UC client and is less than one hundred twenty and greater than fifteen seconds, the call may be forwarded to a forwarding destination 416. This can be a SIP URI, a PSTN phone number or voicemail. All team signalization and incoming call signalization will stop. If even the call forwarding destination is unable to accept the call, call may be forwarded to voicemail 418 after a maximum call duration time of q seconds, as further described elsewhere herein.

There are various scenarios that can interrupt the above-described standard inbound call flow. These exceptions will now be explained.

The following description includes requirements for Live Server Inbound Routing capabilities based on currently available options of a UC client. The UC client may be the preferred device for Live Server as it has access on most accurate information about what the user is currently doing. The maximum time a call can be processed within Live Server call routing may be set to q=m+60 seconds: m may be a timer that the user can configure in the UC client GUI; qmax may be set to one hundred eighty seconds ringing state on Live Server. After that the final routing step may be applied. One hundred eighty seconds may also be the maximum time an INVITE stays alive after sending a "1xx" (not "100") response.

In one embodiment, the algorithm for team signalization may be selected as follows, and as further described elsewhere herein. Ring Me only (default): an incoming call for a user will not been signalized to other user's registered devices. Ring Me simultaneously with team: an incoming call to the user will be signalized to the user's registered device(s) and immediately also to registered devices of other user (team members). Ring Me and then me with team simultaneously: for the first ten seconds the user's registered devices will ring exclusively. In addition to that the incoming call will after ten seconds also been signalized as a team signalization to the other user's registered devices (team members). Ring Team Only, do not ring me: an incoming call to the user will not been signalized to the user's registered devices but only to the registered devices of the other user's (team members). Ring my PSTN phone numbers (simultaneous ring): an incoming call to the user will be signalized to the user's registered devices as well as to a configured PSTN phone number (e.g. PSTN phone number). Lists of SIP URIs may be configured in the user's contact list of UC client. One of these lists can be selected as a team member list. Maximum time that an endpoint rings before call forwarding or voicemail may be executed.

Incoming calls may first being signalized to the user and/or team members (depending on incoming call ring setting). Only if no one answers the call after m seconds, it may be forwarded to the designated destination (SIP URI, PSTN phone number or voicemail). The user can choose the voicemail announcement message. Since team and absence settings are being configured via UC client for all registered devices, the same team and absence behavior may apply for all registered devices.

The following TABLE 1 is a list of features according to various embodiments of the system.

TABLE 1

List of Features

Multiple registered devices available and no simultaneous ring of PSTN numbers configured
No registered devices available and no simultaneous ring of PSTN numbers configured
Registered devices available and simultaneous ring of PSTN phone numbers enabled
No registered device available and simultaneous ring of PSTN phone numbers enabled
Blocking of incoming calls from particular users
Incoming INVITE contains a specific EPID
User is in "Do not disturb" mode
User is in "Appear offline" mode
Call deflection by user
Answering an incoming call by sending an IM
Answering an incoming call by the user
Ring my PSTN phone numbers (simultaneous ring)
Ring only my registered devices (Ring me only)
Ring me simultaneously with team
Ring me first then simultaneously with team
Ring my team only, do not ring me
Ring one team member ahead
No team signalization for private calls
Time based execution of team or call forwarding rules
No diversion on incoming calls via Samara
Call forwarding if unanswered
Call forwarding immediately
Missed call notification
Policy Management
Exception handling Various scenarios addressed by the system will now be considered and described.

Figure 57:
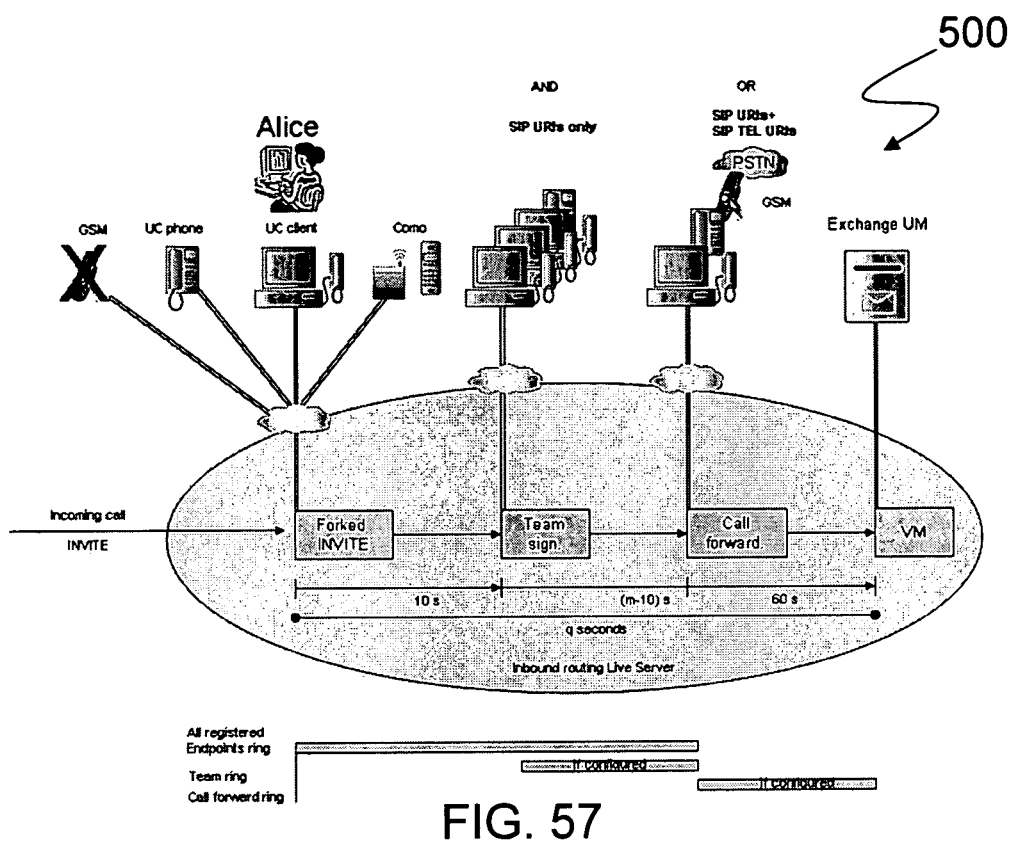
Figure 58:
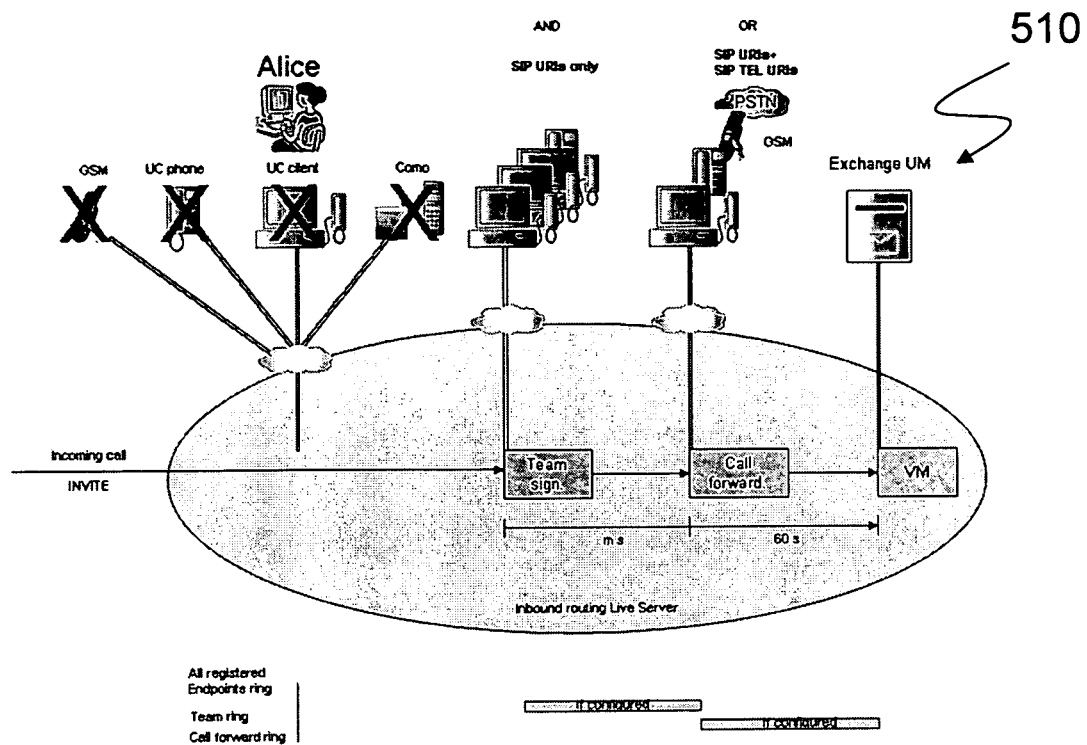

In one scenario, as illustrated in a schematic flow diagram 500 shown in FIG. 57, multiple registered devices are available and no simultaneous ring of PSTN numbers is configured. An incoming call may be forked to all registered devices of the user. All devices will receive this call as a "normal" call for the user. In one embodiment, a requirement for the Live Server may be that incoming INVITEs have to be forked to all registered devices of a user In another scenario, as illustrated in a schematic flow diagram 510 shown in FIG. 58, no registered devices are available and no simultaneous ring of PSTN numbers is configured. Since none of the user's devices are registered to Live Server, team signalization or even call forwarding (next routing step) may occur immediately. In one embodiment, requirements for the Live Server may be as follows. Live Server has to be able to determine that there is no user device currently registered. Live Server has to check if no simultaneous ring of PSTN numbers is being configured for the user. Live Server has to proceed with the next routing step (team or call forwarding) immediately.

Figure 59:
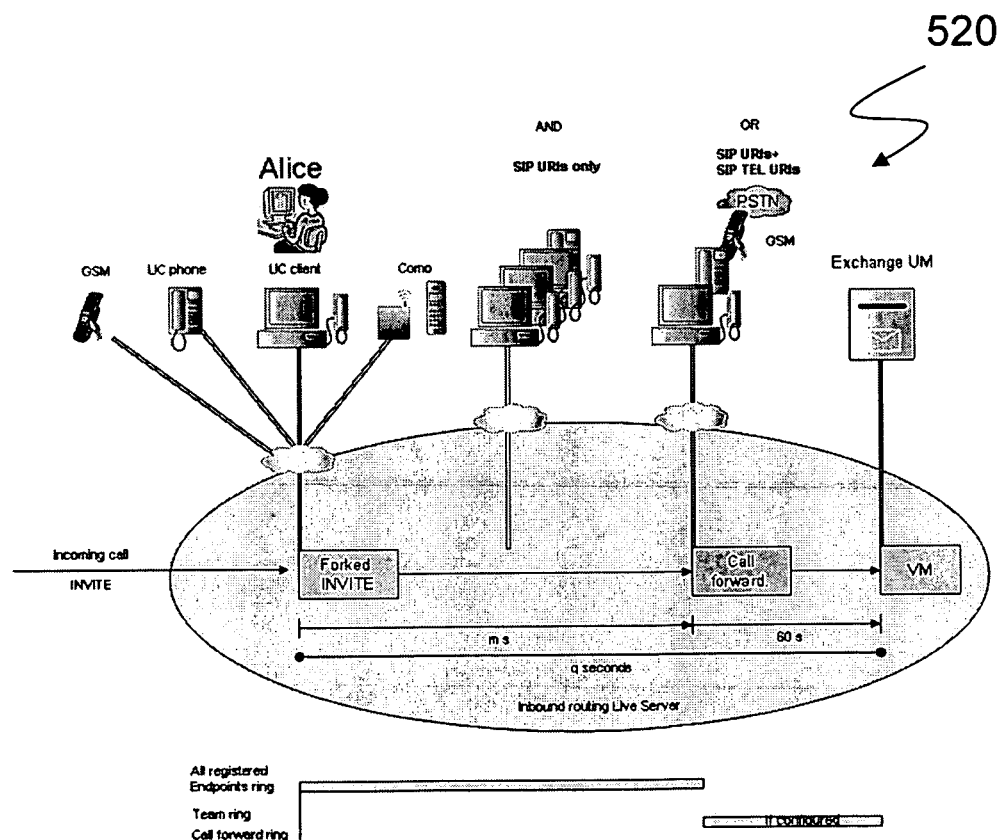

In another scenario, as illustrated in a schematic flow diagram 520 shown in FIG. 59, registered devices are available and simultaneous ring of PSTN phone numbers is enabled. The user may be able to pick up an incoming call on any of his devices as well as on his cell phone or DECT phone (PSTN phone number). In one embodiment, requirements for Live Server may be as follows. On an incoming INVITE Live Server has to fork the INVITE to all registered devices. Live Server has to send an INVITE via Gateway to a PSTN phone number (e.g. cell phone). If the user picks up the call on his cell phone, no notification to the user's Outlook Inbox shall apply. Live Server Inbound Routing may have a "backdoor" that allows to delay the simultaneous ringing of the PSTN phone number for a couple seconds. Reason for that is that if it turns out that users are getting confused with the nearly simultaneous ringing of cell phones (some delay will be there because of the cell phone network) it is possible to delay a bit more so that the user in most cases, when he is at his desk, will pick up the call with one of his registered devices before the "delayed" simultaneous device will ring.

Figure 60:
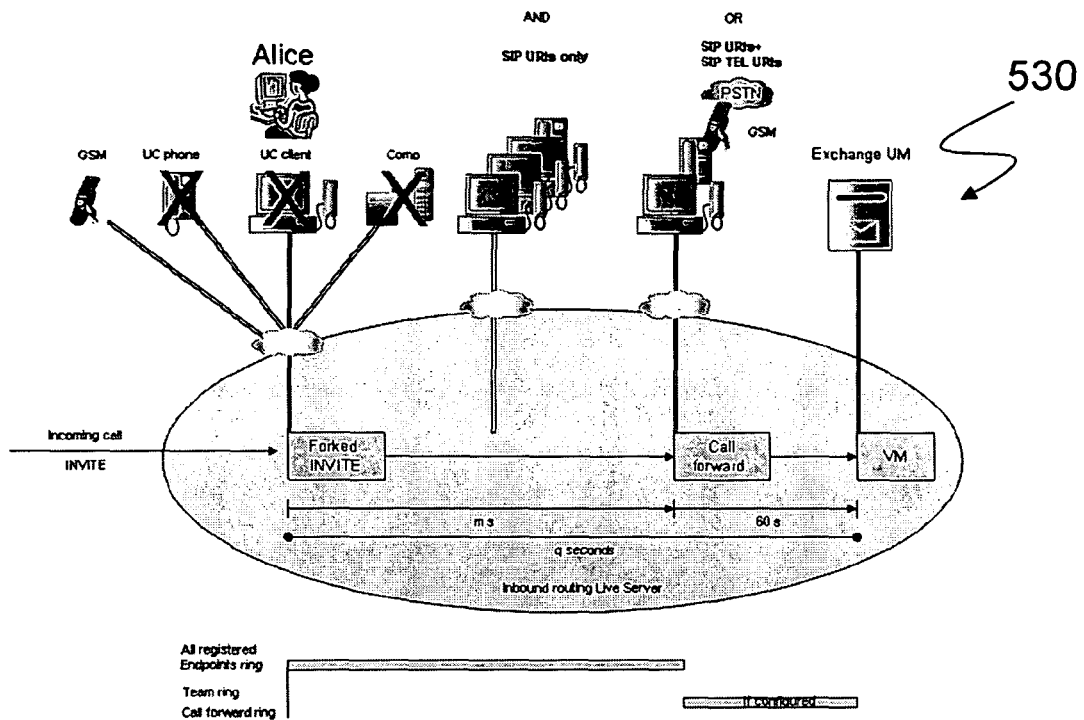

In another scenario, as illustrated in a schematic flow diagram 530 shown in FIG. 60, no registered device is available and simultaneous ring of PSTN phone numbers is enabled. The user wants to receive all his incoming calls on his cell phone at first. In one embodiment, requirements for the Live Server may be as follows. Live Server may send an INVITE via Gateway to e.g. cell phone immediately. If the user picks up the call on his cell phone, no notification to the user's Outlook Inbox may apply. Live Server must insert P-Asserted-Identity header with the calling party's SIP TEL URI (phone number) so that a voice gateway can provide it as a caller ID.

Figure 61:
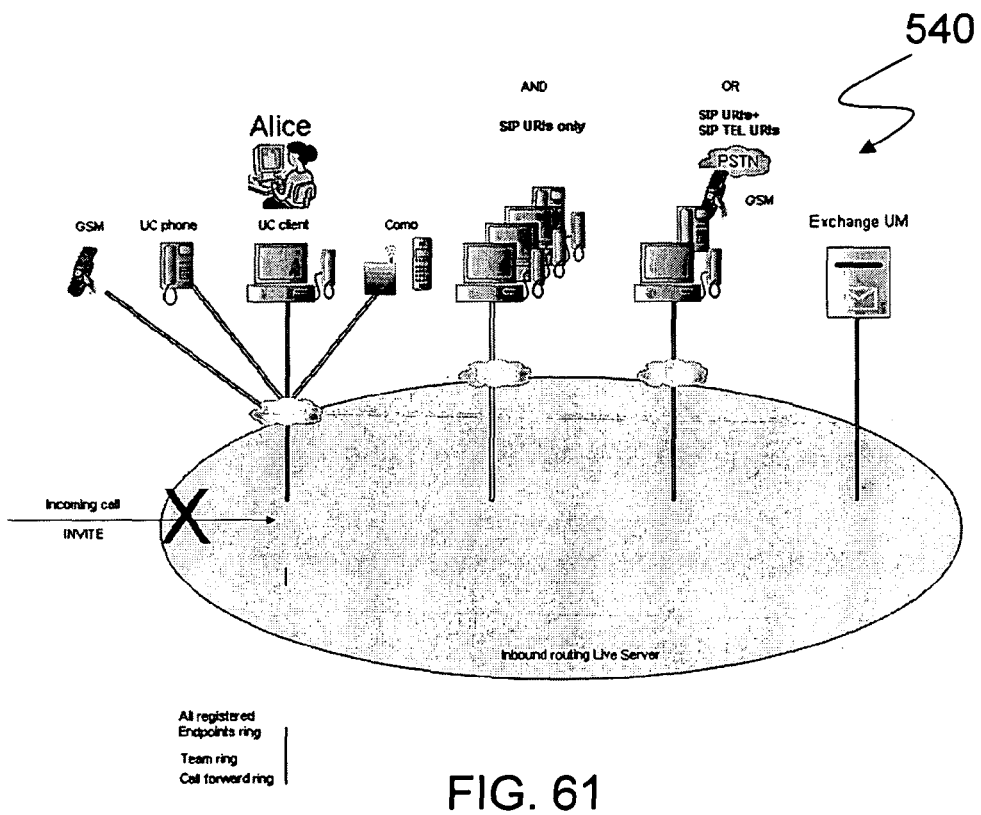

In another scenario, as illustrated in a schematic flow diagram 540 shown in FIG. 61, blocking of incoming calls from particular users is possible. This feature comes originally from the IM world where it was possible to configure a "Block list" of users that are not allowed to contact the user via IM. By implementing this feature in the voice world, the following user intention will be assumed: "If I block somebody, I don't want to communicate with this person at all". Any incoming call from a blocked user may not be signalized to any of the user's devices at all. In one embodiment, requirements for the Live Server may be as follows. Live Server may execute the preamble that is stored in the appropriate container for the calling user. In a blocked scenario this preamble will generally tell Live Server to drop the call. No busy signalization or announcement may be made to the calling user. No ringing of registered devices, team signalization and call forwarding rules will apply. No missed call notification to the user may occur.

Figure 62:
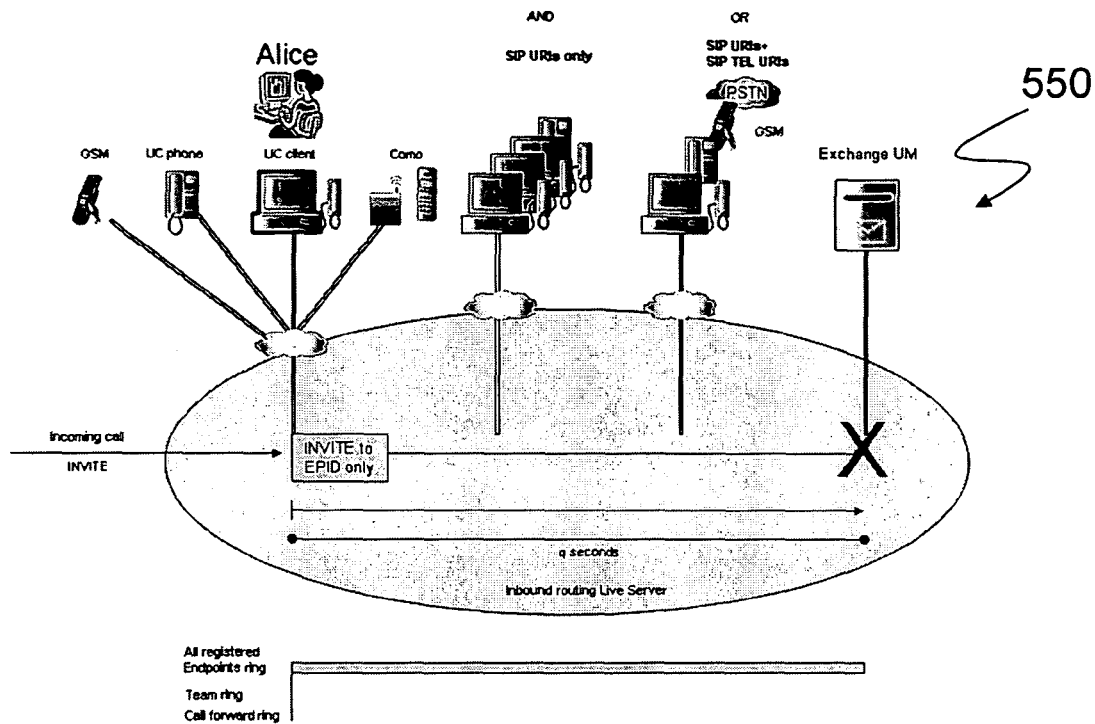

In another scenario, as illustrated in a schematic flow diagram 550 shown in FIG. 62, incoming INVITE contains a specific endpoint ID (EPID). As a result of e.g. a consultative transfer the call INVITE may contain the specific EPID. In this case there would have been a conversation with this endpoint before; otherwise there wouldn't be an EPID in the INVITE. Therefore it makes sense not to apply team and call forwarding rules to calls that contain an EPID in the INVITE. In one embodiment, requirements for the Live Server may be as follows. If an INVITE contains a specific EPID, the INVITE may be sent only to the registered device that uses this EPID. No team and call forwarding rules may be applied on INVITEs that contain a specific EPID by Live Server. If the registered device with the EPID does not answer the call within q seconds, call will be failed with a "480" (disconnected). If the EPID device is not registered, Live Server may reject the call immediately with a "480" (disconnected). If the call is being deflected, call deflection to the designated call deflection destination may be applied. If a call INVITE is marked "private" and there is an EPID in the INVITE, "private" flag may be ignored by Live Server.

Figure 63:
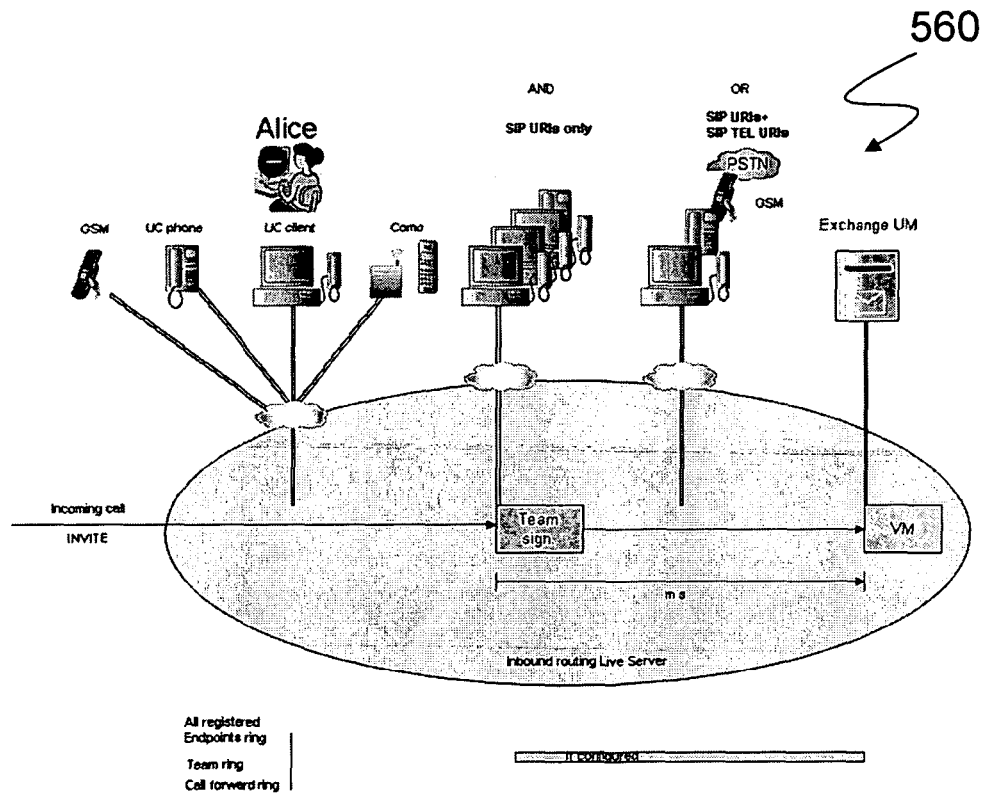

In another scenario, as illustrated in a schematic flow diagram 560 shown in FIG. 63, a user is in DND mode. If somebody calls a user that is currently in DND mode, the assumption is that the user does not want to pick up the call. Reasons for a user to be in DND mode could be that the user is currently doing a presentation or is participating in a phone conference. Anyhow the user's team members shall be able to answer the call. If none of the team members picks up the call or if there is no team signalization configured, the call may be answered by voicemail only. If the user configured other call forwarding rules than forward to voicemail, these rules may not be applied in this case. In one embodiment, requirements for the Live Server may be as follows. Live Server may be able to detect that user is currently in DND mode. The current idea is that UC client sends a "603" that will stop all registered devices from ringing. If the user is in DND mode, none of the registered devices including "simultaneous ring" devices will ring. Team signalization, if configured, may be applied. User configured call forwarding rules may be skipped and call forwarding to voicemail will be applied after team signalization (if configured, otherwise immediately). UC client sends a preamble for the DND case to the container that contains a time stamp. If the preamble is not been renewed with a new timestamp by the client (this would be the case if the client "dies" while in DND mode), Live Server will execute the preamble and ignores the DND flag. This means users usually configured routing rules will be applied.

Figure 64:
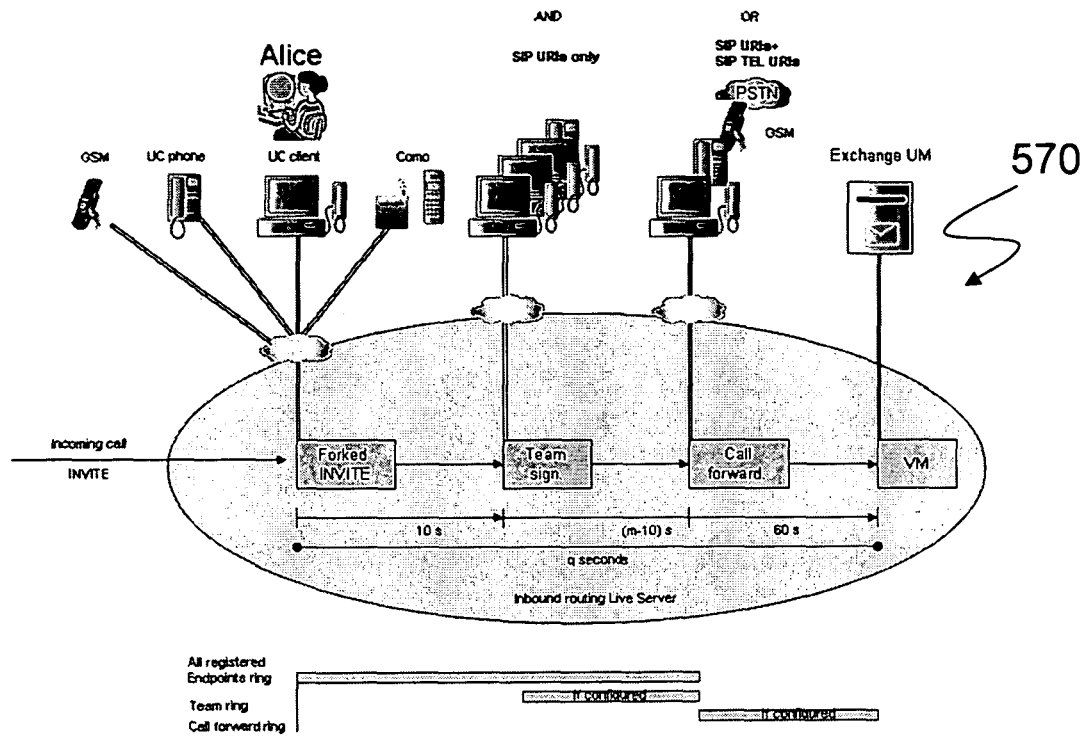

In another scenario, as illustrated in a schematic flow diagram 570 shown in FIG. 64, a user in "Appear offline" mode. The user can actually be or put himself on purpose into "Appear offline" presence state to be able to work without getting disturbed by phone. This is being interpreted as the user himself is currently unable to receive incoming calls on the particular devices that are in "Appear offline" mode. Even though the user is currently unable to pick up the call he still wants to enable his team members or call forwarding destination to answer the call. The user can choose if team signalization may be applied if offline. If no team signalization may be applied, call forwarding rules may be executed immediately. In one embodiment, requirements for the Live Server may be as follows. Live Server will fork an incoming call to all registered devices incl. simultaneous ring devices if configured. Devices that are in appear offline mode will return a "480" response that stops this device from ringing. If the user does not pick up on one of his registered devices within ten seconds, Live Server has to proceed with the next routing step (team or call forwarding) according to the chosen team or call forwarding algorithm.

Figure 65:
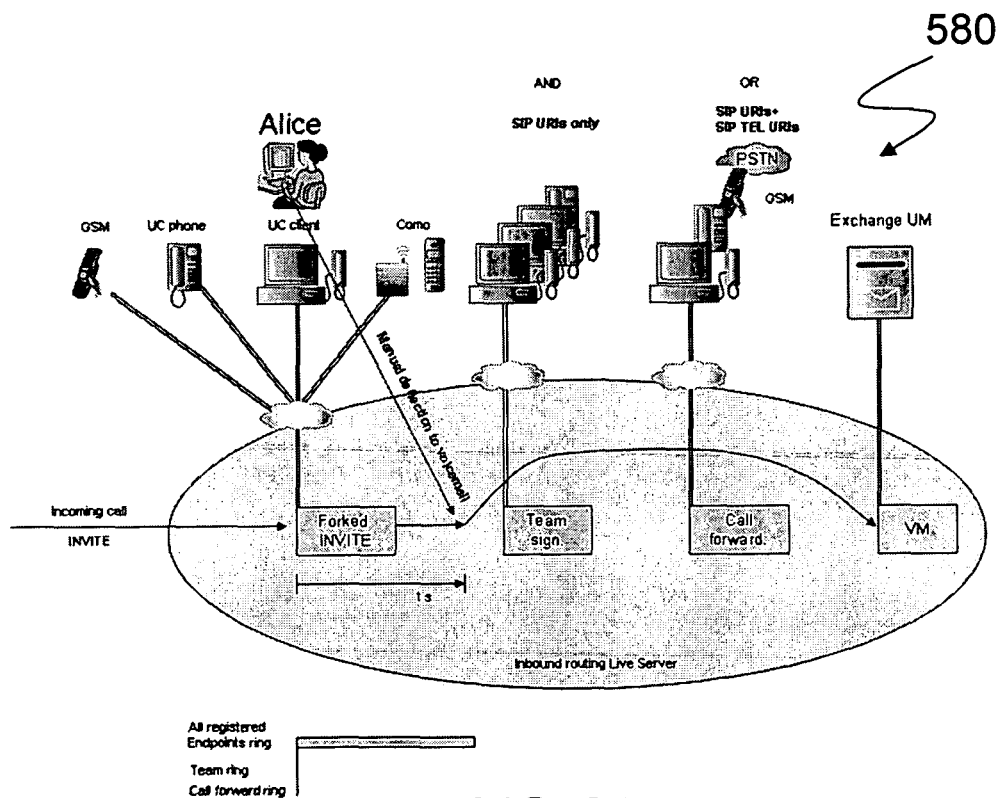
Figure 66:
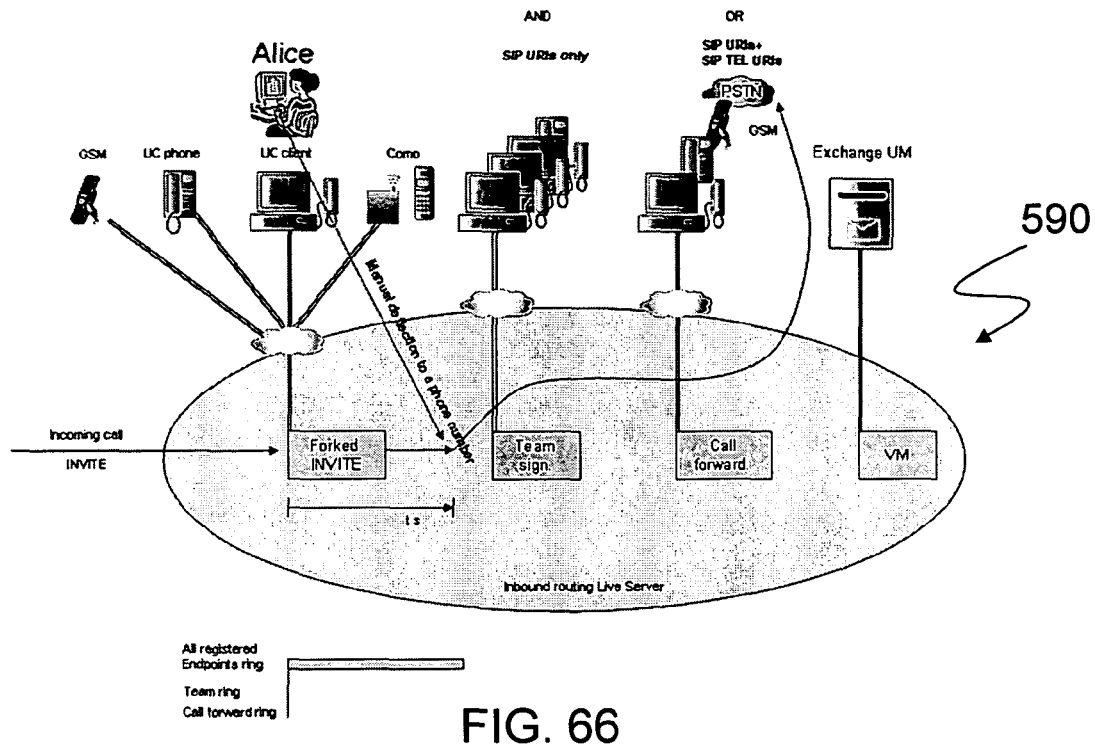

In another scenario, a user desires call deflection. FIG. 65 illustrates a schematic flow diagram 580 of the scenario of manual deflection to voicemail and FIG. 66 illustrates a schematic flow diagram 590 of the scenario of manual deflection to a phone number. The user should have the possibility to deflect a call to a different location in ringing state without having to accept the call and transfer the call afterwards. This makes sense when the user is e.g. currently in another call or just does not want to answer the incoming call right away but also does not want the team or call forwarding rules to be applied by Live Server.

In one embodiment for manual deflection to voicemail, requirements for the Live Server may be as follows. On an incoming call Live Server will fork the INVITE to all registered devices. If Live Server receives a "302" response code with user's SIP URI and ms-app:voicemail indicator, Live Server refers the INVITE to voicemail. If the user deflects the call while team ringing is already in progress, team ringing stops.

As noted above, instead of deflecting the call to voicemail, the user may want to deflect the incoming call to a team assistant, receptionist or his PSTN phone number (e.g. cell phone). Therefore the functionality deflect to phone number is needed. In one embodiment, requirements for the Live Server may be as follows. On an incoming call Live Server will fork the INVITE to all registered devices. If Live Server receives a "302" response code with the designated forwarding destination SIP URI attached to it, Live Server refers the INVITE to this SIP URI and team signalization and call forwarding rules may not be applied. If the user deflects the call while team ringing is already in progress, team ringing stops.

Figure 67:
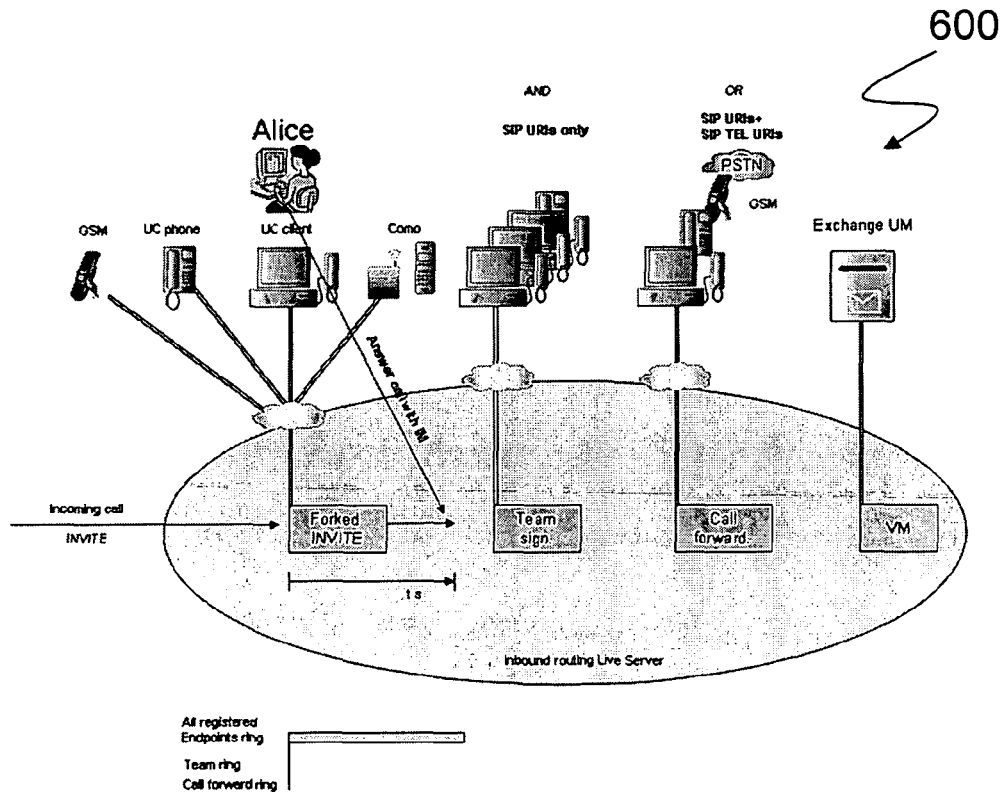

In another scenario, as illustrated in a schematic flow diagram 600 shown in FIG. 67, an incoming call is answered by sending an IM (P1). In this case ringing of the user's registered devices as well as any team signalization stops. In one embodiment, requirements for the Live Server are as follows. On an incoming call Live Server will fork the INVITE to all registered devices. If the user decides now to answer the incoming call with an IM, the user uses a response code that stops all ringing incl. team ringing immediately. If the called registered device would response with a "480", Live Server would interpret this "480" as an "unavailable" information and would proceed with team and call forwarding rules. Same procedure happens when responding with a "603" "Decline" response. Therefore a new response code may be introduced that allows Live Server to stop all team and call forwarding rules from execution and reject an incoming INVITE, for examle use "699" as response code.

Figure 68:
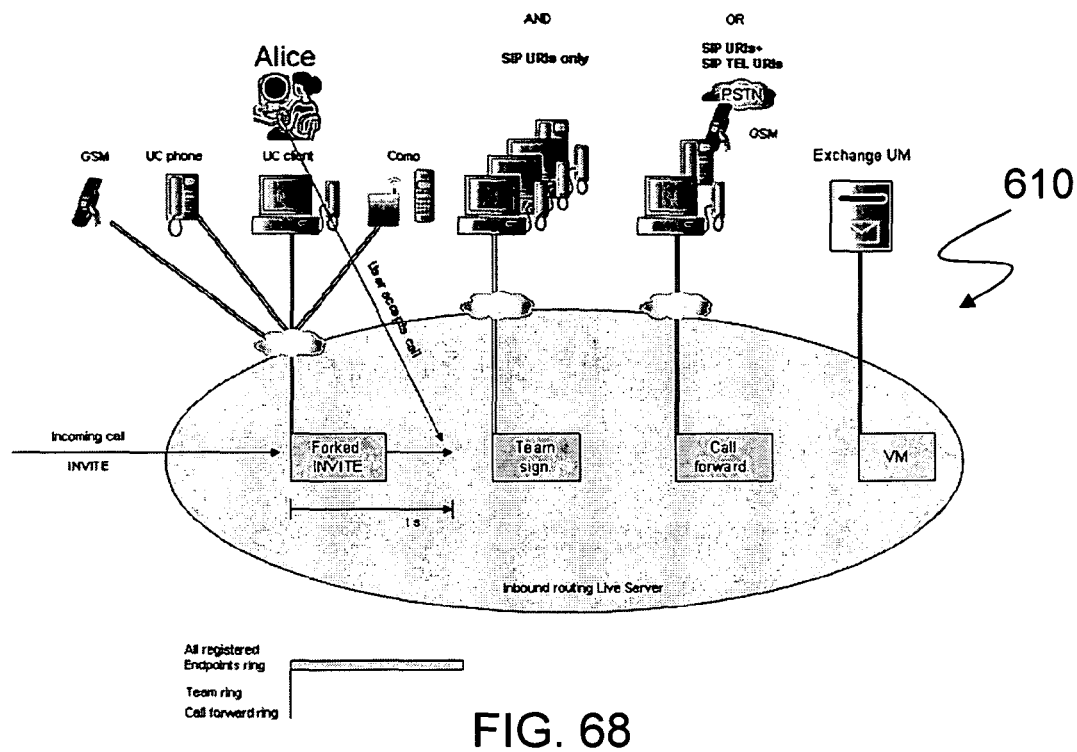

In another scenario, as illustrated in a schematic flow diagram 610 shown in FIG. 68, an incoming call is answered by the user. It is a very common scenario that the user is able to answer an incoming call with one of his registered devices in ringing state. In one embodiment, requirements for the Live Server may be as follows. On an incoming call Live Server will fork the INVITE to all registered devices. If Live Server receives a "2xx" response from any of the registered devices, all other registered devices stop ringing. If team signalization had already started, Live Server stops team signalization as well. If a user answers an incoming call on two devices at the same time or a team member and the user accepts the call in the same particular moment, the user that sent the "2xx" response first may receive the call and the other user may receive a BYE. If the callee decides to hang up before the user or one of his team members can pick up the call, all ringing of the user's devices as well as team signalization stops.

In the implementation of team functionalities according to the present system, the user should have the possibility to allow the other users to pick up incoming calls on behalf of him. This scenario is very handy in a large office environment where multiple users are working in the same office. If a call comes in for a particular user but this user is currently not sitting at his desk, the other users, sitting in the same physical office, shall be able to pick up the call on behalf of the user without having to get up and answer the call at the user's workspace. Team members may be configured with the contact list model of UC client. Registered devices may be able to differentiate an INVITE as a result of a team signalization from an INVITE as a result of an incoming call. The registered device may signalize the team calls differently from the user's regular incoming calls. A new indicator may added to the INVITE message that allows the registered device to differentiate a team call from a regular call.) The maximum amount of team members may be set by group policy. In one embodiment, requirements for the Liver Server may be as follows. Live Server may be able to access the list of team members SIP URIs. Live Server may check that only SIP URIs are valid team members. PSTN phone numbers may not become team members. Two new indicators are added to INVITE messages, e.g. MS-Target-Class: primary (regular and forwarded calls); MS-Target-Class: secondary (team calls). If the number of team members exceeds the configured maximum number by the admin, Live Server may use the first % max number team members % contacts of the team member list only for team signalization. Entries beyond % max number team members % will be ignored. The assumption is that in real environments there will be not more than ten team members associated to a user. If a user or team member picks up the call, the CANCEL header may contain the information which user picked up the call. (CANCEL+200 OK+MS-acceptedby:sip:uri).

Figure 69:
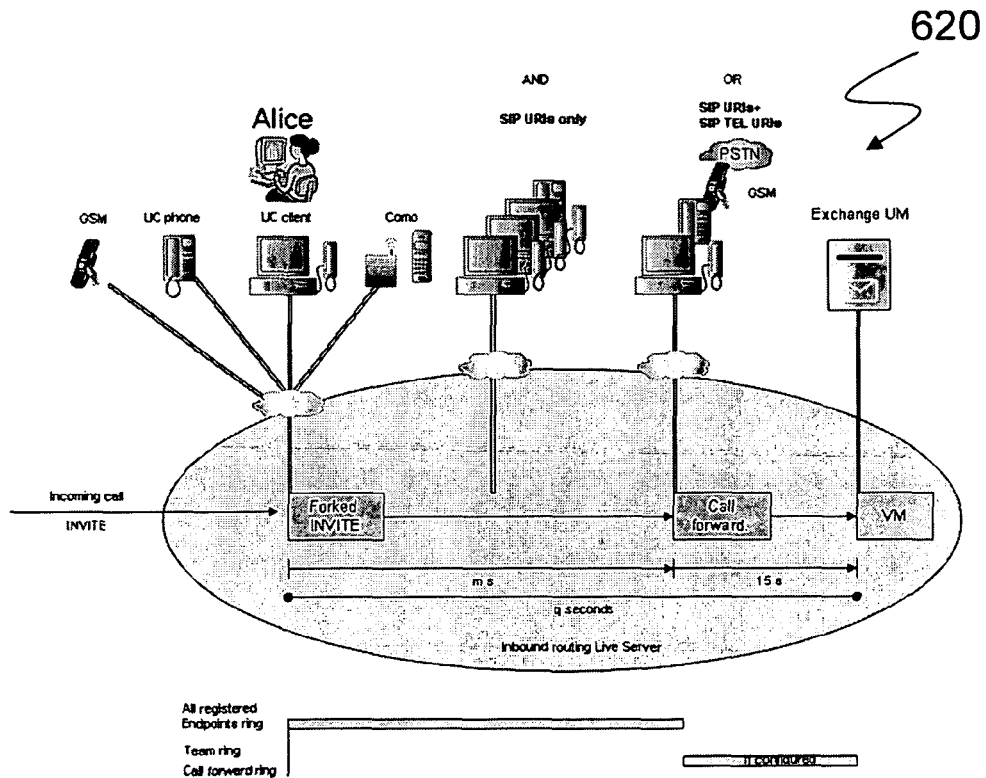

In another scenario, as illustrated in a schematic flow diagram 620 shown in FIG. 69, if the user wants other than registered devices to ring on an incoming call (e.g. cell phone or DECT phone), he has to select the team algorithm "Ring my PSTN phone numbers" and has to configure a designated PSTN phone number. It is not possible to combine other team signalization algorithms with the algorithm "Ring my PSTN phone numbers", also called simultaneous ring. In one embodiment, requirements for the Liver Server may be as follows. Live Server may fork the INVITE to any registered device as well as the configured PSTN phone number. If after m seconds none of the registered devices and even not the PSTN phone has answered the call, call forwarding rules may be applied, if applicable. The incoming call will be signalized to the call forwarding destination for the maximum of sixty seconds. If the call forwarding destination does not answer the call, the call may be routed to voicemail.

Figure 70:
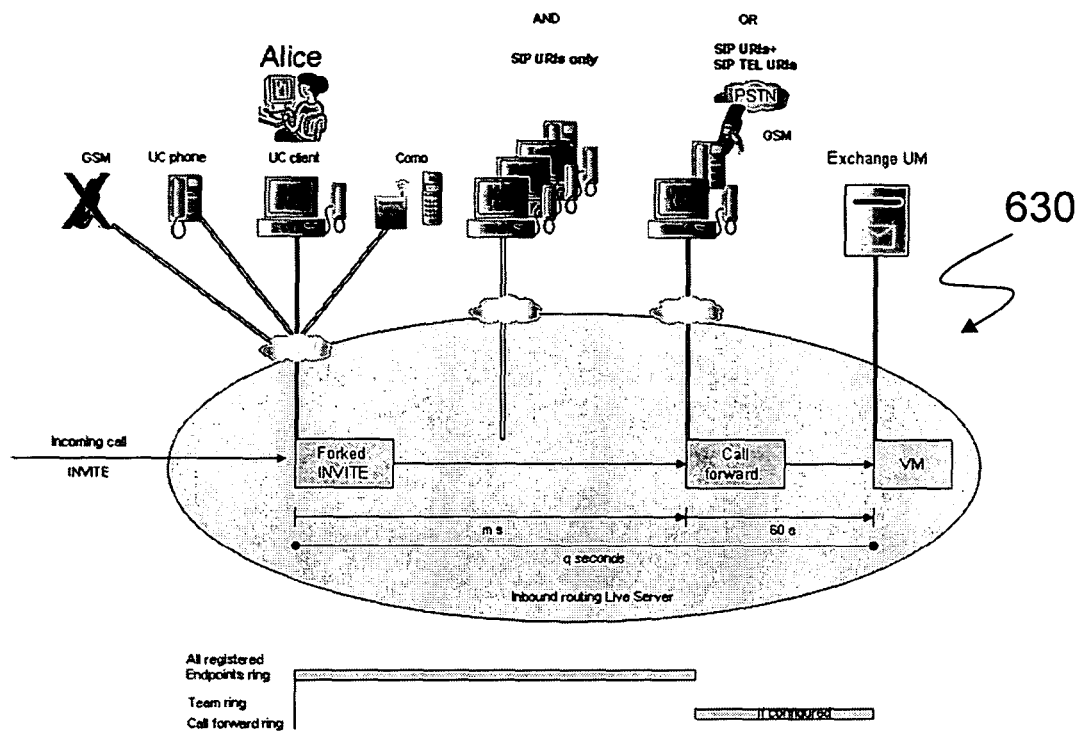

In another scenario, as illustrated in a schematic flow diagram 630 shown in FIG. 70, the user may switch off team ringing by choosing the team algorithm "Ring me only". No team signalization will be applied. If the user does not answer on an incoming call, the call will be forwarded to the user's call forwarding destinations (if applicable) or voicemail. In one embodiment, requirements for the Liver Server may be as follows. Live Server may fork an incoming INVITE to all user's registered devices If none of the registered devices picks up the call within m seconds, Live Server stops ringing the registered devices and forwards the incoming call to the call forwarding destination. If call forwarding is disabled, Live Server forwards the incoming call to the user's voicemail immediately.

Figure 71:
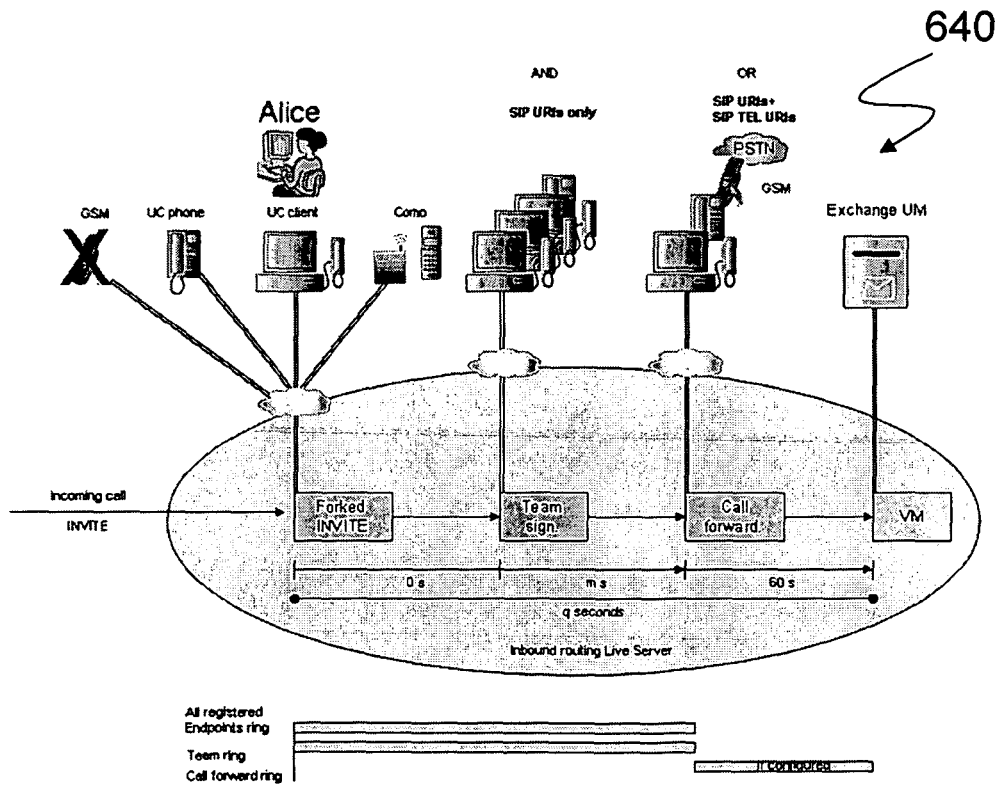

In another scenario, as illustrated in a schematic flow diagram 640 shown in FIG. 71, the user may configure the system such that his team members are receiving a team signalization immediately when the call comes in for the user. In one embodiment, requirements for the Live Server may be as follows. Live Server may to fork an incoming INVITE to all user's registered devices and may fork a team signalization INVITE to the registered devices of the configured team members. If the user does not answer the call from any of his registered devices and none of the team members accepts the call from any of their registered devices within m seconds, the call forwarding rules may be applied and the call may be signalized to the call forwarding destination for a maximum of sixty seconds. In addition to the execution of the call forwarding rules, ringing of user's registered devices and all team members registered devices may be stopped by sending CANCEL. If the call forwarding destination is also not able to answer the call, the call may be forwarded by Live Server to the user's voicemail. Configured team and call forwarding rules from team members may not apply on an incoming team call (i.e., no nesting of team calls). When team ringing is in progress and the user deflects the call from any of his registered devices ("3xx" is been sent to Live Server), team signalization may stop immediately. If the user rejects the incoming call with a 6xx response, all user's registered devices may stop ringing but team signalization continues. User configured call forwarding rules may be skipped and call may be forwarded to voicemail. If the user rejects the incoming call with a "4xx" response, only user's registered device that sent the "4xx" response may stop ringing. Other user's registered devices may proceed with ringing as well as team signalization. If a team member rejects a team signalization with a "6xx" response, Live Server may stop team signalization to all of the team member's devices that sent out the 6xx response. If a team member rejects a team signalization with a "4xx" response from any of the team member's devices, team ringing may only be stopped on this particular device. Team members in DND or Appear offline mode may not receive a team signalization for another user. If team signalization is the only ongoing notification of an incoming call, next routing step (call forwarding) may be applied by Live Server if none of the team members devices is still in ringing mode. Only SIP URIs can be team members. No PSTN phone numbers. Live Server may delete a SIP URI that happens to be a PSTN phone number. Loopback to team members may be suppressed by Live Server. If a user calls another user and it happens that the calling user is also a team member of the called user, no team signalization may occur to the calling user. Only SIP URIs (no PSTN phone numbers) may become team members. No team ringing may occur when the INVITE contains a specific EPID. Distribution lists may be entered as team members on the client. However the server will get SIP URIs or contact IDs as part of the preamble. Live Server may have to expand contact IDs to SIP URIs. When Live Server receives multiple "180" responses on a team signalization, only one may be forwarded to the calling party.

Figure 72:
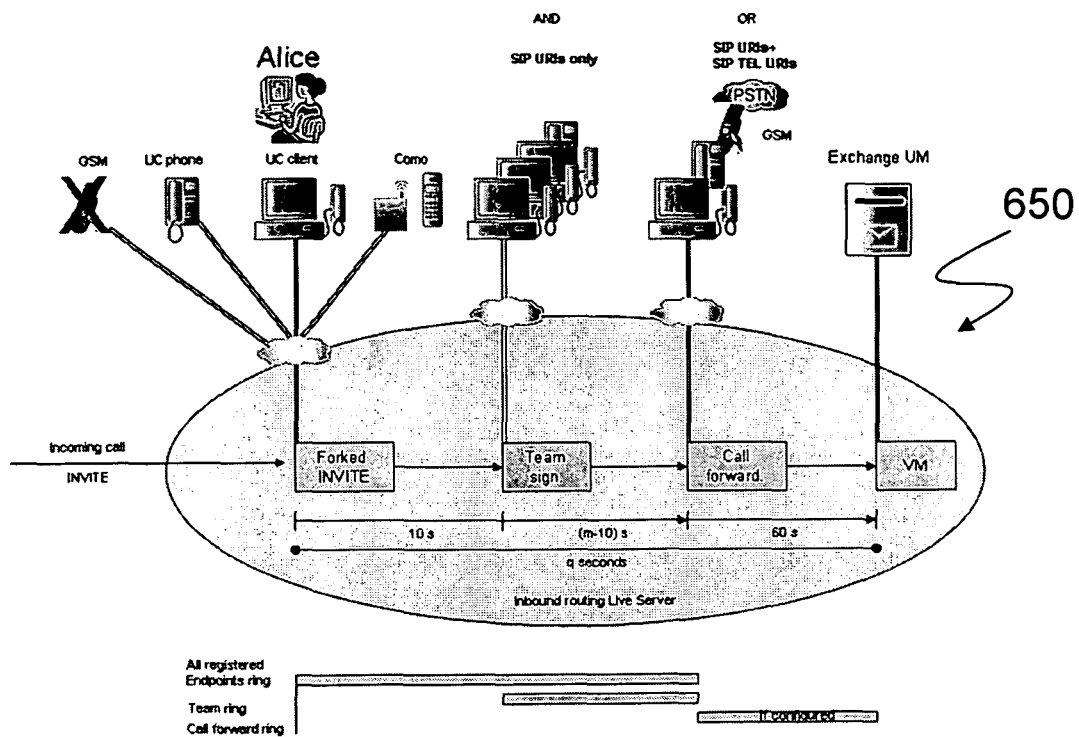

In another scenario as illustrated in a schematic flow diagram 650 shown in FIG. 72, in case the user is usually at his desktop and has access on one of his registered devices, incoming calls for the user may first be signalized to the user's registered devices. It may happen that the user leaves his desk to participate at an inhouse meeting and it is not appropriate to bring one of his registered devices to this meeting in case he has a mobile one. Without having to change something on his team and call forwarding settings for this particular meeting, the user should be able to configure a team signalization algorithm that works for him when he is at his desk and even when he is temporarily not at his desk. This algorithm is defined as follows: On an incoming call the user's registered devices will ring immediately. If after ten seconds none of the registered devices has answered the call, the incoming call may in addition to the still ongoing ringing user's registered devices also being signalized as team signalization to the registered devices of the team members. In one embodiment, requirements for the Live Sever are as follows. Live Server may fork an incoming INVITE to all user's registered devices. If the user does not answer the call from any of his registered devices within ten seconds and the incoming call may also be signalized to the team members. If none of the team members accepts the call from any of their registered devices within (m−10) seconds, the call forwarding rules may be applied and the call will be signalized to the call forwarding destination for a maximum of sixty seconds. In addition to the execution of the call forwarding rules, ringing of user's registered devices and all team members registered devices may be stopped by sending CANCEL. If the call forwarding destination is also unable to answer the call, the call may be forwarded by Live Server to the user's voicemail. Configured team and call forwarding rules from team members may not apply on an incoming team call. When team ringing is in progress and the user deflects the call from any of his registered devices ("3xx" is been sent to Live Server), team signalization may stop immediately. If the user rejects the incoming call with a 6xx response, all user's registered devices may stop ringing but team signalization continues. User configured call forwarding rules will be skipped and call may be forwarded to voicemail. If the user rejects the incoming call with a "4xx" response, only user's registered device that sent the "4xx" response will stop ringing. Other user's registered devices may proceed ringing as well as team signalization. If a team member rejects a team signalization with a 6xx response, Live Server may stop team signalization to all of the team members devices that sent out the "6xx" response. If a team member rejects a team signalization with a "4xx" response from any of the team member's devices, team ringing may only be stopped on this particular device. Team members in DND or Appear offline mode may not receive a team signalization for another user. If team signalization is the only ongoing notification of an incoming call, next routing step (call forwarding) may be applied by Live Server if none of the team members devices is still in ringing mode. Only SIP URIs can be team members. No PSTN phone numbers. Live Server may delete a SIP URI that happens to be a PSTN phone number. Loopback to team members may be suppressed by Live Server. If a user calls another user and it happens that the calling user is also a team member of the called user, no team signalization may occur to the calling user. Only SIP URIs (no PSTN phone numbers) can become team members. No team ringing may occur when the INVITE contains a specific EPID. Distribution lists can be entered as team members on the client. However the server will get SIP URIs or contact IDs as part of the preamble. Live Server may have to expand contact IDs to SIP URIs. When Live Server receives multiple 180 responses on a team signalization, only one will be forwarded to the calling party.

Figure 73:
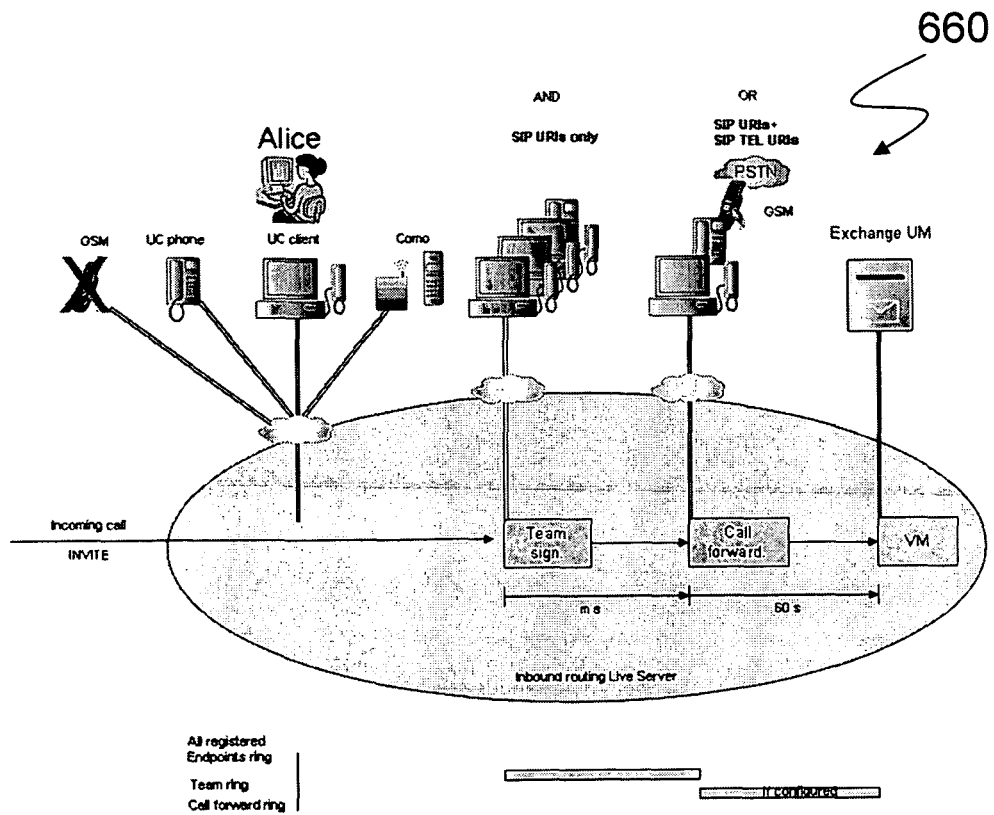

In another scenario, as illustrated in a schematic flow diagram 660 shown in FIG. 73, a user may want to signalize incoming calls to his team members only without ringing himself at all. Such a feature may be useful in a boss/assistant environment (Boss setting), where the assistant may take any incoming call even if a caller called the boss' phone number directly, or if the enterprise wants to work with virtual numbers, that are only team numbers without any actual user behind it (call accounting team). If none of the team members picks up the team call, next routing step may be applied. In one embodiment, requirements for the Liver Server may be as follows. Live Server may fork an incoming INVITE as a team signalization to all team members. If after a maximum of m seconds none of the team members picks up the call from any of their registered devices, the call may be forwarded to the originally called user's call forwarding destination. If even the call forwarding destination does not answer the call within sixty seconds (m+60 seconds total) call may be forwarded to the originally called user's voicemail. If all devices of all team members have rejected or blocked the team call, next routing step may be applied immediately. Team members may always be able to call the user even if "Ring my team only, not me" is configured. The call will be signalized as a regular incoming call. This allows e.g. assistants in a boss/assistant scenario to forward a picked up team call even if nobody else is able to call the boss directly. Configured team and call forwarding rules from team members may not apply on an incoming team call. When team ringing is in progress and the user deflects the call from any of his registered devices ("3xx" is been sent to Live Server), team signalization may stop immediately. If the user rejects the incoming call with a 6xx response, all user's registered devices will stop ringing but team signalization continues. User configured call forwarding rules may be skipped and call may be forwarded to voicemail. If the user rejects the incoming call with a "4xx" response, only user's registered device that sent the "4xx" response will stop ringing. Other user's registered devices may proceed ringing as well as team signalization. If a team member rejects a team signalization with a 6xx response, Live Server may stop team signalization to all of the team members devices that sent out the "6xx" response. If a team member rejects a team signalization with a 4xx response from any of the team member's devices, team ringing may only be stopped on this particular device. Team members in DND or Appear offline mode may not receive a team signalization for another user. If team signalization is the only ongoing notification of an incoming call, next routing step (call forwarding) may be applied by Live Server if none of the team members devices is still in ringing mode. Only SIP URIs can be team members. No PSTN phone numbers. Live Server may delete a SIP URI that happens to be a PSTN phone number. Loopback to team members may be suppressed by Live Server. If a user calls another user and it happens that the calling user is also a team member of the called user, no team signalization may occur to the calling user. Only SIP URIs (no PSTN phone numbers) can become team members. No team ringing may occur when the INVITE contains a specific EPID. No team and call forward "missed call" notification may be sent to the called user in case "Ring my team only" is configured. The reason is that there are high chances that in a Boss/Assistant environment the boss does not want to receive all team notifications for each call, one of his assistants picked up for him. Distribution lists can be entered as team members on the client. However the server will get SIP URIs or contact IDs as part of the preamble. Live Server may expand contact IDs to SIP URIs. When Live Server receives multiple "180" responses on a team signalization, only one may be forwarded to the calling party.

Figure 74:
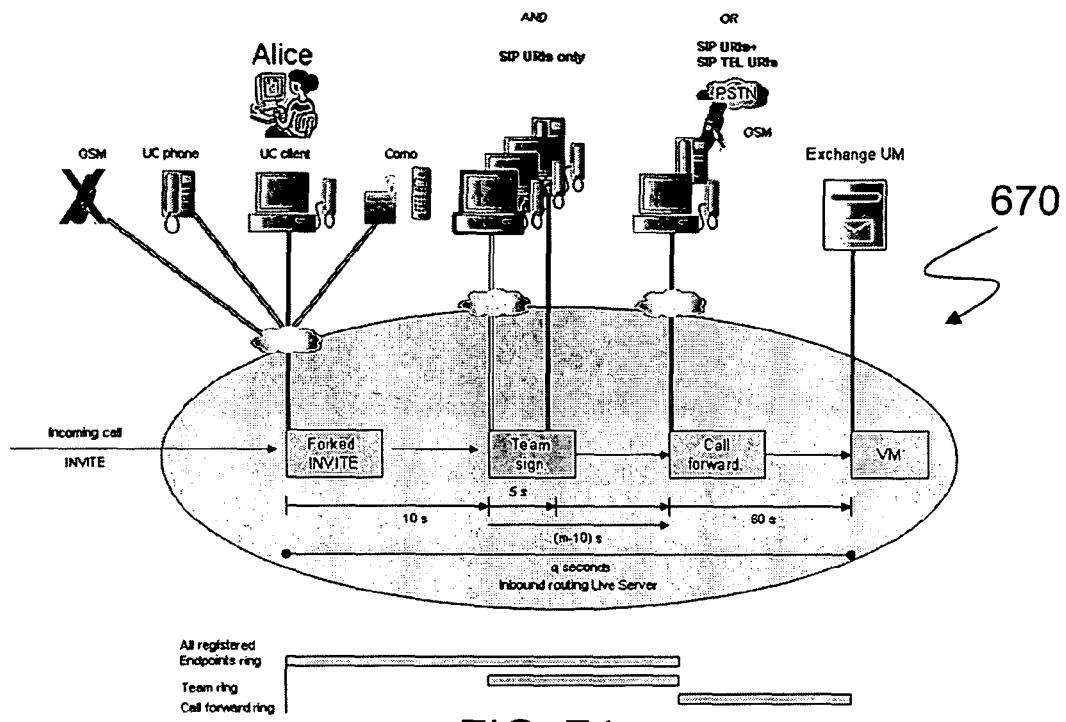

In another scenario involving the Ring one team member ahead feature, as illustrated in a schematic flow diagram 670 shown in FIG. 74, independent from the selected team algorithm described elsewhere herein the user may be able to define that one team member randomly receives the team notification a little bit (five seconds) before all other team members. This allows large teams to avoid ringing of every incoming call at all workspaces. Only team members that are currently able to receive a team signalization may be selected randomly for early team signalization. If the selected "early" team member does not pick up the call within five seconds the team call may be extended to all other team members at once. In one embodiment, requirements for the Live Server may be as follows. If any kind of team signalization is selected by the user and the user has selected "Choose one team member randomly ahead", team signalization may occur on the randomly selected team user's registered devices first. If the selected user does not answer the call, the other team members may receive team signalization on their registered devices after five seconds counting from the start of the team signalization to the first randomly selected user. Only team members may be chosen to receive an "early" team signalization that is in a state of being able to receive a call.

In another scenario, involving Ring team when offline, the user may be able to configure a setting that allows his team members to pick up calls for him even if the user is not logged on with one of his registered devices or is in presence state "Appear offline". In one embodiment, requirements for the Live Server may include that if team ringing in offline mode is disabled, Live Server may execute call forwarding rules immediately.

Figure 75:
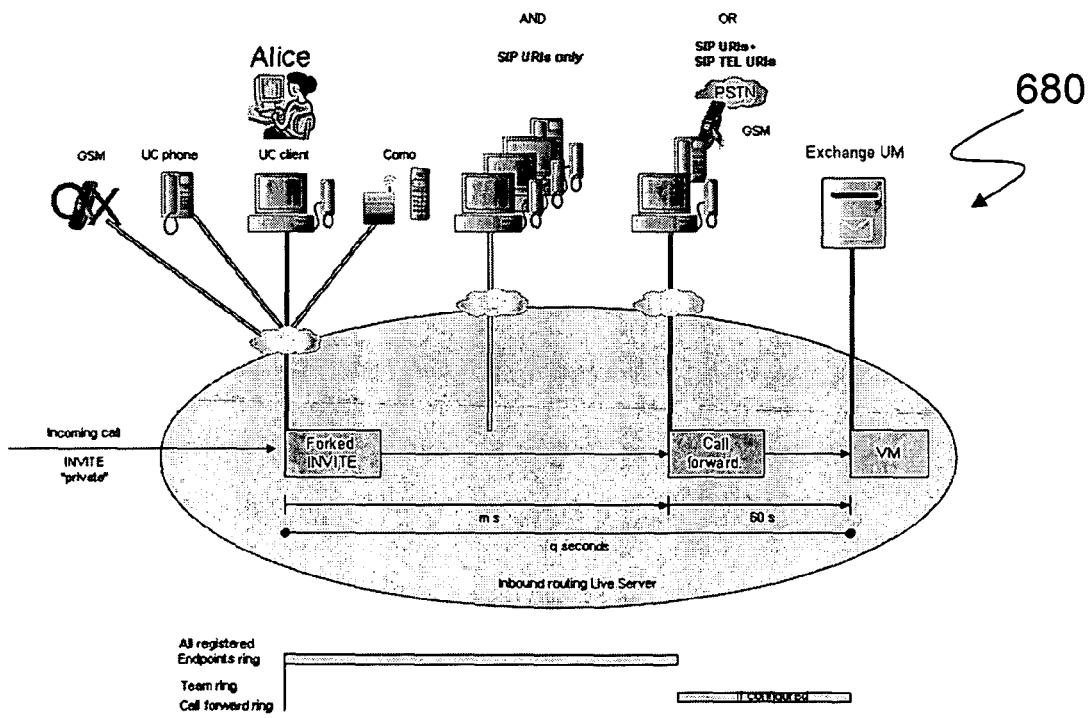

In another scenario, as illustrated in a schematic flow diagram 680 shown in FIG. 75, users may be able to mark their conversation request as "private" In this case the user wants to talk in particular only to the designated called party, meaning there may be no team signalization for the private call. This indicates that the caller does not want to talk to anybody else including a team member. In one embodiment, requirements for the Live Server are as follows. An incoming call marked "private" may be forked to all user's registered devices by Live Server. If a call is marked as "private" no team signalization may be applied by Live Server. If case the user has set "Ring my team only, not me," the incoming INVITE marked "private" may not be signalized to the user and the call forwarding rules may be applied. Call forwarding rules may be applied if called user doesn't pick up after m seconds.

Figure 76:
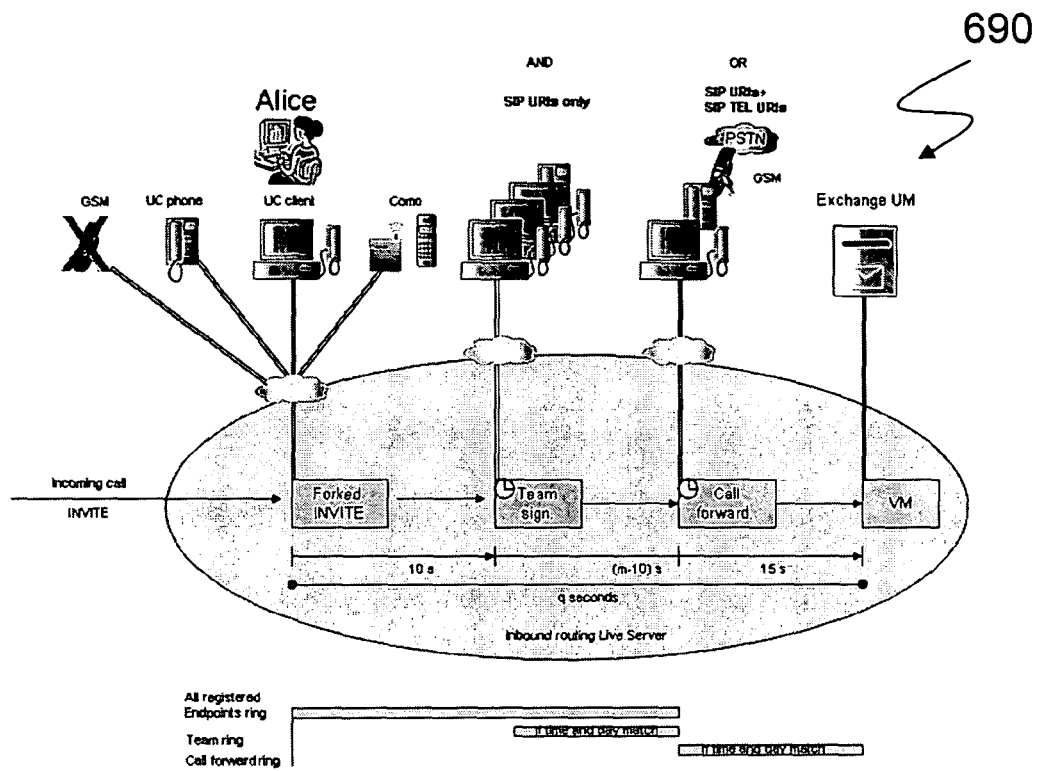

In another scenario, as illustrated in a schematic flow diagram 690 shown in FIG. 76, some users may want to optimize their team and absence rules by adding a specific time and day of week to it, so that team and absence rules may only be applied by Live Server if the current time and day matches this filter, thus a time based execution of team or call forwarding rules. In one embodiment, requirements for the Live Server may be as follows. Live Server may provide the ability that team and call forwarding rules may only be applied during user defined times and dates. Time may account for different users in different time zones than the server. If actual time and day does not match the user configured schedule for team rules, no team signalization will occur and after m seconds latest call forwarding rules may be applied by Live Server. If actual time and day does not match the user configured schedule for call forwarding rules, call forwarding settings may be skipped and the incoming call may be routed to voicemail. If time and day do not match with current time and day, incoming calls may be forwarded to voicemail. It is possible to select no days. The system may be configured such that the user specified time range can not cross the midnight boundary, that is the start time must be lower than the end time.

Figure 77:
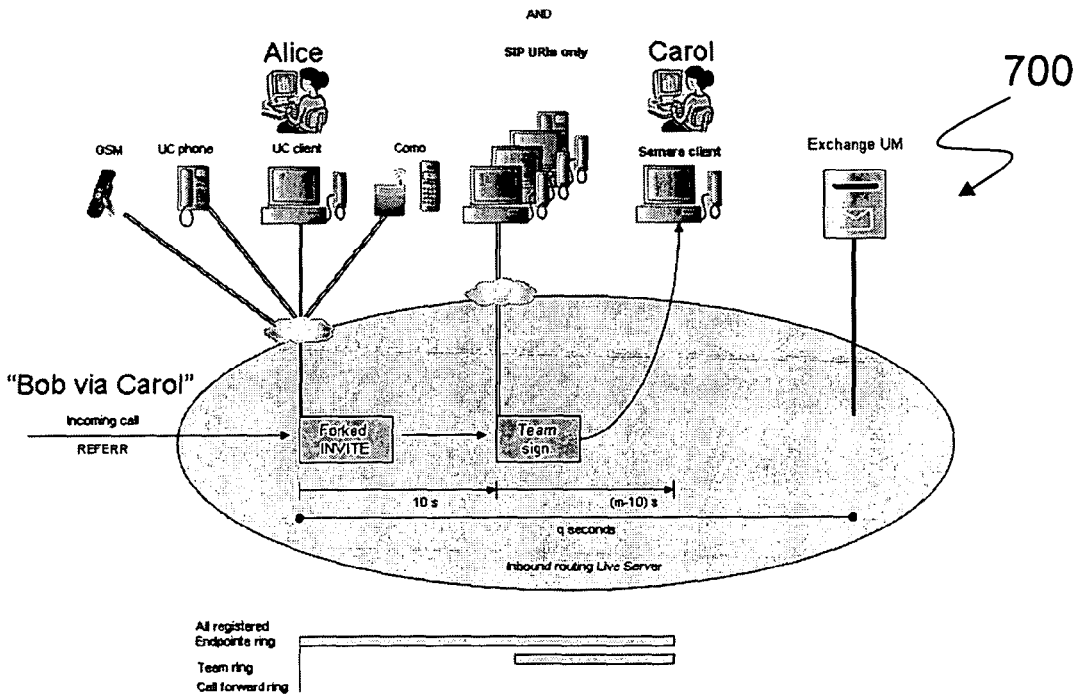

In a Samara (attendant console) "Safe transfer" scenario, as illustrated in a schematic flow diagram 700 shown in FIG. 77, where the call may not be handled by the user's call forwarding functionality, an incoming call (Bob) transferred to the user Alice by using the "safe transfer" feature of the samara client (Carol) will ring the user's (Alice's) registered devices (and simultaneous ring if selected) and the user's team members. No diversion to defined call forwarding destinations will occur. If neither Alice nor one of her team members picks up the call after the defined ringing time of m seconds, Live Server Inbound Routing may send a "480" response back on the INVITE. In one embodiment, requirements for the Live Server may include that on an incoming REFER with header parameter MS-Sensitivity: No diversion a "480" response will be returned if during the maximum ringing time m the call is not being answered by either the user or one of his team members.

In another scenario, the system may be configured such that the user has the possibility to define absence settings (currently just call forwarding) that are being applied, when the user is unable to answer an incoming call on one of his registered devices and even none of the occasionally configured team members is able to answer the call on behalf of the user. The user himself could be participating an important meeting or is on a business trip outside of the office. On the other hand call if the user decides to forward his incoming calls immediately without ringing his devices or team signalization, he should have the possibility to configure this scenario as well. Call forwarding destinations will be configured in the UC client GUI. In one embodiment, requirements for the Live Server may be as follows. Live Server may be able to access the user's call forwarding destination configuration. New indicators to INVITE messages may be added: MS-Target-Class: primary (forwarded calls). When requirement restriction of call forwarding cannot get accomplished, management settings may be taken out from AD user management.

Figure 78:
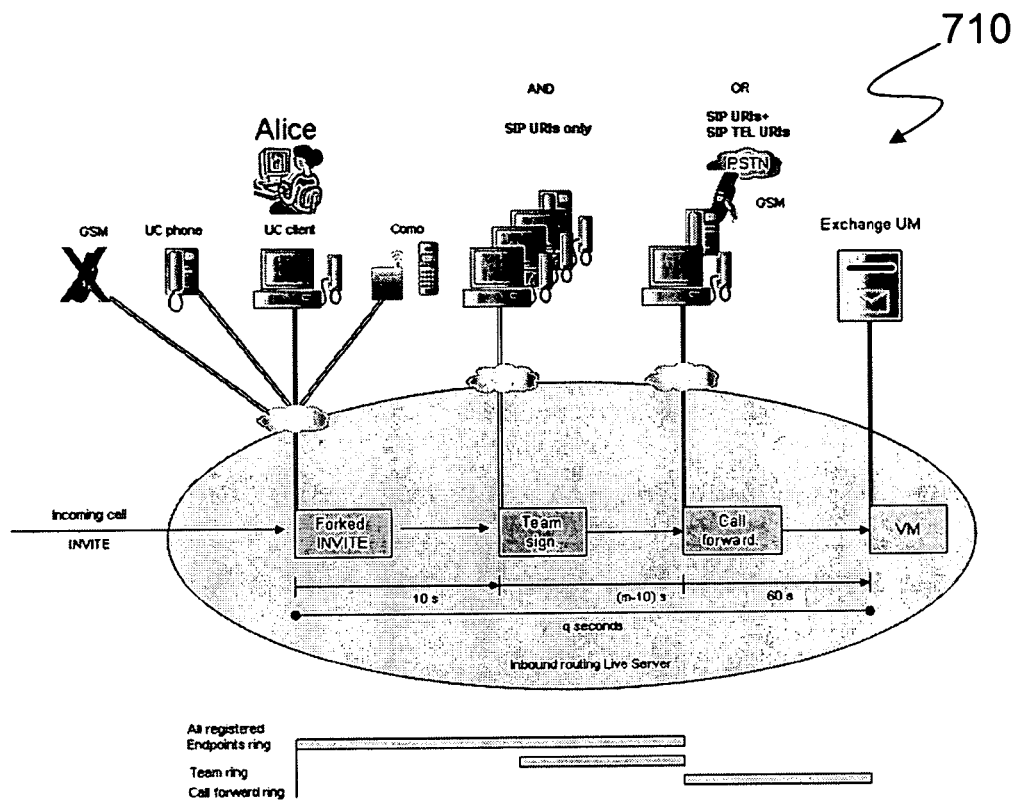

In another scenario, as illustrated in a schematic flow diagram 710 shown in FIG. 78, if the user is unable to accept an incoming call on one of his registered devices and even no team member is able to get the call on behalf of the user, the call has to be forwarded to the user's designated call forwarding destination after a certain, user configured timeout m. In one embodiment, requirements for the Live Server may be as follows. An incoming call may be forked to the user's registered devices immediately. Depending on the user's chosen team algorithm, the incoming call may be forked additionally to the user's team members as a team signalization after ten seconds unless the user picked up the call. If neither the user nor a team member picks up the call after m seconds, all ringing may be stopped by Live Server and the INVITE may be referred to the user's designated call forwarding destination. If the call forwarding destination is not the user's voicemail, Live Server may ring the call forwarding destination for sixty seconds. If even the call forwarding destination is unable to answer the call, Live Server may forward the call to the user's voicemail. No call forwarding may occur when the INVITE contains a specific EPID. If a call is forwarded (immediately or on no answer) to a destination that contains a number which the user is not allowed to dial, Live Server Inbound Routing will receive a "403" response from Live Server Outbound Routing and may generate a "Missed call notification" with an appropriate subject to the user.

Figure 79:
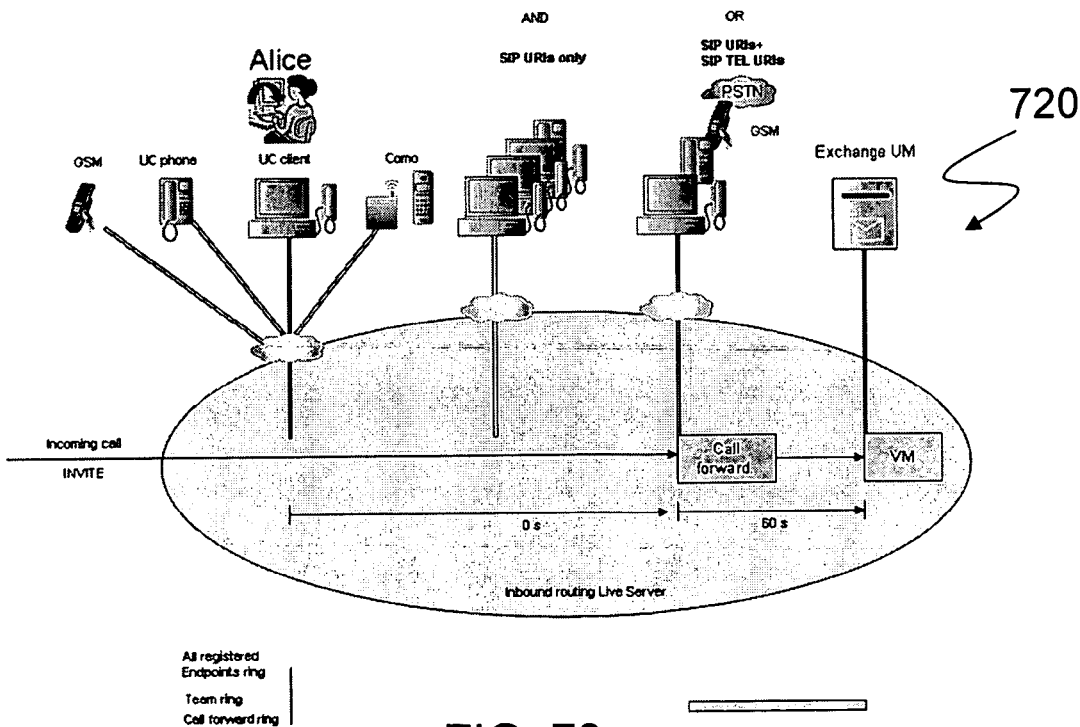

In another scenario, as illustrated in a schematic flow diagram 720 shown in FIG. 79, a user should be able to choose if he want all his incoming calls to be forwarded to a call forwarding destination address immediately. This may be useful when the user expects not to be able to answer incoming calls for a certain time. For example, the user is only available on his PSTN phone number (e.g. cell phone) in the particular time frame and only wants to pick up calls by himself, because he does not have a team. Another scenario may be that the user wants to work concentrated on a PPT-presentation and does not want to be disturbed by incoming calls, so that he forwards all incoming calls to voicemail immediately. In one embodiment, requirements for the Live Server may be as follows. If user has configured to forward all his incoming calls immediately, Live Server may forward the INVITE to the designated call forwarding destination without ringing any registered devices or applying team ringing rules. Acceptable call forwarding destinations for Live Server are:

SIP URIs, PSTN phone numbers, and/or Voicemail. Team and call forwarding rules of the destination user may be applied to a forwarded INVITE. If the call forwarding destination (unless it's voicemail) does not pick up the call within sixty seconds, the INVITE may be forwarded to the originally called user's voicemail. If a call has to be forwarded (immediately or on no answer) to a destination that contains a number which the user is not allowed to dial, Live Server Inbound Routing may receive a "403" response from Live Server Outbound Routing and may generate a "Missed call notification" with an appropriate subject to the user.

In order to realize the scenarios described herein, a flexible Live Server Inbound Routing model may be provided that may work with the user specific team and absence parameters as well as with situation specific routing scripts, presence states and Block Lists. In addition to the following description, further details of the Liver Server Inbound Routing model are also described elsewhere herein.

Figure 80:
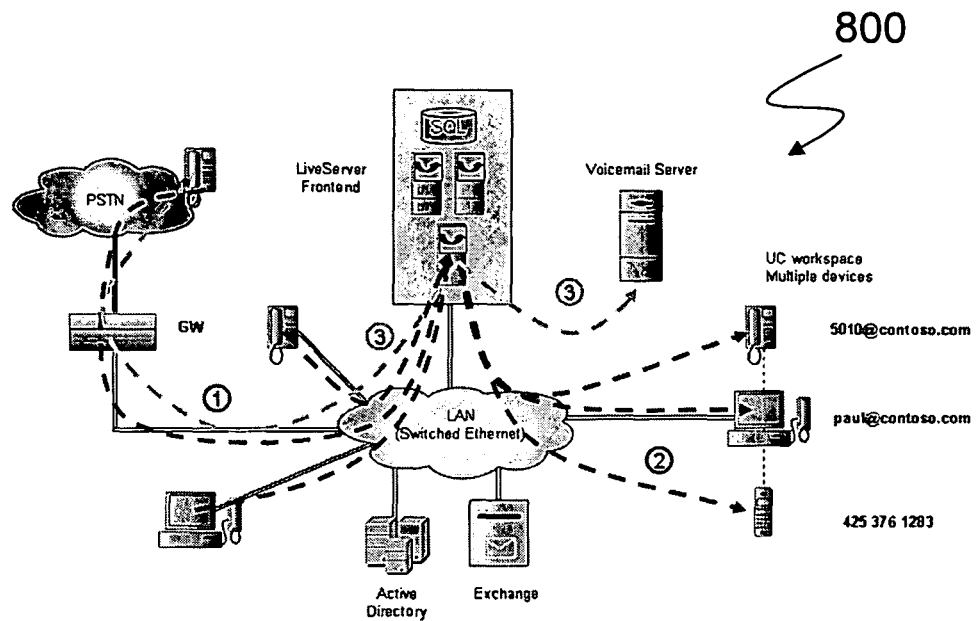
FIG. 80 is a schematic illustration of an Inbound Routing Model according to the system described herein.

As illustrated in FIG. 80, the Inbound Routing Model (IRM) 800 may run on every Home Server. On an incoming INVITE the routing module on Live Server may receive the INVITE and will check the user's inbound routing settings (team & call forwarding (absence) rules) based on the TO and FROM header before executing the inbound routing rules. The rules may be forking an INVITE to the user's devices (primary targets) or to team members (secondary targets) or referring the INVITE after a certain time to a call forwarding destination (voicemail or PSTN phone number) (primary targets).

Figure 81:
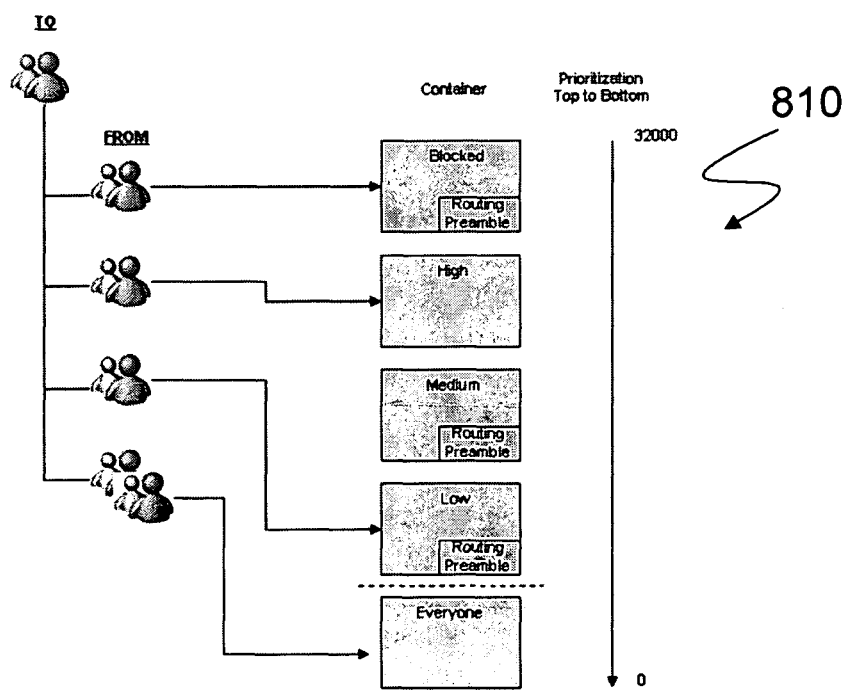
FIG. 81 is a schematic illustration of an inbound routing procedure according to the system described herein.

As illustrated in FIG. 81, the procedure 810 may be as follows: each FROM-user that wants to communicate with a TO-user is being associated to a container by the TO-user. Typically there is a "Blocked" container, a "High", "Medium", "Low" container and a container "Everyone". These containers may be prioritized by a unique container number. The higher the number, the higher the container priority may be. The lower the number, the less information about the TO-user is the FROM-user able to receive.

If a FROM-user calls a TO-user that put the FROM-User into the "Blocked" container, the routing rules of the "Blocked" container may be applied by a Live Server Routing module to the call. If the calling FROM-user is associated to the "High"-container and the "High"-container contains no routing rules, the routing rules of the next container with lower priority (in this case the routing rules of the "medium" container) may be applied. If the FROM-user is not assigned to any special container, Live Server may apply a generic built-in routing, as further described elsewhere herein.

In the "routing" section of each container, a XML-based "preamble" may be stored by the UC client, that contains the user specific routing parameters (call forward destinations, ringing time . . . ). Based on the settings in the preamble, the IRM works as an engine that executes an XML based routing script using the settings of the preamble. An IRM engine provides a variety of flags, routing filters and functions that may be triggered by the settings in the preamble. The content of the preamble may include: user's primary targets (registered devices, call forwarding destinations); user's secondary targets (team members); ring duration (m); DND state flag; Team algorithm flag; call forwarding algorithm flag; and/or time and date specific settings.

The following is an example of the preamble XML script:

```
<preamble>
  <list name="team">
```

-continued

```
    <target uri="sip:bob@ms.com"/>
    <target uri="sip:sally@ms.com"/>
    <target uri="sip:jeff@ms.com"/>
  </list>
  <list name="cell">
    <target uri="sip:+14445556666@ms.com;user=phone"/>
  </list>
  <wait name="team" seconds="20"/>
  <wait name="devices" seconds="10"/>
</preamble>
```

The input of the preamble may used to execute the routing script on Live Server.

Figure 82A:
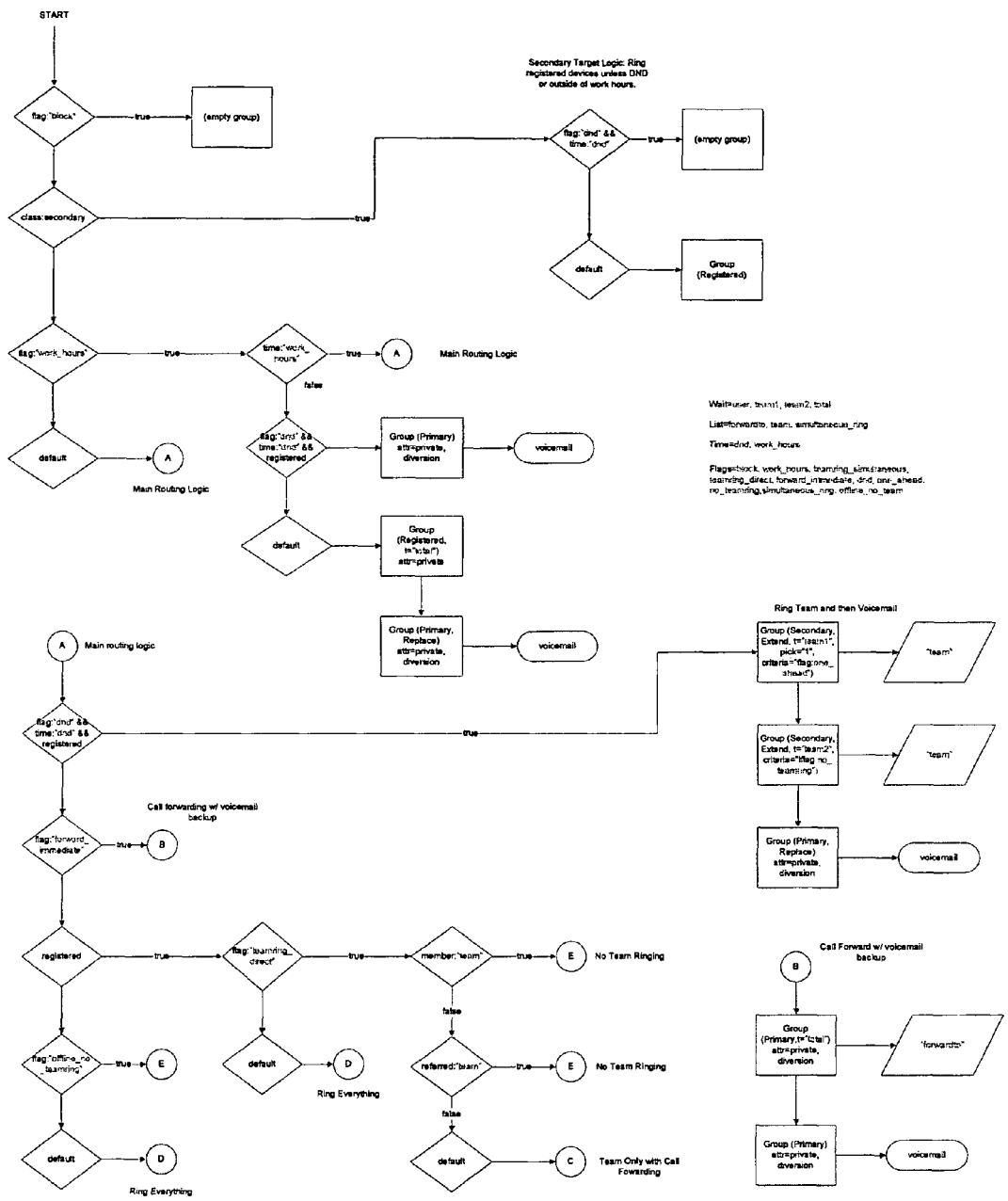
FIGS. 82A-B illustrate a flow chart detailing the routing logic implementing various of the scenarios according to the system described herein.
Figure 82B:
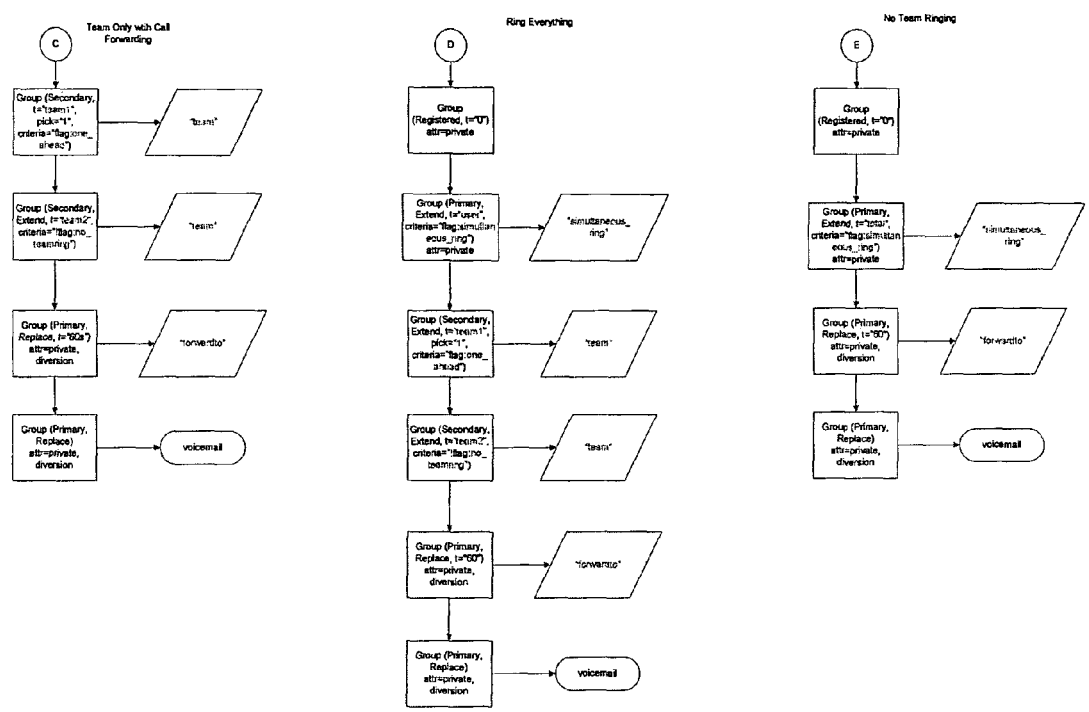

FIGS. 82A-B show a flow chart detailing Default Routing Logic implementing various of the scenarios described herein with respect to the present system, including flow for main routing logic; call forwarding with voicemail backup; ring team then voicemail; ring everything; ring team only with call forwarding; and no team ringing. The IRM may read on every incoming INVITE the routing preamble stored in the FROM-users associated presence container (Blocked, allow-interrupt and low). The routing may then be executed based on the settings in the "Preamble." "Preamble" XML-based routing settings may be configured by UC client. Live Server executes the hard coded routing script by using the provided parameters of the preamble. Users that are using UC phone and/or COMO device only have to configure their team and call forwarding rules through UC clien. The advantage of letting UC client completely independent from Live Server set the "Preamble" is that UC client can define team & call forwarding behavior with the supported set of filters by Live Server independently from Live Server. If future versions may provide new, even more sophisticated routing rules to the user, the IRM routing engine on Live Server may be updated independent from the client updates. Older clients will still work even when the IRM engine has become more features. Client update can follow sequentially. The system may be configured such that names of the routing filters used in the XML script of UC client have to match with the names of the routing filters in Live Server IRM. An exception handling should occur in the Live Server IRM in case a outing filter name can not be interpreted. Initially it is possible for the client to upload even user individual routing scripts. This would cause a huge test effort. Therefore current understanding between client PM and server PM is to limit the amount of executable routing script to a minimum of approximately three.

Besides the requirements for how the Live Server may behave in certain user scenario depending on the current user situation as described elsewhere herein, the Live Server may provide further functionality to realize additional scenarios and/or to complete the user experience.

In another scenario, the system provides for data store for team & call forwarding (absence) configuration data. The user may be able to configure his desired team and call forwarding behavior by using UC client GUI. The settings may be stored in an appropriate container, on which the UC client has read-and writeable access. The UC client stores the user's individual parameters that are needed for the execution of team and call forwarding rules by Live Server as an XML script called preamble. In one embodiment, requirements for the Live Server may be as follows. Live Server has to have readable access on the storage container, that keeps the user defined team and absence settings with its user individual parameters (preamble) (call forwarding time, call forwarding number, etc. . . . ). Live Server may have readable access on storage container that keeps the preamble.

In another scenario, it may be important to an Information Worker to receive information about inbound communication requests that were originally meant for him, i.e. Missed call notification. The user may receive information for incoming calls independent from the fact, that the user was present (logged on) or offline in the event of an incoming call. Since from current perspective UC scenarios may use Exchange 12 Unified Messaging voicemail system, Exchange can be used to distribute information about incoming calls to the, for example, the user's Outlook inbox.

TABLE 2 shows the events that may cause a user notification via e-mail:

TABLE 2

| Message Class | Event | From | E-mail Subject | Remarks |
|---|---|---|---|---|
| 1 | Caller decides to hang up in ringing state | % Calling Party % | Call not answered | Called user did not pick up, none of the team members and no call forwarding |
| 2 | Team member accept | % Calling Party % | Call accepted by % team member % | No team member accept notification when team ringing is set to "Ring team only". |
| 3 | Calls automatically forwarded | % Calling Party % | Call forwarded to % call forward destination % | This message has to be generated when it is 100% sure which was the CF device that got the call (voicemail after CF!) |
| 4 | Call forwarding destination invalid | % Calling Party % | Call forwarding failed to % call forward destination % - restricted | If the user enters a CF destination that he was not allowed to dial. Outbound Routing will return a 403. |

In one embodiment, the Live Server in the "Missed Call Notification" scenario may have the following requirements. Live Server Inbound Routing may establish a long lasting SIP connection directly with Exchange for the exchange of "Missed Call Notification" information. Live Server Inbound Routing may reestablish this session if for any reason the session has been disconnected. Live Server Inbound Routing has not to listen on any port for an incoming connection from Exchange. Information on the Missed Call Notification that may be transformed in an email from Exchange Server may be transmitted as a SIP INFO message from Live Server Inbound Routing to Exchange. Live Server Inbound Routing may submit the following information in an XML blob as part of an SIP INFO message to Exchange: TO header; FROM header; Team member who picked up the call; Message class (see TABLE 2); Priority; Sensitivity.

Further, if the user has configured a CF destination that cannot be reached because of Outbound dialing restrictions, the user may receive a Missed Call Notification with appropriate failure reason. This may be the only situation where the user can do something about it. If the GW is down or busy, there is nothing the user can do with this info, that is no notification. Exchange may generate the Missed Call Notification e-mail and add the subject according to the Message class. The "missed call notification" emails may be sent with a sensitivity and importance header "normal". The differentiation of notifications to the user on calls, that where sent to Exchange 12 Unified Messaging voicemail, between those where the callee left a message and those where the callee didn't leave a message would bring extra value to the user: Call forwarded to voicemail without message; Call forwarded to voicemail with message. The messages mentioned in this section may be the only messages visible to the user. Therefore these messages may be the only requirement for localization besides documentation. Localization may be done as part of Exchange localization since Exchange generates the "Missed Call Notification" e-mails.

In terms of management asepcts and as a result of the above-described setup of the system, there may be a few additional requirements for the Live Server. In one embodiment, the requirements may be as follows. Input for the Live Server Inbound Routing engine may be: the server routing script (inbuilt); preamble transmitted by the client in a container; AD stored policies (for verification of the client created preamble). Live Server may be able to verify the read preamble XML script against the AD policy settings. In case there are entries in the preamble that are against the policy, Live Server may correct these values to a policy confirm value.

To handle exceptions, the Live Server Inbound Routing may read the preamble with the routing settings (parameters) out of the user's presence routing container. This information may be validated before execution in case a manipulation of these data had been occurred. In one embodiment, requirements for the Live Server may be as follows. If there are multiple identical SIP URIs configured as team members, Live Server may only apply team ringing to this SIP URI once. If there are SIP URIs as team members configured that can be interpreted as phone numbers, these SIP URIs may be ignored as secondary targets (team signalization). If the call forwarding destination is empty, no call forwarding may be applied and ringing of the registered devices or teams may proceed until the maximum ringing time of q has passed. After q seconds call may be failed (disconnect). If the call forwarding destination for unanswered calls is empty but voicemail is configured (user is UM enabled), the Live Server Inbound Routing may set the call forwarding destination for unanswered calls to voicemail. The minimum value for ring duration m is hard coded on the client set to twenty seconds. If m is less than twenty seconds, Live Server Inbound Routing may set this value to twenty seconds. If there are no endpoints available but routing preamble contains a DND=TRUE setting, Live Server may ignore this setting and has to execute call forwarding rules anyhow. If no routing can be detected in one of the containers (everyone container) on an incoming call, calls will ring for q seconds and then may be failed (disconnected) by Live Server. If Live Server gets a XML script stored by the client in the container, that not just contains the preamble but also a complete routing script, then Live Server may ignore the main part of the routing script and shall just use this part of the XML script, which contains the preamble. If no XML script can be obtained from the user's presence containers, Live Server Inbound Routing may only ring registered devices. If there are no registered devices, Live Server may return a "480". Whenever Live Server Inbound Routing receives a 4xx response from a secondary target, it may return a "480" response on the incoming INVITE. If Live Server Inbound Routing receives a "603" response combined with header parameter MS-Decline-Scope: All, all forking of the incoming call to primary and secondary devices may stop and all yet unprocessed groups may be skipped as well (no further routing step).

Figures 83, 84A, 84B, 84C:
FIG. 83 is a graph showing a categorization of different jobs according to telephony (here and mobility characteristics.
FIGS. 84A-C show usage behavior results of a usage model according to the system described herein.

To estimate the usage of the Inbound Routing functionality of Live Server a usage model has been created. Basic data for the usage model are general data of the company and their Live Server setup. It is possible to select multiple month as the timeframe of the calculation. The usage of telephony and therefore the usage of the Inbound Routing functionality may depend on the users job. Therefore the telephony behavior may be taken into consideration which is depending on the user's job. FIG. 83 is a graph showing a categorization 850 of different jobs according to their telephony (here number of incoming calls) and mobility characteristics. For example, an external technician gets a job at a customer. He will not be called by other customers, because they usually do not have the technician's telephone number. Therefore an external technician is mobile (out twenty days a month) but will not receive many incoming calls. An external technician's telephony behavior is completely different to the behavior of a call center or user helpdesk person. Such a person is very static (always at his/her desk) but receives a lot of incoming calls per day.

The usage of enhanced Inbound Routing features like team ringing and call forwarding features (or voicemail) may also depend on the user's job. While developers used to work on their own are call center agents always working in groups. On the other hand the likelihood that a team member picks up a call for somebody else is in a call center and admin scenario (boss/admin combination) much higher than in a developer environment. These facts result in different usage behavior of enhanced call routing features and has to be reflected in the usage model shown in FIG. 84A. After adding all parameters to the usage model, the results occur, as shown in FIG. 84B. A summary of the results is shown in FIG. 84C.

The following description is of an embodiment of the Inbound Routing Model that provides a framework for describing and implementing routing logic on LCS. The model introduces a means to describe routing scenarios in LCS and then maps that description to an XML document that can be stored in LCS rich presence so that LCS can carry out the logic. These rules may apply to any requests that need to be routed outside of an existing dialog.

Various embodiments of the routing system may provide any of the following. The system may provide a means to designate the order that one or more possible destinations are tried; a means to add additional destinations to those already ringing or cancel current destinations and replace with a new destination. The system may provide a means to designate the time a destination is given to provide a final response. The system may provide a means to categorize destinations as primary and secondary so that: Inbound calls designated as private or no-divert may be routed only to destinations designated similarly; 3xx and 6xx responses may be handled differently for secondary destinations; Requests may be marked "primary" or "secondary" using the Ms-Target-Class header. The system may provide a means to define and reuse lists of possible destinations.

Figure 85:
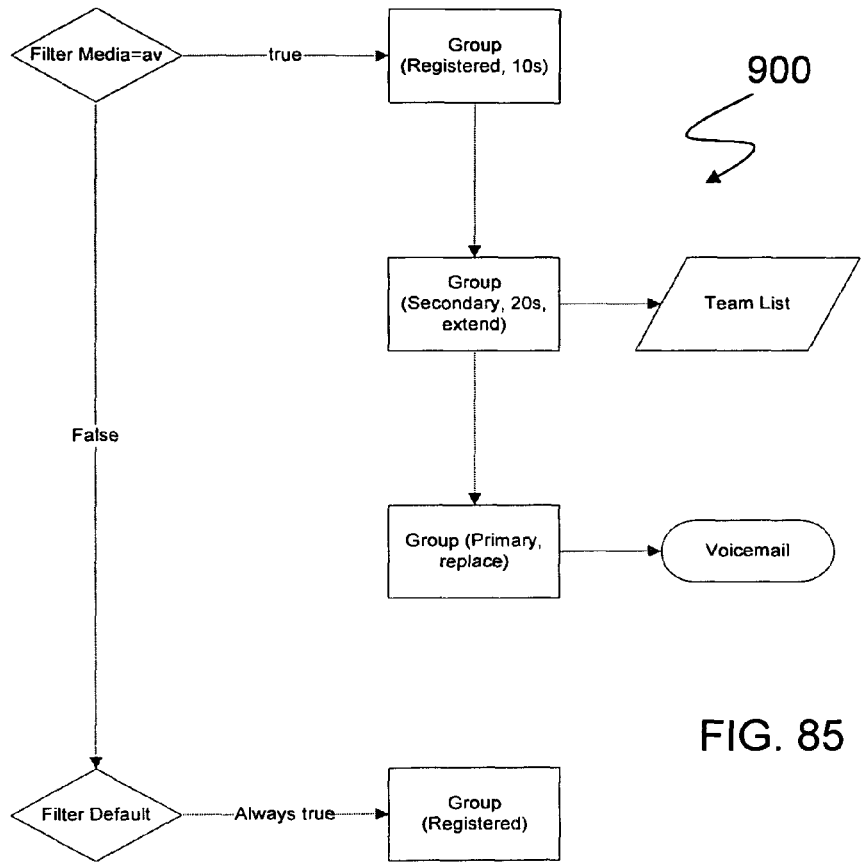
FIG. 85 is a flow diagram showing typical team ringing applied to audio and video calls according to the system described herein.

The following scenarios as well as many others are possible using the model. In one scenario, typical team ringing is provided including: ring all logged on endpoints; after ten seconds, start ringing a list of user defined team members in addition to the logged on endpoints; after another twenty seconds, cancel all ringing and send to voicemail or an external number. FIG. 85 is a flow diagram 900 showing typical team ringing applied to audio and video calls.

In another scenario, staged team ringing is also provided including: ring all logged on endpoints; after ten seconds, start ringing on of a randomly selected team member in addition to the logged on endpoints; after ten more seconds, start ringing the remaining team members; after another ten seconds, cancel all ringing and send to voicemail or an external number.

In another scenario, do not disturb ringing is also provided including: for a supplied time period ring a list of user defined team members without ever ringing user's endpoints and/or after thirty seconds, cancel all ringing and send to voicemail; when the time period has expired, revert to another ringing mode.

The Inbound Routing model may include a preamble and script section. The script may contains one or more filters. A filter may contain more filters or a group list. A group list may contain one or more destination groups. A destination group may be defined using a combination of zero or more targets and listrefs. A list is a set of targets that can be defined in the preamble, but reference anywhere within the definition.

The overall document structure may look like the following:

```
<routing xmlns="http://schemas.com/02/2006/sip/routing">
<preamble>
The preamble contains declarations that are used by the script.
</preamble>
<script>
The elements in the script can reference data in the preamble..
</script>
</routing>.
```

The model may be specified with the preamble and script in separate documents, but the name and version attributes may then be present in the <routing> element. For example, a client might publish just the preamble portion of the model in a rich presence container:

```
<routing xmlns=http://schemas.com/02/2006/sip/routing
name="default" version="1">
<preamble>
The preamble contains declarations that are used by the script.
</preamble>
</routing>
Stored seperately on the server is the actual script:
<routing xmlns=http://schemas.com/02/2006/sip/routing
name="default" version="1">
<script>
The elements in the script can reference data in the preamble:
</script>
</routing> .
```

The server may have many scripts, each with a different name/version attributes. The client's preamble may match a script on the server.

Figure 86:
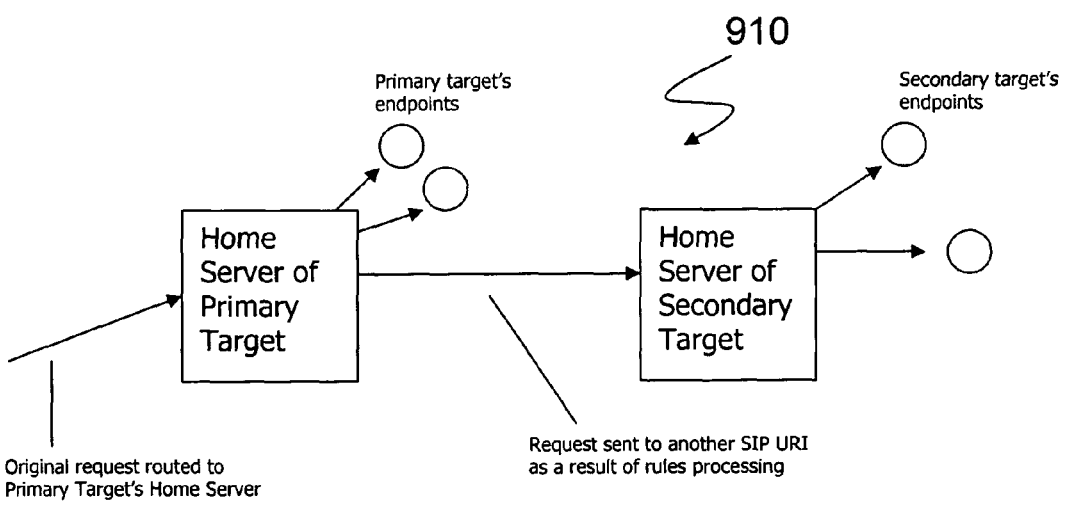
FIG. 86 is a schematic illustration showing requests sent to a secondary target according to the system described herein.

FIG. 86 is a schematic illustration showing requests sent to a secondary target. The targets of requests that may have routing logic applied to them are first classified based on the expectation of the sender of the request. The sender in this case is either an endpoint that generated the request, or a proxy that has previously routed this request based on some set of rules. The request target can fall into one of two classifications: Primary: the sender expects that the request has been targeted to the user or device that is primarily responsible for dealing with the request; Secondary: the sender expects that the request has been targeted to a user or device that is providing a support role for the individual or device that would normally handle the request.

The above classification is used as input to the routing rules using the filtering mechanism. For example, requests that are targeted to the primary user or device might be treated to extensive routing logic that includes the user's devices, his or her support staff and ultimately their voicemail box. Requests targeted to a secondary user or device may ring that user's endpoints but ultimately fail of the request is not accepted. This allows any routing logic for the primary user to continue incase the secondary user does not accept the request.

A request target is considered primary if: the Ms-Target-Class header is present and contains the token "primary"; and/or an Ms-Target-Class header is not present. A request target is considered secondary if: the Ms-Target-Class header is present and contains the token "secondary"; and/or the Ms-Target-Class header is added by the rules engine when sending a request to a destination defined within a primary or secondary group. A group is a construct used by a script designer to assign a processing order, time, and other attributes to a collection of possible routing destinations, as further described elsewhere herein.

If a request already contains an Ms-Target-Class header then that header may be changed from primary to secondary when forwarding the request to a destination in a secondary group. If the request is already categorized as secondary, it may not be elevated to primary even if the current routing script has assigned to a primary group.

The <routing> element has name and version attributes that help match the script to the preamble when these items are stored separately. The name may be astring value that provides a scope for the version. The version may be an integer value starting with 1. When the preamble is published separately from the script, the <routing> element must include corresponding name and version attributes. The server will select a script with the same name and version number. If an exact match is not possible or the routing element does not include name and version attributes, the preamble may be ignored and a generic script that does not require data from a preamble is loaded.

The preamble is the first section of the rules definition. Its primary purpose is to provide a location where data that is referenced in the main section is defined. This includes defining lists that are used in filters and groups, and the number of seconds a group will wait. Data used exclusively by the client may be defined in a unique namespace and used by the client.

A list of targets may be defined in the preamble part of the document. The list is given a unique name and contains zero or more targets elements. An example of a list of targets is shown below.

```
<list name="team">
  <target uri="sip:bob@ms.com"/>
  <target uri="sip:sally@ms.com"/>
  <target uri="sip:ralph@ms.com"/>
</list> .
```

The list name "registered" is reserved and may not be used in the preamble. The "registered" list is provided by the server and consists of all registered endpoints. The list name may not contain spaces or commas.

A wait time may be defined in the preamble part of the document. This value may then be reference by a group definition in the main part of the document. This makes it possible for the client to specify all user definable variables in the preamble of the document. An example is shown as follows.: <wait name="team" seconds="10"/>. The wait name may not contain spaces or commas.

A time value may be defined in the preamble part of the document and referenced by filter criteria in the main part of the document. This makes it possible for the client to specify all user definable variables in the preamble of the document. An example is as follows: <time name="work_hours" dow="mon,tue,wed,thu,fri" range="8:30-11:59, 13-17:00">.

The above example indicates the time will match Monday through Friday, from 8:30 AM to 11:59 AM and 1 PM to 5 PM local time. The time zone for all times in the preamble is specified in the <timezone> element, further described elsewhere herein. If a <timezone> element is not present, then all times are assumed to be in UTC time. However, it may be preferable that times are given within the scope of a time zone when using days-of-week since the day-of-week in the UTC time zone will not always match a user's local day. As an example: <time name="example" range="2006/02/14 8:30-2006/02/14 11:59,2006/02/14 13-17:00">.

The above example uses specific dates rather than days of week. The range attribute may have at least one time or date range specified where the start time and end times are separated by a "-" character. Multiple ranges can be separated by a comma as long as they are not open ended. An open ended range may be specified by omitting either the start time or the end time. An open ended range cannot be included with other ranges using the comma. The following is an example of an open ended range that is true until Feb. 14, 2006 at 12:00 noon Pacific Time. As an example: <time name="dnd" range="-2006/02/14 11:59">. The range cannot include dates (only times) if the "dow" attribute is set. Dates are specified in the YYYY/MM/DD format. Times are specified in a twenty-four hour HH:MM format. A space separates the date from the time if both are specified. Leading zeros are optional. The day-of-week attribute (dow) is a comma separated list that may including mon, tue, wed, thu, fri, sat, sun. These values are not case sensitive or localizable. Duplicate and unknown values are ignored. The name attribute may be mandatory and may be unique among all time values defined within the preamble. It is used reference by the filter in the main part of the document. The name may not contain spaces or commas.

The time zone to apply when processing <time> based filters may be specified using the <timezone> element. If the <timezone> element is not present, then it is assumed all time values are specified in UTC time. The time zone specification specifies the offset from UTC time and the details describing daylight savings time. This information is extracted from Windows API using TIME_ZONE_INFORMATION structure. This structure may be mapped to the <timezone> element as shown in the following TABLE 3:

TABLE 3

| TIME_ZONE_INFORMATION | tzi; | Time Zone Element |
|---|---|---|
| LONG Bias;<br>WCHAR StandardName[32];<br>SYSTEMTIME StandardDate;<br>LONG StandardBias; | | <timezone bias="tzi.Bias"><br>  <standard name="tzi.StandardName" (name is optional)<br>  bias="tzi.StandardBias"<br>  year="tzi.StandardDate.wYear"<br>  month="tzi.StandardDate.wMonth"<br>  dayofweek="tzi.StandardDate.wDayOfWeek"<br>  day="tzi.StandardDate.wDay"<br>  hour="tzi.StandardDate.wHour"<br>  minute="tzi.StandardDate.wMinute"/> |
| WCHAR DaylightName[32];<br>SYSTEMTIME DaylightDate;<br>LONG DaylightBias; | | <daylight name="tzi.DaylightName" (name is optional)<br>  bias="tzi.DaylightBias"<br>  year="tzi.DaylightDate.wYear"<br>  month="tzi.DaylightDate.wMonth"<br>  dayofweek="tzi.DaylightDate.wDayOfWeek"<br>  day="tzi.DaylightDate.wDay"<br>  hour="tzi.DaylightDate.wHour"<br>  minute="tzi.DaylightDate.wMinute"/><br></timezone> |

Flags can be defined in the preamble and used by filters in the script to control which branches of the script are used. As an example:

<flags name="features" value="dnd,cfna,tokenx,tokeny"/>

The value of a flags attribute is a comma separate list of tokens that serve as boolean values when being processed by the filter. The flags name may not contain spaces or commas.

The following description contains the logic the user may wants to execute, but using variables defined in the preamble.

At the top level of the model, is a list of one or more filter statements which are processed in order from top to bottom. A filter has a single boolean clause that is evaluated as each filter statement is processed. One of the following clauses is possible in each filter statement: time; media (A/V or messaging; member; class; referred; flags; and/or registered.

When a filter with a clause that evaluates to true is found, then any remaining filters in the series are ignored, and processing continues with the elements nested within the filter statement. A filter may contain either more filters or destination groups, but not a mix. If the process does not finally result in a set of one or more destination groups, then a default handling may be provided by the server. It may be important for the client to ensure that a default filter is defined in all cases in order to ensure it has full control over the routing of inbound calls.

The <filter> element has a single attribute called "criteria." The value of the criteria is a phrase that indicates the type of filter followed by a colon followed by a value that varies depending on the type of filter. An example is as follows:

Criteria=["!"]+type+":" +value

The criteria can be inverted by including a "!" as the first character before the type.

A time range filter allows different rules to be invoked at different times of day. This feature can be used to create time of day routing logic, but it can also be used to create temporary routing logic. For example, if DND should be active for the next hour, then a time based filter that is true for the next hour would select DND rules, and normal rules would be selected by the default filter. An example is as follows:

<filter criteria="time:work_hours">
  </filter> .

The type is "time" and the value is the name of a <time> element defined in the preamble.

The server may need to treat audio/video calls differently from app-invite and instant messaging calls. The media filter allows different rules to be defined for different media types. An example is as follows:

<filter criteria="media:av,app">
  </filter> .

The type is "media" and the value is:

av: Audio and/or video. The request is an INVITE either with no body, or an SDP with an m=audio or an m=video line.

messaging: Instance messaging. The request is an INVITE with an SDP containing either m=message or m=x-ms-message.

app: App-INVITE. The request is an INVITE that contains a body that is not an SDP.

If the request being processed is not an INVITE, then this filter will always be false. Multiple values may be listed using a comma separated list as shown in the example.

The member filter allows the rule designer to compare the URI in the "From" header to a list (defined in the preamble). An example is as follows:

<filter criteria="member:admin">
  </filter> .

The type is "member" and the value is the name of a <list> element defined in the preamble.

The referred filter allows the rule designer to compare the URI in the "Referred-By" header to a list (defined in the preamble). This is useful if it is necessary to distinguish parities that have been referred by a trusted entity from those attempting to dial directly. An example is as follows:

<filter criteria="referred:admin">
  </filter> .

The type is "referred" and the value is the name of a <list> element defined in the preamble. Note, it is up to the endpoint that finally receives the request to check the validity of the Referred-by header.

The class filter allows different routing logic to be applied to a request depending on the classification of its target, as further described elsewhere herein. An example is as follows:

```
<filter criteria="class:primary">
</filter>.
```

The type is "class" and the value is either "primary" or "secondary".

The flags filter is used to check for the presence of a token in the indicated set of flags that have been described in the preamble. An example is as follows:

```
<filter criteria="flags:features(dnd)">
</filter>.
```

The type is "flags" and the value is the name of a <flags> element defined in the preamble followed by ( ) that contains one or more of the flags to check.

The Registered filter is used to see if the called party has any registered endpoints. A single registered endpoint will cause the filter to return true. An example is as follows:

```
<filter criteria="registered">
</filter>.
```

The Default filter may always be true. A special element <default> is used to define this filter. This filter can only appear once at the end of a list of filters. It may always be present to ensure that some specific routing logic is applied to a request. An example is as follows:

```
<default>
.... Do some default action here.
</default>.
```

An empty filter, that is it does not contain any XML elements, may be combined using a logical "and" operator with filters that follow. Any number of such filters may be used to create a logical "and" operation among several filters. For example:

```
<filter criteria="flag:features(dnd)"/>
<filter criteria="time:dnd"/>
<filter criteria="registered">
.... Do some action here.
</filter>.
```

The above XML means that if the "dnd" flag is set, and the current time is within the time specified by "dnd" and the user is currently registered. That last filter that has elements will be executed as long as all filters are true. Filter chaining may not apply to the special <default> filter. It may always be applied regardless of any attempt to chain.

A group may contain zero or more destinations that are signaled simultaneously. A group has the following attributes:

Action: Extend or replace. If the group's action attribute is set to extend, then the group will let any destinations defined by previous groups continue to ring. If replace is specified, then the group will cause all previous destinations (from any preceding groups) to be cancelled.

Wait: Number of seconds the server will wait for all current and previous destinations to provide a final response before moving on to the next group. If the list is empty, or all destinations provide a final response, processing will continue even though the specified time has not passed.

WaitRef: Used instead of wait in case a wait time has been defined in the preamble.

Class: Registered, primary, or secondary. Requests sent as a result of processing primary or secondary groups will have an Ms-Target-Class header set to corresponding values unless the Ms-Target-Class header is already set to "secondary."

Registered group includes only endpoints that have registered to receive the type of request that is currently being processed.

Attributes: A group can be marked as "private" and/or as a "diversion." The Ms-Sensitivity header will be combined with these group attributes in order to determine if the group's targets can be used.

Pick: A group can include a "pick" attribute that indicates the server should expand only a randomly selected subset of the list. For example, if pick is set to one, then the server will randomly pick one entry from the list rather than expanding the whole list.

Criteria: The destinations for a group can be conditionally included or excluded by making use of the same criteria that can be specified in using the <filter> element.

Once the group has determined its targets, as further described elsewhere herein, it may fork the inbound request to the addresses defined by the targets and then start a timer for the indicated wait time. If the wait time is zero then the next group is immediately processed. If all of the targets in current group and any previous groups that the current group extended provide a negative final response before the timer pops, then the timer is stopped and the next group is processed. Even if the current group has no targets, the timer for the group will apply to outstanding requests from previous groups. If the timer pops, then the next group is processed. If there is no next group, then any outstanding requests are allowed to process until all requests are cancelled or all requests receive final responses. The lowest "4xx" response from all requests will be returned to the calling party. If target provides a "2xx" response, then all other requests are cancelled, and the processing of the rules ceases. An example is as follows:

```
<group action="extend" wait="10" class="primary" attributes="private">
<target uri="sip:paultid@example.com"/>
</group>.
```

The first step of processing a group is generating a flat list of targets. A target is considered a duplicate if the same URI (using user@host only) exists within that group, or has already been defined in a previous group. Duplicate entries are removed. Normally, if the group action is set to "replace," then all outstanding requests generated by any previous groups may be cancelled. If the current group contains a duplicate entry defined in a previous group and that entry is still active, it may not be cancelled. This makes it possible for a new group to cancel all previous items but provide exceptions.

A request that includes an EPID parameter in the To header is being targeted to a specific device. This type of request is intended to override forking behavior in the server. Overriding forking is useful especially in the consultative call transfer scenario, but it may be useful elsewhere. For this reason, the list expansion logic is modified when To header contains an epid parameter. If the To header contains an epid parameter, and the user and host parts of the Request-URI match the To header, and the current group is classified as "registered" then only targets that contain an epid that matches the epid in the To header is included in the expansion. Primary and Secondary groups will not be considered if an epid parameter is present. The presence of an EPID parameter will be irrelevant for the most part because the SPL code that initially processes the request will not pass the request to the routing engine.

There may be only one condition where the server will generate a final response as a result of processing the rules. When the last group has been processed, and no targets resulted from the last group or any of the previous groups, the server will return a 480 response, and processing will cease.

A group may contain zero or more references to a previously defined list mixed with zero or more targets. The referenced lists are expanded into a series of targets and combined with any other targets defined within. Any duplicate entries may be removed from the expanded list. Duplicates include any targets defined in previously processed groups. Any targets that are the same as the From header (or identity header) of the request may also be removed. An example is as follows:
<listref name="team">.

A target is an opaque SIP URI that is used to retarget a request. Targets may appear in list and group definitions. An example is as follows:

<target uri="sip:bob@ms.com"/>.

An optional attribute "application" may be specified in addition to or instead of the uri attribute. For example:

<target application="voicemail"/>.

A specific response code for a destination defined within a group may cause a named flag to be set. The flag may be used by groups making use of the filter criteria attribute further down the chain to be skipped or included. This element may appear within a group multiple times. An example is as follows:

<responseflags name="clientmode" value="dnd" code="480"/>.

The above example will cause a flag called DND to be set if any of the destinations in the group return a "480" response. This is similar to the <flags> attribute that may be specified in the preamble.

A macro may be defined for use in combination with <macroexpand> elements. A subroutine is a named collection of <filter> and <group> elements. To keep the routing model simple, a macro may have three important limitations: the <macro> elements may appear after the <default> element used in the main part of the script; the macro may not contain other <macro> elements; and/or the macro may not contain <macroexpand> elements. The macro element has a mandatory name attribute used to identify the macro. The name is referenced by the <macroexpand> element's name attribute.

A <macroexpand> element may be used to indicate the contents of a <macro> element should be used in its place. To keep the routing model simple, the <macroexpand> element has the limitation that it may be used only by itself inside a <filter> or <default> element. The mandatory name attribute is used to name the macro that should be expanded. A <macro> element with a corresponding name may be defined elsewhere in the same script.

TABLE 4 shows how responses from destinations in different groups are handled.

TABLE 4

Response Handling

| | |
|---|---|
| Registered Group | 2xx - Answers call<br>3xx - Cancels all processing.<br>If the response has a single contact header that contains the user = phone parameter, then the number is treated like a new instance of a primary group.<br>If the response does not have user = phone, then the response is simply proxied back immediately.<br>4xx - Held until end and proxied back if lowest numbered response.<br>6xx - Cancels all registered and primary destinations. Secondary destinations not affected. Groups that have not been processed yet will still be processed.<br>If the Ms-Decline-Scope header is present in the response and has the value "all", then all destinations are cancelled, and any further call processing is cancelled. The 6xx response is proxied back to the caller. |
| Primary Group | 2xx - Answers call<br>3xx - Held until end and proxied back if lowest numbered response.<br>4xx - Held until end and proxied back if lowest numbered response.<br>6xx - Cancels all registered and primary destinations. Secondary destinations not affected.<br>The Ms-Decline-Scope header is ignored if it is present. |
| Secondary Group | 2xx - Answers call<br>3xx - Treated like a 4xx response. Response is not proxied back.<br>4xx - Not proxied back.<br>6xx - Treated like a 4xx response. Response is not proxied back.<br>The Ms-Decline-Scope header is ignored if it is present. |

Notice that response codes returned by secondary groups may never be proxied back. The lowest final response from any registered or primary group may be used instead. If there is not a registered or primary group defined, or those groups are empty, then a "480" response code is used. The server may not proxy back "180" responses. Instead, if a "180" response arrives from one of the targeted endpoints, the server will generate a "180" response locally and return that. Then once a minute the server may return "180" until the INVITE transaction completes.

The following description provides an embodiment of the algorithm used to process groups with a focus on how the wait time, list, and criteria values are applied when processing the group. Details about how specific responses are handled and how requests are formulated are not included in order to keep the algorithm uncluttered.

Let T be the time accumulator. Set T=0. For each group: If the group action is "replace": Set T=group's wait time (t); Cancel pending requests that may have been started by previous groups. If the group action is "extend": Add the group's wait time (t) to T. T=T+t.

The remaining logic is the same for both types of actions, as follows. If the group's list is not empty, and the group has no criteria, or the criteria evaluates to "true," send requests to each target in the group's list. If the group is a primary group, then only one request at a time can be outstanding. If there are any requests outstanding for a primary group, a new request will not be generated. If a final response is received for target in a primary group, and there are more possible targets in the current group, then the next new target is selected and a request is generated. If there are any outstanding requests (even from previous groups) and T>0, start a timer equal to T. Wait for the timer to pop, or for all outstanding requests to complete. This includes outstanding requests from previous groups. If all outstanding requests complete before the timer pops, cancel the timer and set T to the time remaining. Move to the next group (finished) If the timer pops, set T=0 and move to the next group (finished); Else, If there are no outstanding requests or T=0, move to the next group. (finished).

The following description explains how the wait time specified by previous groups accumulates when a group's action is set to "extend." The mandatory "action" attribute indicates how a group will interact with previous groups. When the action is set to "replace" the new group replaces anything that may have been started by previous groups. This means any outstanding forked requests are cancelled, and any timers are reset or ignored. A group with the action set to "extend" will allow any outstanding pending requests to continue, any may add additional requests. But it will also cause the time allowed for a final response to accumulate based on values set by previous groups. This makes it possible to have a predictable total time when dealing with a series of groups that extend each other.

Figure 87:
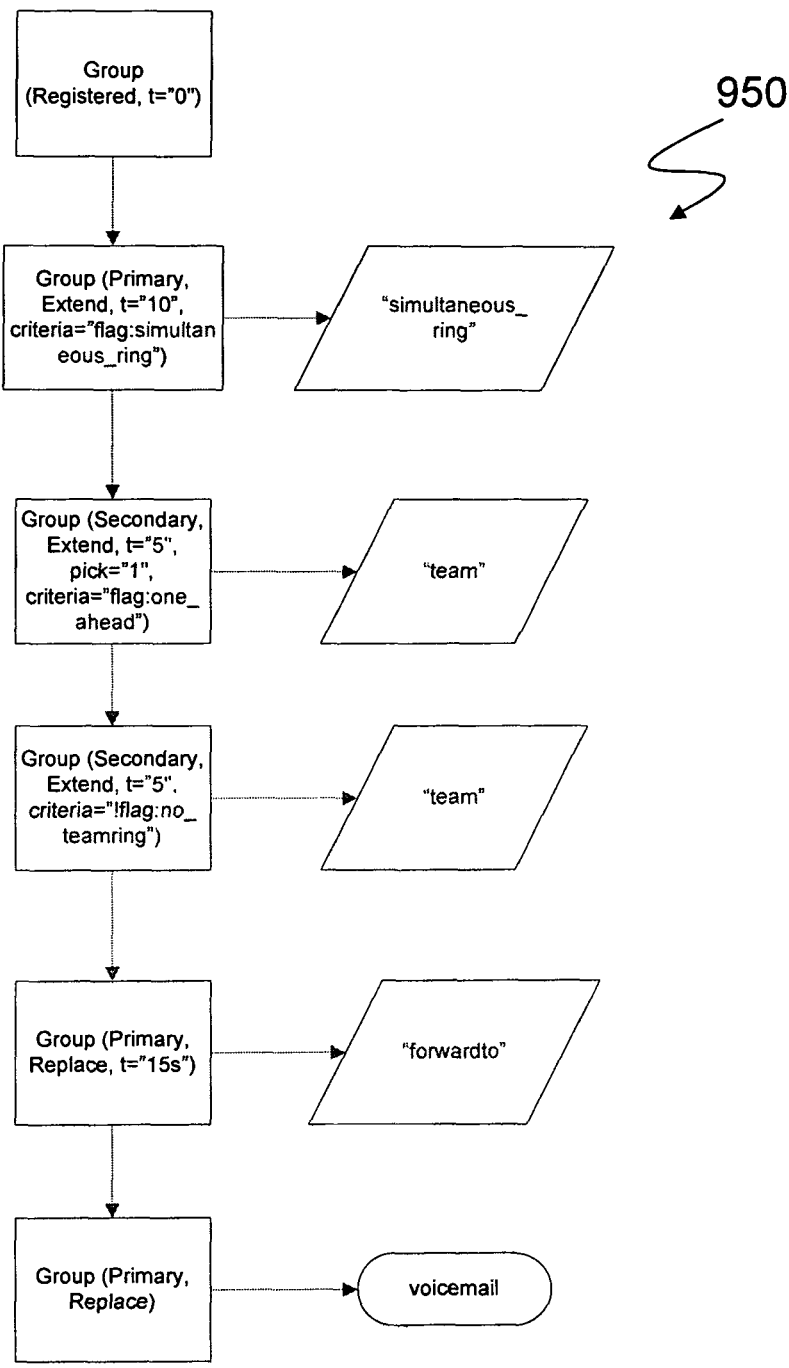
FIG. 87 is a flow diagram showing a variety of wait times for different call forwarding groups according to the system described herein.

Referring to FIG. 87, in the flow diagram 950 shown, the groups pictured show a variety of wait times. The first four groups extend each other while the last two group replace. Three of the extending groups have criteria that may cause the group's destinations to be ignored, but because the groups extend, the wait times are still applicable.

For a first example, using FIG. 87, assume each group results in at least one ringing destination. It would progress as follows:

First Group: Add the wait value "t=0" to the time accumulator (T). Now T=0. One or more devices begin to ring. Since T=0, immediately move to the next group.

Second Group: Add the wait value "t=10" to the time accumulator (T). Now T=10. One simultaneous ringing destination begins to ring. Since T=10 wait for ten seconds. After the timer pops, set T=0.

Third Group: Add the wait value "5" to the time accumulator (T). Now T=5. One team member's device starts to ring. Since T=5 wait for five seconds. After the timer pops, set T=0.

Fourth Group: Add the wait value "t=5" to the time accumulator (T). Now T=5. The remaining team member's devices start to ring. Wait another five seconds. After the timer pops, set T=0.

Fifth Group: Replace everything with a call forward destination. Total time up until this point: twenty seconds.

The total time before the fifth group is activated and the call forward destination rings is twenty seconds. Since there was always a ringing endpoint, the timer was always applied. It is easy to see how these times accumulate. For the next example, let's go to the other extreme. Assume there is one registered device that rings, but the team list and simultaneous lists are empty. In this case, the call would progress as follows:

First Group: Add the wait value "t=0" to the time accumulator (T). Now T=0. One or more devices begin to ring. Since T=0, immediately move to the next group.

Second Group: Add the wait value "t=10" to the time accumulator. Now T=10. For this example, there are no simultaneous destinations defined, but because there is currently an outstanding request, start a timer equal to T. When the timer pops set T=0. If all of the outstanding requests had responded with a "4xx" response, then the timer would be stopped and T would be set to be equal to the time remaining on the timer. In any case, move to the next group.

Third Group: Add the wait value "t=5" to the time accumulator. Now T=5. For this example, the team list is empty, but because there is currently an outstanding request start a timer equal to T. As before, when the timer pops set T=0 and move to the next group.

Fourth Group: Add the wait value "t=5" to the time accumulator. Now T=5. The team list is still empty, but because there is currently an outstanding request start a timer equal to T. As before, when the timer pops set T=0 and move to the next group.

Fifth Group: Replace everything with a call forward destination. Total time up until this point: 20 seconds.

The time accumulator (T) keeps track of the total time shared between the extending groups.

Another example that combines the groups that result in ringing endpoints and groups that do not will help show how the time accumulator changes in order to ensure a total twenty seconds pass before reaching the fifth group. For this example, assume the user does not have any registered devices or simultaneous devices defined. The team list is defined.

First Group: Add the wait value "t=0" to the time accumulator. Now T=0. No registered devices are defined. Move to the next group immediately.

Second Group: Add the wait value "t=10" to the time accumulator. Now T=10. There are no simultaneous devices defined, and no outstanding requests, so move to the next group immediately.

Third Group: Add the wait value "t=5" to the time accumulator. Now T=15. Start ringing one team member picked at random. Now that there is an outstanding request, start a timer equal to T. When the timer pops set T=0. If all of the outstanding requests had responded with a negative response, then the timer would be stopped and T would be set to be equal to the time remaining on the timer. In any case, move to the next group.

Fourth Group: Add the wait value "t=5" to the time accumulator. Now T=5. Start ringing the whole team. Since there are outstanding requests, start the timer for T seconds. When the timer pops, move to the next group.

Fifth Group: Replace everything with a call forward destination. Total time up until this point: twenty seconds.

The group supports an attribute that makes it possible to indicate that one or more randomly selected targets should be selected from the provided list. The intension is to select targets that will potentially accept the request. Because it is not possible to know ahead of time which targets are on-line and available, the selection algorithm uses some trial and error to find a suitable target. Here is how it works:

Let P=the value of the "pick" attribute. If P is larger than the list size, set P to the list size.

Let T=the time accumulator value.

If P>0 randomly pick P unique targets from the group's list. Selected targets are compared to an overall duplicate list to ensure unique targets among all groups processed so far. Send the request to the selected targets. If T>0, start timer based on T, otherwise move to the next group. If a target returns a negative response code that does not otherwise terminate processing, then randomly select a new unique target (if possible) and send the request to that target. Repeat until the timer pops. This step does not apply if processing has already moved on to the next group. If a negative response is returned by one of the selected targets, and it is not possible to pick a new unique target, and there are no other pending requests from previous groups, then the timer is stopped, and processing moves to the next group.

Once the timer pops processing must move to the next group even if a successful target was not found. This is necessary in order to ensure the call progresses and does not stall while searching for a working target.

The script engine defines configurable policy settings designed to prevent certain types of routing behavior regardless of the script or preamble definitions.

Block Extend Primary: A policy preventing a "primary" group from extending another "primary" or "registered" group. This has the effect of preventing a group that defines simultaneous ringing of non-registered devices. Groups that violate this policy will be treated as though their list is empty. Wait times specified by the group will still by applied.

Block Secondary Groups: A policy preventing requests being sent to secondary groups. This has the effect of disabling any type of "team ringing."

Secondary Target Limit: The number of unique URI's that may be as secondary targets. This limits the total number of requests across all secondary groups.

The policy settings are retrieved by the routing engine and applied while executing the routing logic. The preamble and the script itself cannot override policy.

It is possible that a request to a primary destination can be forwarded to another user who has in turn forwards calls back again. There may be several hops in between. For example, A forwards to B, and B forwards to C, and C forwards to A. To limit the impact of this type of looping, the routing engine may do the following: For outbound requests to primary targets, the Max-Forwards header may be set to 10 if it is currently larger than 10. Newly arriving requests that are to a primary target will have the Max-Forward value reduced by 1 (this is in addition to any reduction the proxy layer may have applied). If the result is less than or equal to 0, then a "483" response is returned and the request is no longer processed. Newly arriving requests that are to a secondary target will have the Max-Forward value reduced to ten if it is higher than ten.

The above-noted scheme allows the default Max-Forwards (seventy) to be used to find the home server of the user, but then greatly reduces the value. This prevents wild looping due to call forwarding. At most the request may loop through five more times. Secondary targets are treated differently because a request to a secondary target may be on a different home server. Therefore inbound secondary request are reduced since the request has reached the home server of the secondary user. Looping situations that cross in to the PSTN are a more difficult problem since each leg of the loop will look like a new call. Eventually all ports on a voice gateway will be saturated and the call will unwind with probably a busy indication. However it would be better if this situation could be detected and stopped before reaching that point. This is an area for further study.

The following description describes extensions defined for the SIP protocol in order to implement the features described in this specification.

The routing XML document is identified by the content type: application/ms-routing+xml. The XML elements within the routing XML document are uniquely defined within their own namespace. The XML namespace is:

The Ms-Target-Class header is defined as: Ms-Target-Class="Ms-Target-Class" HCOLON ("primary"/"secondary"). Ms-Target-Class header is added or set by the proxy as a result of forking a request in accordance with this specification. The header indicates if the request is destined to a "primary target" meaning a user or device that is expected to know how to fully service this request, or a "secondary target" meaning a user or device that is providing a support function for a primary target. A request may have 0 or 1 instances of this header.

The Ms-Decline-Scope header is defined as: Ms-Decline-Scope="Ms-Decline-Scope" HCOLON ("all"/ms-ds-extension). Ms-Decline-Scope header is used in conjunction with any 6xx response. A client that wishes to cancel all currently ringing destinations, and terminate any further call processing can include this header with the scope "all." New values may be defined in the future if more precision is required. The server will honor this header for registered devices. A "6xx" response may have zero or one instances of this header.

The Ms-Sensitivity header is defined as:
Ms-Sensitivity="Ms-Sensitivity" HCOLON ("normal"/ "private"/"normal-no-diversion"/"private-no-diversion").

Ms-Sensitivity header is used to indicate if a call can be directed to another person or diverted to another device representing the same person. A sensitivity of "normal" is assumed if the Ms-Sensitivity header is not present.

The Reason header is used with CANCEL transactions to indicate why a request is being cancelled. This header will be included in CANCEL requests per the RFC. An extension parameter is defined for the Reason header that is used when CANCEL is being sent because a different branch of the same request was accepted. An example is as follows: ms-acceptedby="ms-acceptedby" EQUAL quoted-string. The quoted string will contain the Request-URI of the branch that accepted the request.

The following examples show how some common scenarios considering herein are implemented using the routing model.

The Typical Team Ringing example implements the following scenario. The user has defined a team with three members, Bob, Sally, and Jeff. Any time an audio call is directed to the user, that user's logged on devices will begin to ring. If after ten seconds none of those devices have provided a "2xx" response, Bob, Sally, and Jeff's logged on devices begin to ring. If after another twenty seconds none of those devices has answered, then all ringing devices stop ringing and the call is sent to a cell phone. If the cell phone does not respond after thirty seconds or provides a negative response then the call is directed to voicemail. If any client returns "480", then the cell phone will not be used in the routing and calls will go directly to voicemail. An example is as follows:

```
<routing xmlns="http://schemas.com/02/2006/sip/routing">
<preamble>
<list name="team">
<target uri="sip:bob@ms.com"/>
<target uri="sip:sally@ms.com"/>
<target uri="sip:jeff@ms.com"/>
</list>
<list name="cell">
<target uri="sip:+14445556666@ms.com;user=phone"/>
</list>
<wait name="team" seconds="20"/>
<wait name="devices" seconds="10"/>
</preamble>
<script>
<filter criteria="class:primary">
<group waitref="devices" class=" registered">
<responseflags name="clientmode" value="dnd" code="480"/>
</group>
<group action="extend" waitref="team" class="secondary">
<listref name="team"/>
</group>
<group action="replace" class="primary"
criteria="!flags:clientmode(dnd)" wait="30">
<listref name="cell"/>
</group>
<group action="replace" class="primary">
<target application="voicemail"/>
</group>
</filter>
<!-- if the current user is providing support but is
not the primary target of the request, then just ring
their devices. -->
<default>
<group class="registered"/>
</default>
```

-continued

```
</script>
</routing>.
```

Notice that all parts of the routing logic that are user definable have been stored in the preamble. The number of seconds to let the devices ring before moving to the team, and the members of the team are both stated in the preamble. This makes the parts of the script located in the main part of the document fixed. It is possible this same script can be used by many users by providing a different preamble. It also means the client need only parse the preamble to gather user defined settings. The next examples use the same preamble defined above.

The Staged Team Ringing example will ring one team member first, followed by the remaining team members. An example is as follows:

```
<routing xmlns="http://schemas.com/02/2006/sip/routing">
<preamble>
Same as described elsewhere herein
</preamble>
<script>
<filter criteria="class:primary">
<group waitref="devices" class="registered">
<responseflags name="clientmode" value="dnd" code="480"/>
</group>
<group action="extend" wait="5" class="secondary" pick="1">
<listref name="team"/>
</group>
<group action="extend" waitref="team" class="secondary">
<listref name="team"/>
</group>
<group action="replace" class="primary"
criteria="!flags:clientmode(dnd)" wait="30">
<listref name="cell"/>
</group>
<group action="replace" class="primary">
<target application="voicemail"/>
</group>
</filter>
<!-- if the current user is providing support but is
not the primary target of the request, then just ring
their devices. -->
<default>
<group class="registered"/>
</default>
</script>
</routing>.
```

In this case, the "pick" attribute is specified on the list in the second group. This means that one of the team members may be selected at random. The next group may then ring all three team member. Keep in mind that since duplicates are automatically removed, each team member may only ring once.

In a Temporary DND example, take the typical team ringing case, but also assume the client has decided to invoke DND for the next hour. An example is as follows:

```
<routing>
<preamble>
Same as descrbied elsewhere herein, plus
<time name="dnd" range="-2006/02/13 15:23:00"/>
</preamble>
<script>
<filter criteria="time:dnd">
<!-don't ring registered devices this time -->
<group action="extend" waitref="team" class="secondary">
<listref name="team"/>
</group>
```

```
<group action="replace" class="primary">
<target application="voicemail"/>
</group>
</filter>
<default>
<group waitref="devices" class=" registered"/>
<group action="extend" waitref="team" class="secondary">
<listref name="team"/>
</group>
<group action="replace" class="primary">
<target application="voicemail"/>
</group>
</default>
</script>
</routing>.
```

The client may extend the time by publishing a new rule with a newly computed time. If the client decides to disable DND, it can publish a new document with an appropriate script.

As an example of what is further possible using the present system, consider the typical team ringing case again, but treat the user's spouse and team members with high priority. In this case a list is defined on the preamble with a single entry: the URI of the spouse. If the calling party is a member of the spouse list or the team list, then after ringing the user's devices, the call is routed to the user's cell phone. There is no team ringing in this case. Everyone else gets the normal team ringing treatment. An example is as follows:

```
<routing>
<preamble>
<list name="team">
<target uri="sip:bob@ms.com"/>
<target uri="sip:sally@ms.com"/>
<target uri="sip:jeff@ms.com"/>
</list>
<wait name="team" seconds="20"/>
<wait name="devices" seconds="10"/>
<list name="spouse">
<target uri="sip:+14445557777@ms.com"/>
</list>
<time name="work hours" dow="mon,tue,wed,thu,fri"
range="8:00–17:00"/>
</preamble>
<script>
<filter criteria="member:spouse,team">
<group wait="20" class="primary">
<listref name="registered"/>
</group>
<group action="replace" class="primary">
<target uri="sip:+14445558888"/> <!-- Cell -->
</group>
</filter>
<filter criteria="time:work hours">
<group waitref="devices" class="primary">
<listref name="registered"/>
</group>
<group action="extend" waitref="team" class="secondary">
<listref name="team"/>
</group>
<group action="replace" class="primary">
<target uri="sip:+14445558888@ms.com"/> <!-- Cell -->
</group>
</filter>
<default>
<group waitref="devices" class="primary">
<listref name="registered"/>
</group>
<group action="extend" waitref="team" class="secondary">
<listref name="team"/>
</group>
<group action="replace" class="primary">
<target application="voicemail"/>
```

```
        </group>
      </default>
    </script>
  </routing>.
```

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of forwarding an incoming call, comprising:
processing a selection of at least one group from a graphical user interface that presents a user-selectable list of groups initialized with groups in a single recipient's contact list, the selection used to generate a forwarding setting;
processing a message corresponding to an incoming call directed to the single original recipient in operation of a communication device;
processing forwarding settings for routing said incoming call, wherein said forwarding settings include a listing of at least one selected group having more than one member and at least one forwarding instruction associated with said at least one selected group, said processing of forwarding settings including assessing a presence state of said original recipient set at a server;
forking the message operative to forward said incoming call according to said at least one forwarding instruction to at least one first member and at least one second member of said at least one selected group, wherein said at least one forwarding instruction is based on said presence state.

2. The method of claim 1, wherein said incoming call is transmitted using voice over IP.

3. The method of claim 1, wherein if said incoming call is not answered by said at least one second member of said at least one group then said incoming call is forwarded according to at least one of: (i) sequentially to another member of said at least one group, (ii) concurrently to at least two additional members of said at least one group, (iii) to at least one member of a second group; and (iv) to a voice mail system.

4. The method of claim 1, further comprising:
generating a missed call notification;
sending said missed call notification to said original recipient.

5. The method of claim 4, wherein said missed call notification includes information concerning an answering status of said call.

6. The method of claim 1, wherein said forwarding settings are generated using a user communication device.

7. The method of claim 6, wherein said user communication device includes a display prompt on a computer screen.

8. A computer readable storage device having computer executable instructions for performing the steps recited in claim 1.

9. A system having at least one processor that performs the steps recited in claim 1.

10. A method of forwarding an incoming call, comprising:
processing a selection of at least one group from a graphical user interface that presents a user-selectable list of groups initialized with groups in a single recipient's contact list, the selection used to generate a forwarding setting;
processing a Session Initiation Protocol (SIP) invite message corresponding to an incoming call;
determining if a user communication device accepts the incoming call;
if the user communication device accepts said incoming call, routing the incoming call to the user communication device; and
if the user communication device does not accept said incoming call, forking the SIP invite message to route the incoming call according to at least one forwarding instruction, wherein said at least one forwarding instruction includes information identifying said at least one selected group having more than one member, wherein processing said at least one forwarding instruction includes assessing a presence state set at a server, wherein said at least one forwarding instruction is based on said presence state, and wherein said incoming call is forwarded to registered SIP communication devices of at least two members of said at least one selected group.

11. The method of claim 10, wherein said user communication device includes at least one user categorization rule that controls at least one of: (i) whether said user communication device accepts said incoming call and (ii) said at least one forwarding instruction.

12. The method of claim 11, wherein said at least one user categorization rule authorizes said user communication device to accept said incoming call if said incoming call is from an authorized caller.

13. The method of claim 10, further comprising:
generating a missed call notification;
sending said missed call notification to said user communication device.

14. A computer readable storage device having computer executable instructions for performing the steps recited in claim 10.

15. A system having at least one processor that performs the steps recited in claim 10.

16. A system for configuring call forwarding settings, comprising:
a graphical user interface for each of a plurality of members of a group, including a first display prompt on a computer screen, wherein the first display prompt includes a user-selectable list of groups initialized with groups in a user's contact list, and at least a second display prompt wherein said at least a second display prompt includes at least one routing list of a group selected from the user-selectable list, and least one user-alterable call forward setting for forwarding an incoming call, said at least one user-alterable call forward setting including at least one instruction for forwarding said incoming call to at least two members of said selected group, wherein processing said at least one user-alterable call forward setting includes assessing a presence state of at least one member of said selected group, and wherein said at least one forwarding instruction is based on said presence state.

* * * * *